(12) United States Patent
Fitton et al.

(10) Patent No.: US 7,295,597 B2
(45) Date of Patent: Nov. 13, 2007

(54) RECEIVER PROCESSING SYSTEMS

(75) Inventors: Michael Philip Fitton, Bristol (GB);
Khurram Ali Rizvi, Bristol (GB); Yuk Ching Chow, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 727 days.

(21) Appl. No.: 10/350,037

(22) Filed: Jan. 24, 2003

(65) Prior Publication Data
US 2004/0017843 A1 Jan. 29, 2004

(30) Foreign Application Priority Data
Jan. 25, 2002 (GB) ................................. 0201730.9

(51) Int. Cl.
*H04B 1/69* (2006.01)
*H04B 1/707* (2006.01)

(52) U.S. Cl. ...................... 375/148; 375/147; 375/149; 375/150; 370/335; 370/342; 370/345

(58) Field of Classification Search ................ 375/316, 375/147, 148, 150, 260, 243, 245, 258, 149, 375/141; 348/400, 403, 405; 370/342, 343, 370/441, 442; 713/322
See application file for complete search history.

(56) References Cited

U.S. PATENT DOCUMENTS

| | | | | |
|---|---|---|---|---|
| 6,067,292 | A * | 5/2000 | Huang et al. ................ | 370/342 |
| 6,192,066 | B1 * | 2/2001 | Asanuma ..................... | 375/130 |
| 6,222,833 | B1 | 4/2001 | Seo | |
| 6,763,059 | B2 | 7/2004 | Suzuki et al. | |
| 6,798,737 | B1 * | 9/2004 | Dabak et al. ................ | 370/209 |
| 7,103,095 | B2 * | 9/2006 | Papasakellariou ........... | 375/150 |
| 2001/0053177 | A1 * | 12/2001 | Papasakellariou ........... | 375/142 |
| 2002/0196842 | A1 * | 12/2002 | Onggosanusi et al. ...... | 375/148 |
| 2003/0012264 | A1 * | 1/2003 | Papasakellariou et al. .. | 375/148 |

FOREIGN PATENT DOCUMENTS

CN 1154770 A 7/1997

(Continued)

OTHER PUBLICATIONS

Madkour, M.F.; Gupta, S.C.; "Multi-rate multi-code CDMA using FWT for mobile and personal communications" vol. 2, Sep. 8-11, 1998 pp. 779-783.*

(Continued)

*Primary Examiner*—Mohammed Ghayour
*Assistant Examiner*—Qutub Ghulamali
(74) *Attorney, Agent, or Firm*—Oblon, Spivak, McClelland, Maier & Neustadt, P.C.

(57) ABSTRACT

A multicode receiver for receiving data carried by a plurality of spread spectrum signals having a corresponding plurality of spreading codes, the spreading codes being substantially mutually orthogonal, the receiver having intercode interference suppression, the receiver including a multicode spread spectrum receiver to provide a set of data estimates having a plurality of estimates of data carried by the plurality of spread spectrum signals, one estimate for each spread spectrum signal, a plurality of respreaders to respread the plurality of data estimates, a plurality of interference suppressers, at least one for each of the plurality of spreading codes, each at least one interference suppresser for each code being configured to suppress respread data estimates for the spread spectrum signals of the other codes, from a received signal, a plurality of rake fingers each having the plurality of interference suppressers, and a plurality of rake combiners, one for each of the plurality of spreading codes.

18 Claims, 31 Drawing Sheets

FOREIGN PATENT DOCUMENTS

| | | |
|---|---|---|
| CN | 1248362 A | 3/2000 |
| CN | 1097368 C | 12/2002 |
| EP | 0 776 105 | 5/1997 |
| EP | 0 849 888 | 6/1998 |
| EP | 0 876 001 A2 | 11/1998 |
| EP | 0 876 002 | 11/1998 |
| EP | 0 954 112 | 11/1999 |
| EP | 0 984 576 A1 | 3/2000 |
| EP | 0 994 570 | 4/2000 |
| EP | 1 137 216 A2 | 9/2001 |
| EP | 1 164 735 | 12/2001 |
| JP | 10-322312 | 12/1998 |
| JP | 10-327126 | 12/1998 |
| JP | 2001-168767 | 6/2001 |
| JP | 2001-251278 | 9/2001 |
| JP | 2001-267982 | 9/2001 |
| JP | 2001-339326 | 12/2001 |
| WO | WO96/03819 | 2/1996 |
| WO | WO 00/18029 | 3/2000 |
| WO | WO 01/05052 | 1/2001 |
| WO | WO 01/06664 | 1/2001 |
| WO | WO 01/54328 A1 | 7/2001 |

OTHER PUBLICATIONS

Mizuguchi, H.; Yoshida, S.; Ushirokawa, A., "Performance evaluation of CDMA adaptive interference canceller with RAKE structure using developed testbed in multiuser and multipath fading environment", (Cat. No. 98TH8361), The Ninth IEEE International Symposium on Personal, Indoor and Mobile Radio Communications, 1998, vol. 1, Sep. 8-11, 1998.*

Su Il Kim, et al., "Performance Improvement of RAKE Receiver for a Multicode DS-CDMA System with Multistage Interference Cancellation Detectors", IEEE TENCON, Sep. 15, 1999, pp. 573-576.

"Complexity Analysis on MPIC for HSDPA", NTT DoCoMo, TSG-RAN Working Group 1 Meeting #19 TSGR1#19(01)0329, Mar. 2, 2001, URL, http://www.3gpp. Org/ftp/tsg_ran/WG1_RL1/TSGR1_19/Docs/Zips/R1-01-0329., pp. 1-3.

"Multipath Interference Canceller (MPIC) for HSDPA and Effect of 64QAM Data Modulation", NTT DoCoMo, TSG-RAN Working Group 1 Meeting #18 TSGR1#18(01)0102, Jan. 15-18, 2001, URL,http://www.3gpp.Org/ftp/tsg_ran/WG1_RL1/TSGR1_18/Docs/Zips/R1-01-0102.zip, pp. 1-5.

Akihiro Fujiwara, et al., "Frame Structure for Accurate Link Adaptation for High-Speed Packet Transmission with Adaptive Modulation Scheme in W-CDMA Mobile Radio", Handbook of Lectures in Gerenal Meeting of Electronic Information Communication System Society in 2001, Mar. 7, 2001,p. 427, B-5-29 and 2 cover pages.

* cited by examiner

RECEIVER PROCESSING SYSTEMS

FIELD OF THE INVENTION

This invention generally relates to architectures, systems and methods for reducing interference in spread spectrum receivers, particularly rake receivers. The invention has applications in digital mobile communications systems, especially third generation (3G) systems.

BACKGROUND OF THE INVENTION

Third generation mobile phone networks use CDMA (Code Division Multiple Access) spread spectrum signals for communicating across the radio interface between a mobile station and a base station. These 3G networks, (and also so-called 2.5G networks), are encompassed by the International Mobile Telecommunications IMT-2000 standard (www.ituint, hereby incorporated by reference). Third generation technology uses CDMA (Code Division Multiple Access) and the IMT-2000 standard contemplates three main modes of operation, W-CDMA (Wide band CDMA) direct spread FDD (Frequency Division Duplex) in Europe and Japan, CDMA-2000 multicarrier FDD for the USA, and TD-CDMA (Time Division Duplex CDMA) and TD-SCDMA (Time Division Synchronous CDMA) for China.

Collectively the radio access portion of a 3G network is referred to as UTRAN (Universal Terrestrial Radio Access Network) and a network comprising UTRAN access networks is known as a UMTS (Universal Mobile Telecommunications System) network. The UMTS system is the subject of standards produced by the Third Generation Partnership Project (3GPP, 3GPP2), technical specifications for which can be found at www.3gpp.org. These standards include Technical Specifications 23.101, which describes a general UMTS architecture, and 25.101 which describes user and radio transmission and reception (FDD) versions 4.0.0 and 3.2.2 respectively of which are hereby incorporated by reference.

FIG. 1 shows a generic structure of a third generation digital mobile phone system at 10. In FIG. 1 a radio mast 12 is coupled to a base station 14 which in turn is controlled by a base station controller 16. A mobile communications device 18 is shown in two-way communication with base station 14 across a radio or air interface 20, known as a Um interface in GSM (Global Systems for Mobile Communications) networks and GPRS (General Packet Radio Service) networks and a Uu interface in CDMA2000 and W-CDMA networks. Typically at any one time a plurality of mobile devices 18 are attached to a given base station, which includes a plurality of radio transceivers to serve these devices.

Base station controller 16 is coupled, together with a plurality of other base station controllers (not shown) to a mobile switching centre (MSC) 22. A plurality of such MSCs are in turn coupled to a gateway MSC (GMSC) 24 which connects the mobile phone network to the public switched telephone network (PSTN) 26. A home location register (HLR) 28 and a visitor location register (VLR) 30 manage call routing and roaming and other systems (not shown) manage authentication, billing. An operation and maintenance centre (OMC) 29 collects the statistics from network infrastructure elements such as base stations and switches to provide network operators with a high level view of the network's performance. The OMC can be used, for example, to determine how much of the available capacity of the network or parts of the network is being used at different times of day.

The above described network infrastructure essentially manages circuit switched voice connections between a mobile communications device 18 and other mobile devices and/or PSTN 26. So-called 2.5G networks such as GPRS, and 3G networks, add packet data services to the circuit switched voice services. In broad terms a packet control unit (PCU) 32 is added to the base station controller 16 and this is connected to a packet data network such as Internet 38 by means of a hierarchical series of switches. In a GSM-based network these comprise a serving GPRS support node (SGSN) 34 and a gateway GPRS support node (GGSM) 36. It will be appreciated that both in the system of FIG. 1 and in the system described later the functionalities of elements within the network may reside on a single physical node or on separate physical nodes of the system.

Communications between the mobile device 18 and the network infrastructure generally include both data and control signals. The data may comprise digitally encoded voice data or a data modem may be employed to transparently communicate data to and from the mobile device. In a GSM-type network text and other low-bandwidth data may also be sent using the GSM Short Message Service (SMS).

In a 2.5G or 3G network mobile device 18 may provide more than a simple voice connection to another phone. For example mobile device 18 may additionally or alternatively provide access to video and/or multimedia data services, web browsing, e-mail and other data services. Logically mobile device 18 may be considered to comprise a mobile terminal (incorporating a subscriber identity module (SIM) card) with a serial connection to terminal equipment such as a data processor or personal computer. Generally once the mobile device has attached to the network it is "always on" and user data can be transferred transparently between the device and an external data network, for example by means of standard AT commands at the mobile terminal-terminal equipment interface. Where a conventional mobile phone is employed for mobile device 18 a terminal adapter, such as a GSM data card, may be needed.

In a CDMA spread spectrum communication system a baseband signal is spread by mixing it with a pseudorandom spreading sequence of a much higher bit rate (referred to as the chip rate) before modulating the rf carrier. At the receiver the baseband signal is recovered by feeding the received signal and the pseudorandom spreading sequence into a correlator and allowing one to slip past the other until a lock is obtained. Once code lock has been obtained, it is maintained by means of a code tracking loop such as an early-late tracking loop which detects when the input signal is early or late with respect to the spreading sequence and compensates for the change.

Such, a system is described as code division multiplexed as the baseband signal can only be recovered if the initial pseudorandom spreading sequence is known. A spread spectrum communication system allows many transmitters with different spreading sequences all to use the same part of the rf spectrum, a receiver "tuning" to the desired signal by selecting the appropriate spreading sequence.

In a 3G mobile phone system the base band data is spread using a spreading or channelisation code using an Orthogonal Variable Spreading Factor (OVSF) technique. The OVSF codes allow the spreading factor to be changed whilst maintaining orthogonality between codes of different lengths. To increase the number of simultaneous users of the system the data is further spread by a scrambling code such as a Gold code. The scrambling code does not change the signal bandwidth but allows signals to or from different users to be distinguished from one another, again, because the spreading codes are substantially mutually orthogonal. The scrambling is used on top of the channelisation spreading, that is a signal at the chip rate following OVSF spreading is multiplied by the scrambling code to produce a scrambled code at the same chip rate. The chip rate is thus determined by the channelisation code and, in this system, is unaffected by the subsequent scrambling. Thus the symbol rate for a given chip rate is likewise unaffected by the scrambling.

In a 3G mobile phone system different spreading factors and scrambling code links are generally employed for the down link from the base station to the mobile station and for the up link from the mobile station to the base station. Typically the channelisation codes have a length of between 4 chips and 256 chips or, equivalently, a spreading factor of between 4 and 256 (although other spreading factors may be employed). The up link and down link radio frames generally last 10 ms, corresponding to a scrambling code length of 38400 chips although shorter frames, for example of 256 chips, are sometimes employed on the up link. A typical chip rate is 3.84 M chips/sec (Mcps), which determines the maximum bit rate for a channel—for example with a spreading factor of 16, that is 16 chips per symbol, this gives a data rate of 240 Kbps. It will be recognised that the foregoing figures are provided merely for the purposes of illustration. Where higher bit rate communications with a mobile station are required more than one such channel may be employed to create a so-called multicode transmission. In a multicode transmission a plurality of data channels are used, effectively in parallel, to increase the overall rate of data transmission to or from a mobile station. Generally the multicode data channels have the same scrambling code but different channelisation codes, albeit preferably with the same spreading factor.

In a 3G mobile phone system there are generally a number of different channels some dedicated to particular users and some common to groups of users such as all the users within a given cell or sector. Traffic is carried on a Dedicated Physical Control Channel (DPCH), or on a plurality of such channels in the case of a multicode transmission, as described above. The common channels generally transport signalling and control information and may also be utilised for the physical layer of the system's radio link. Thus a Common Pilot Channel (CPICH) is provided comprising an unmodulated code channel scrambled with a cell-specific scrambling code to allow channel estimation and equalisation at the mobile station receiver. Similarly a Sychnronisation Channel (SCH) is provided for use by the mobile station to locate network cells. A primary SCH channel is unmodulated and is transmitted using the same channelisation spreading sequence in each cell and does not employ a cell-specific scrambling code. A similar secondary SCH channel is also provided, but with a limited number of spreading sequences. Primary and Secondary Common Control Physical Channel (PCCPCH, SCCPCH) having known channelisation and spreading codes are also provided to carry control information. The foregoing signalling channels (CPICH, SCH and CCPCH) must generally be decoded by all the mobile stations and thus the spreading codes (channelisation codes and where appropriate, scrambling code) will generally be known by the mobile station, for example because the known codes for a network have been stored in the user-end equipment. Here the references to channels are generally references to physical channels and one or more network transport channels may be mapped to such a physical channel. In the context of 3G mobile phone networks the mobile station or mobile device is often referred to as a terminal and in this specification no distinction is drawn between these general terms.

One advantage of spread spectrum systems is that they are relatively insensitive to multipath fading. Multipath fading arises when a signal from a transmitter to a receiver takes two or more different paths and hence two or more versions of the signals arrive at the receiver at different times and interfere with one another. This typically produces a comb-like frequency response and, when a wide band signal is received over a multipath channel, the multiple delays give the multiple components of the received signal the appearance of tines of a rake. The number and position of multipath channels generally changes over time, particularly when the transmitter or receiver is moving. However, as the skilled person will understand, a correlator in a spread spectrum receiver will tend to lock onto one of the multipath components, normally the direct signal which is the strongest.

As is known in the art a plurality of correlators may be provided to allow the spread spectrum receiver to lock onto a corresponding plurality of separate multipath components of the received signal. Such a spread spectrum receiver is known as a rake receiver and the elements of the receiver comprising the correlators are often referred to as "fingers" of the rake receiver. The separate outputs from each finger of the rake receiver are combined to provide an improved signal to noise ratio (or bit error rate) generally either by weighting each output equally or by estimating weights which maximise the signal to noise ratio of the combined output. This latter technique is known as Maximal Ratio Combining (MRC).

There is a general need to provide user-end terminal capable of supporting the higher data rates possible in 3G systems, particularly in areas with large numbers of users. It is generally thought that a CDMA system is uplink-limited due to the near-far effect (where the correlation with a strong, nearby signal having an incorrect code is greater than that with a weaker, more distant signal with the correct code). However a 3G CDMA system may instead be limited by the downlink capacity due to the highly asymmetric services that are envisaged, such as the download of web page and image data from the Internet. Thus there is a general need for a mobile terminal which can support such higher rate downlink data services.

To facilitate the support of higher data rate services it is known to employ Multiple Access Interference (MAI) suppression at the base station to improve the uplink. Multiple access interference rises because the spreading codes of signals received from different users are not normally completely orthogonal. Interference cancellation (IC) receivers in the base station thus attempt to estimate a multiple access interference component which is subtracted from the received signal, either in parallel across all the users or sequentially. The multiple access interference which is cancelled is the interference between the same multipath component of two substantially orthogonal received signals. This technique is described in more detail in Section 11.5.2 of "WCDMA for UMTS by H Holma and A Toskala, John Wiley & Sons, 2001" (ISBN0 741 48687 6).

A technique for suppressing interference between different multipath components of a single data channel, that is for suppressing Interpath Self-interference (IPI), has also been described in a paper by NTT Docomo, "Multipath Interference Canceller (MPIC) for HSDPA and Effect of 64QAM Data Modulation" (TSG RAN WG)1 Meeting #18, document (01) 0102 available from the 3GPP website at http://www.3gpp.org/ftp/tsg_ran/wg1_rl1/tsgr1_18/docs/pdfs/r1-01-0102.pdf).

These techniques, while helpful, still leave room for improvement. In particular the inventors have recognised that there is a further component of interference which can be estimated and then cancelled from a received signal to further improved the output signal to noise ratio. The inventors have also recognised that various additional techniques may be applied when suppressing this and other interference components to improve the cancellation of interference components including the cancellation of interference components in the prior art arrangement.

Intracell interference arises due to interpath interference and the loss of orthogonality between the channelisation codes. In an ideal environment with a single path between the transmitter and the receiver the OVSF channelisation codes ensure that the different transmitted streams are (substantially) orthogonal to one another. However in the presence of multipath time dispersion the non-zero auto (or cross) space-correlation between different multipath components gives rise to interpath interference.

Consider the case where a spread spectrum receiver receives two signals simultaneously, a first signal with a first spreading code of 1-11-1 and a second signal with a second spreading code of 11-1-1. These two spreading codes are substantially orthogonal over a symbol period as they sum to −1. However if the second code is offset slightly with respect to the first code the non-orthogonal component increases.

Such an offset can be caused by multipath which effectively introduces a delayed component of both the first and second signals, albeit normally at a reduced power. Considering for example the first spreading code, a non-orthogonal contribution arises both from the delayed version of the first code, because of the non-ideal auto correlation properties of the codes, and also from the delayed version of the second code, because of the non-ideal cross-correlation properties of the codes.

Referring now to FIG. 2, this illustrates the effects of multipath interference when using an OVSF code with non-ideal auto correlation properties. FIG. 2*a* shows an auto correlation function 200 for an arbitrarily chosen OVSF code with a spreading factor of 16, with the correlator output shown on Y-axis 202 and the delay offset of the two versions of the code being correlated to calculate the auto correlation function being indicated, in chip periods Tc, on X-axis 204.

FIG. 2*b* shows the ideal real output of a correlator for a two ray multipath model with an ideal OVSF code as FIG. 2*a*. In FIG. 2*b* the correlator output for a first multipath component is illustrated by solid line 206 and the correlator output for a second multipath component, with a magnitude of 0.5 relative to the first path and zero relative phase shift, is shown by dashed line 208. The response of FIG. 2*b* is ideal because the correlator output comprises all the energy from the first path when the delay offset is zero, but without any interference contribution from the second path.

Referring now to FIG. 2*c* this shows the actual situation when the OVSF code of FIG. 2*a* is employed in the two ray multipath mode of FIG. 2*b*. Again the correlator output for the first and second multipath components are shown by solid line 210 and dashed 212 respectively. It can be seen that the auto correlation function of FIG. 2*a* has been superimposed on both multipath components and the result of this is that the correlator output for zero delay offset comprises a combination of a desired contribution of magnitude 1 from the first multipath and an interfering contribution of relative magnitude 0.25 from the second multipath signal.

The relatively poor correlation properties of OVSF codes when not time-aligned are known and this is the reason why an additional spreading code is applied in W-CDMA 3G systems. As explained above, the codes used in W-CDMA, as specified by the 3GPP, are Gold codes formed from positionwise modulo to summation of 38,400 chip segments of two binary m-sequences. The auto correlation-properties of an m sequence are illustrated in FIG. 3 in which the correlation function is shown on y axis 300. With a non-zero offset the maximum correlation output is proportional to the reciprocal of the spreading length, at −1/S where s is the spreading length. The spreading length is itself determined by the member of elements, n, in the shift register used to generate the code. The delay offset, T, between subsequent auto correlation peaks is given by the code length, S, multiplied by the chip period, $t_c$. With a large spreading factor 1/S will tend to zero and thus this code will approach the ideal characteristics of a zero auto correlation when not time-aligned. However at low spreading factors, which correspond to higher data rates, Interpath Interference (IPI) can become significant.

The capacity of CDMA systems is self-interference limited—that is the performance in terms of both capacity and quality of service, is determined to a large extent by the interference power arising from users within the same cell or in adjacent cells. It is therefore possible to improve the performance of CDMA systems by reducing this level of interference and there are a number of well known and accepted techniques for accomplishing this, including discontinuous transmission and the use of sectorised antennas. Interference within a cell can be mitigated to some degree based upon the recognition that signals from the base station to a terminal are synchronised and thus intra-cell MAI (Multiple Access Interference) can be mitigated by using codes which are orthogonal when aligned to within a chip period, such as the OVSF codes described above, or the Walsh codes used, for example, in IS95 (Interim Standard 95) CDMA phone networks in the USA. However in practice the time-dispersive nature of the mobile environment causes a significant loss of orthogonality, as described above, and a consequent increase in MAI. For example in a typical urban environment a loss of orthogonality of up to 40 percent may be observed. Inter-cell multiple access interference may also be observed.

As described above, it has been recognised that where the characteristics of the other (interfering) channels are known it is possible to suppress or remove the interference which they cause. In the case of other dedicated channels the terminal does not necessarily have any a priori knowledge of the channels but other techniques can be used. Thus the performance of a CDMA system can be improved by removing the interference contribution from the common channels as the characteristics of these are known, either explicitly or implicitly, at the terminal. The particular channels that will be referred to later are:

1. Common channels with a known spreading code and no (or known) modulation of the spreading codes, such as CPICH and SCH.

2. Common channels with a known spreading code, modulated with data, such as P-CCPCH.

3. Dedicated channels with a known spreading code (for which the self-interference can be cancelled), such as conventional single code transmissions, multicode transmissions, and transmit antenna diversity systems.

These channels have been selected for the purposes of illustration only and the techniques described later are not restricted to these channels.

Typical power levels for the dedicated and common channels, as specified by 3GPP, are summarised in Table 1 below (where the figure for SCH is bracketed because PCCPCH and SCH are time multiplexed).

TABLE 1

| Physical Channel | Power | | % of total energy |
|---|---|---|---|
| CPICH | CPICH_Ec/Ior | = −10 dB | 10% |
| PCCPCH | PCCPCH_Ec/Ior | = −12 dB | 6.3% |
| SCH (both primary and secondary) | SCH_Ec/Ior | = −12 dB | (6.3%) |
| PICH | PICH_Ec/Ior | = −15 dB | 3.2% |
| Dedicated channels | Remaining power | | 80.5% |

Perfect cancellation of CPICH, PCCPCH and SCH in a multi-cell interference environment would result in a capacity increase of 11%. However in addition to the performance improvement for an individual terminal the cancellation of the common channels would also allow more energy to be assigned to them with little or no degradation of overall system capacity. For example, assuming a ratio of intercell-2-intracell interference of 1.0 both CPICH and SCH/PC-CPCH could be increased by 3 dB whilst maintaining at least the same capacity as with a conventional system. This increase in power can result in improved acquisition, in the case of SCH, and in improved channel estimation and tracking, in the case of a stronger CPICH signal.

It is also possible to suppress the self interference caused by a dedicated channel. For high data rate transmissions a significant amount of power will usually be allocated to this channel, which will also generally be operating at a relatively low spreading factor. Both these aspects of the transmission will tend to increase the interpath interference and thus improved IPI cancellation techniques have the potential to provide significant performance improvement, albeit depending upon the multipath environment, the code correlation properties, and the proportion of power allocated to the desired dedicated channel.

Improved interference cancellation techniques applied to a mobile terminal benefit both the terminal manufacturer and the network/service operator. The terminal manufacturer is benefited because of the improved capability of the terminal to receive high data rate transmissions. The operator is benefited by being provided with a network that supports a higher downlink capability, either in terms of Erlangs/cell or in terms of the total data rate which can be supported, and can thus offer additional services.

In view of the foregoing discussion it will be appreciated that there is a general need for improved interference suppression techniques, particularly at the mobile terminal.

SUMMARY OF THE INVENTION

In a first aspect the invention provides a multicode receiver for receiving data carried by a plurality of spread spectrum signals having a corresponding plurality of spreading codes, the spreading codes being substantially mutually orthogonal, the receiver having intercode interference suppression, the receiver comprising; a multicode spread spectrum receiver to provide a set of data estimates comprising a plurality of estimates of data carried by said plurality of spread spectrum signals, one estimate for each said spread spectrum signal; a plurality of respreaders to respread said plurality of data estimates; and a plurality of interference suppressers, at least one for each of said plurality of spreading codes, each said at least one interference suppresser for each code being configured to suppress respread data estimates for the spread spectrum signals of the other codes, from a received signal.

The invention also provides a method of suppressing intercode interference in a multicode receiver for receiving data carried by a plurality of spread spectrum signals having a corresponding plurality of spreading codes, the spreading codes being substantially mutually orthogonal, the method comprising; using a multicode spread spectrum receiver to provide a set of data estimates comprising a plurality of estimates of data carried by said plurality of spread spectrum signals, one estimate for each said spread spectrum signal; respreading said plurality of data estimates; and suppressing, from a received signal for each code, the respread data estimates for the spread spectrum signals of the other codes.

The invention further provides an interference suppresser for a rake receiver, the rake receiver being configured for demodulating a first multicode signal from a received signal comprising a plurality of substantially orthogonal multicode signals, the interference suppresser comprising; a signal input for a received signal; a plurality of sets of interference estimate inputs, one set for each finger of the rake receiver, a plurality of outputs, one for each finger of the rake receiver, each output and each set of inputs being associated with a multipath component of the received signal, each set of inputs comprising inputs for interference estimates for each multicode other than the first multicode; a summer for each set of inputs to sum the interference estimates for each multicode; and a plurality of subtractors between the signal input and each said output, the subtractors between the signal input and a said output being configured to receive the summed sets of interference estimates from inputs associated with each multipath component except the multipath component with which the said output is associated.

The invention also provides a carrier carrying processor control code to implement the above described multicode receiver, method and interference suppresser. This processor control code may comprise computer program code, for example to control the digital signal processor, or other code such as a plurality of register values to set up a general purpose receiver integrated circuit to implement the above method or receiver. The carrier may comprise a data carrier or storage medium such as a hard or floppy disk, CD- or DVD-ROM, or a programmed memory such as a read-only memory, or an optical or electrical signal carrier. As a skilled person would appreciate the control code may be also be distributed between a plurality of coupled components, for example on a network. A skilled person would further recognise that the invention may be implemented by a combination of dedicated hardware and functions implemented in software.

The skilled person will appreciate that the above described aspects of the invention may be combined to suppress interference contributions arising from more than one source.

BRIEF DESCRIPTION OF THE DRAWINGS

These and other aspects of the invention will now be further described, by way of example only, with reference to the accompanying figures in which.

DETAILED DESCRIPTION

Without limitation, the types of channel interference from which can be cancelled in the terminal without knowledge of additional spreading codes are, in order of increasing complexity:

1. Common channels with a known spreading code and known or no modulation such as CPICH and SCH. As the modulating signal is known, this is the simplest approach.

2. Common channels with a known spreading code modulated by data, such as PCCPCH. To cancel the interference generated by these channels, the channel must be despread and demodulated to determine the transmitted data and then respread to form an estimate of the transmitted signal before the interference can be suppressed from the desired signal. However these channels generally have a significantly higher power and that of the desired dedicated channel from which the interference is to be suppressed, typically 5 dB higher, making it relatively straightforward to detect the channel or channels and suppress the interference.

3. Desired dedicated channel (s) with a known spreading code. The self-interference caused by IPI within a single code can be suppressed and in some cases, where the codes of more than one dedicated channel are known a priori, other interference may also be suppressed. Such a case arises when, for example, multiple codes are used to transmit a high data rate service to a single user and when multiple services are multiplexed onto different codes. Here, again, the interfering channel is despread, demodulated, and respread prior to cancellation of the interference. This technique can also be applied when the desired signal is transmitted in multiple streams, for example with space-time block coded transmit diversity (STTD). This can be accomplished by, at least in effect, having multiple banks of matched filters, one set perform the initial estimate and another to calculate a second estimate after the interference estimate has been removed. Multiple stages can also be employed, each stage calculating a progressively better estimate of the interpath interference contribution, and the final stage determining the symbol estimate which is output for use.

Figure 4:
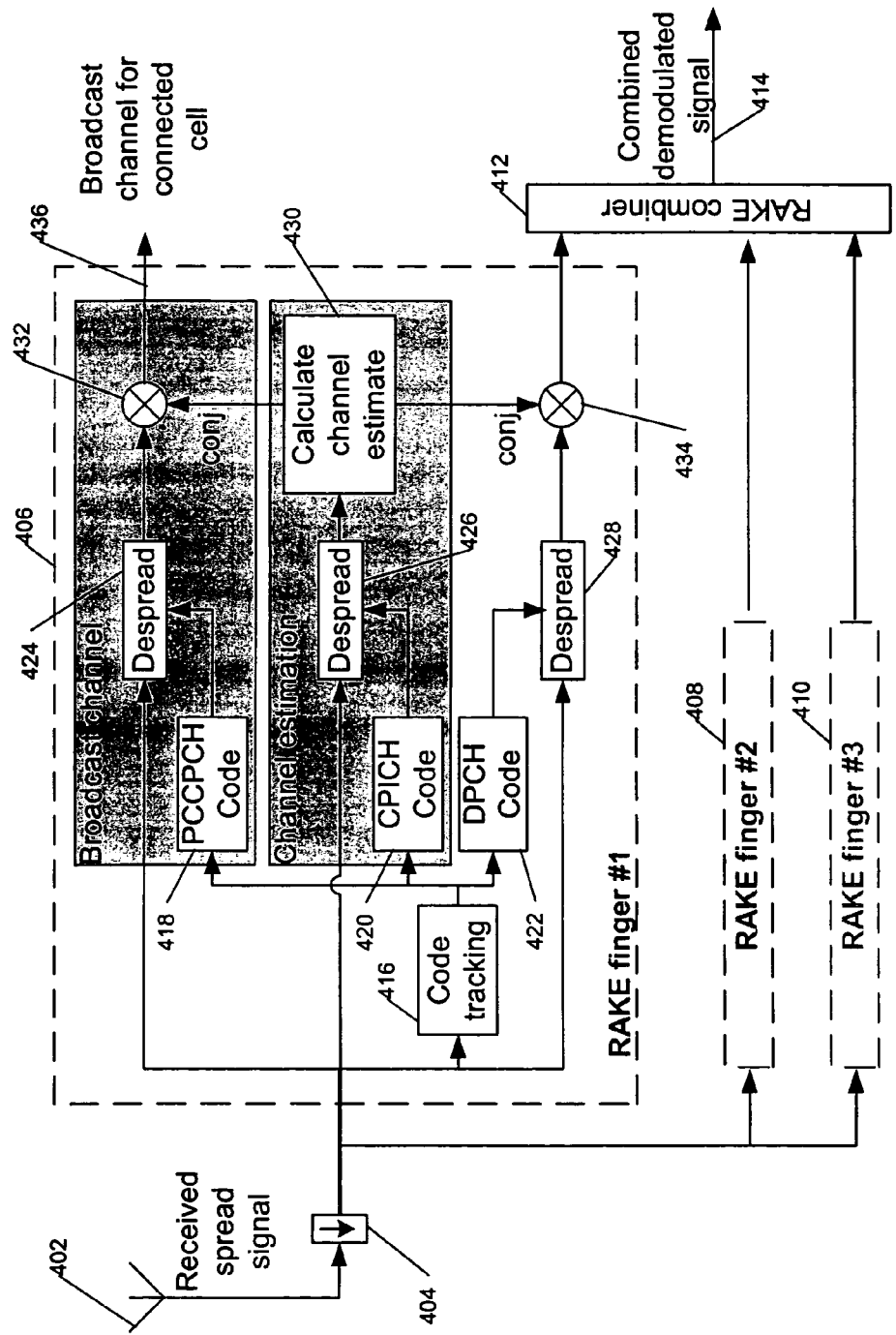
FIG. 4 shows a known W-CDMA rake receiver.

Referring now to FIG. 4, this shows a known W-CDMA rake receiver 400 in which CPICH is used to calculate a channel estimate for application to the demodulated dedicated data (DPCH) and broadcast (PCCPCH) channels. The receiver 400 has an antenna 402 to receive the spread spectrum signal for the DPCH (Dedicated Physical Data Channel), PCCPCH, and CPICH channels. The signal received by antenna 402 is input to a down converter 404 which down converts the signal to either IF (Intermediate Frequency) or base band for despreading. Typically at this point the signal will be digitised by an analogue-to-digital converter for processing in the digital domain by either dedicated or programmable digital signal processors. To preserve both magnitude and phase information the signal normally comprises I and Q channels although for simplicity these are not shown in FIG. 4. In this receiver, and generally in the receiver's described below, the signal processing in either the analogue or the digital domain or in both domains may be employed. However since normally much of the processing is carried out digitally the functional element drawn as blocks in FIG. 4 will generally be implemented by appropriate software or, where specialised integrated circuits are available for some of the functions, by appropriately programming registers in these integrated circuits to configure their architectural and/or functionality for performing the required functions.

Referring again to FIG. 4, the receiver 400 comprises 3 rake fingers 406, 408 and 410 each having an output to rake combiner 412 which provides a combined demodulated signal output 414 for further processing in the mobile terminal. The main elements of each rake finger correspond and, for simplicity, only the elements of rake finger 406 are shown.

A code tracker 416 is coupled to the input of rake finger 406 to track the spread spectrum codes for despreading. Conventional means such as a matched filter or an early-late tracking loop may be employed for code tracker 416 and since the DPCH, PCCPCH and CPICH channels are generally synchronised the code tracker 416 need only log on to one of these signals but normally CPICH because this generally has a relatively high signal level. The output of the code tracker 416 controls code generators for PCCPCH 418, CPICH 420, and DPCH 422 which generate spreading codes for cross-correlation with their corresponding channel signals to despread the spread spectrum signals. Thus three despreaders 424, 426, 428 are provided, each coupled to the rake finger input, and each receiving an output from one of the code generators 418 420, 422 to despread the appropriate signal (both channelisation and scrambling codes). As the skilled person would appreciate these despreaders will generally comprise a cross-correlator such as a multiplier and summer.

The CPICH pilot signal is unmodulated so that when it is despread the result is a signal with a magnitude and phase corresponding to the attenuation and phase shift of the multipath channel through which the CPICH signal locked onto by the finger of the rake receiver has been transmitted. This signal thus comprises a channel estimate for the CPICH channel, in particular for the multipath component of this channel the rake finger has despread. The estimate may be used without further processing but, preferably the estimate is averaged over time, over one or more symbol intervals, to reduce noise on the estimate and increase its accuracy. This function is performed by channel estimate 430. It will be appreciated although averaging over a long period will reduce the level of noise, this will also reduce the ability of the receiver to respond quickly to changing channel conditions such as are encountered when, for example, the receiver is operating in a terminal in a car on a motorway.

The channel estimate is conjugated to invert the phase and if necessary normalised so that zero attenuation corresponds to a magnitude of unity, and in this form the conjugated signal can simply be used to multiply another received signal to apply or compensate for the channel estimate. Thus multipliers 432 and 434 apply the channel estimate from channel estimate block 430 to the broadcast control channel PCCPCH and to the desired data channel DPCH respectively. The desired data channels are then combined by rake combiner 412 in any conventional fashion and the broadcast channel outputs from each finger, such as broadcast channel output 436 from rake finger 406, are also combined in a second rake combiner (not shown in FIG. 4) to output a demodulated PCCPCH control channel signal.

Figure 5:
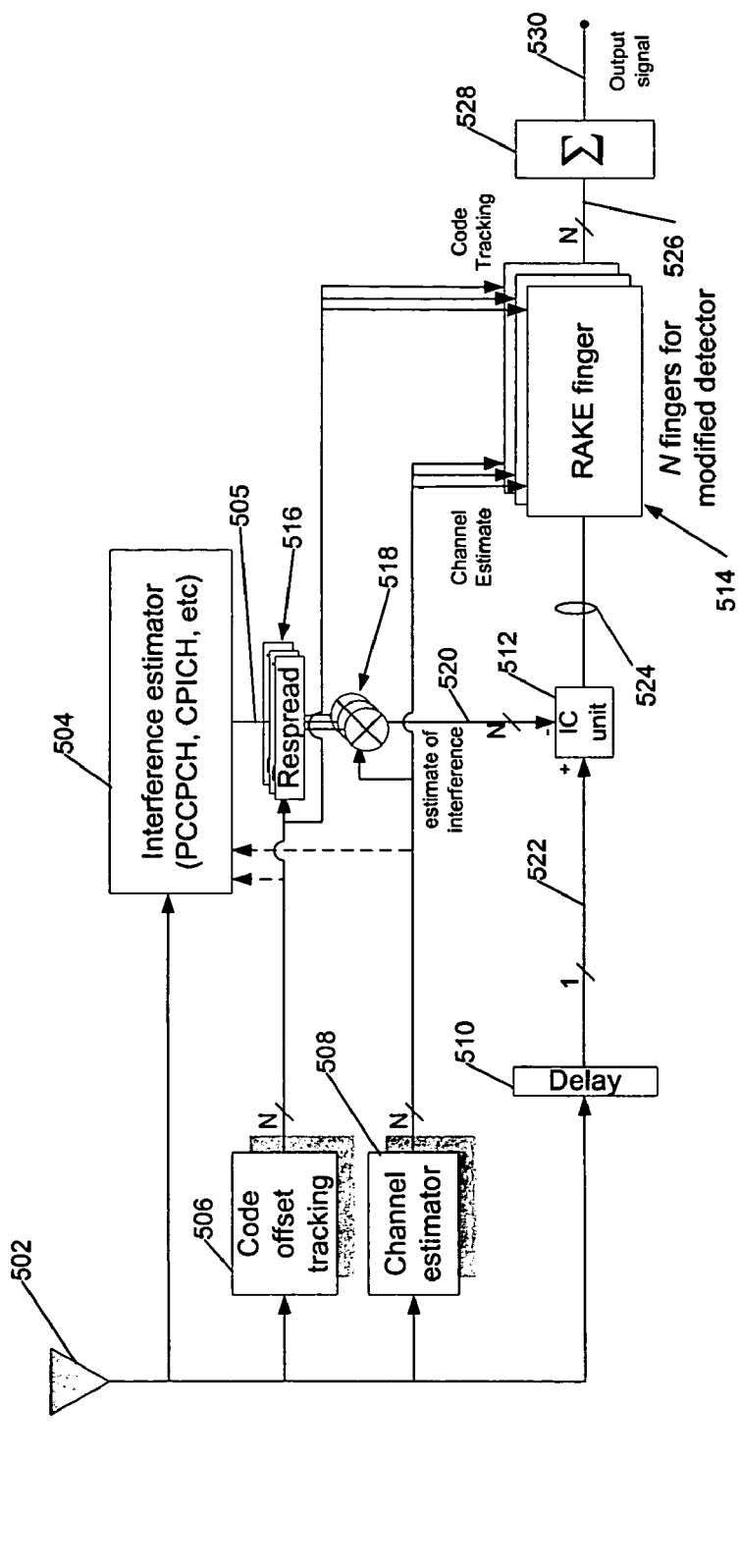
FIG. 5 shows a generalised structure for a W-CDMA rake receiver with interference cancellation at chip level.

Referring next to FIG. 5, this shows a modified spread spectrum rake receiver 500 with provision for interference cancellation at the chip level. The general arrangement of FIG. 5 is suitable for cancelling interference from common channels of a 3G system such as the CPICH, SCH and PCCPCH channels described earlier. The elements and architecture of the receiver of FIG. 5 can also be incorporated into other more complex spread spectrum receivers and examples of this are given later. Normally the interference contribution from a control channel to a dedicated data channel will be removed as the signal power of the control channels is likely to be higher than that of the dedicated data channel but, in principle, the technique could be used to remove dedicated channel interference from a control channel. The receiver of FIG. 5 is configured to suppress the interference from one channel, for example a control channel, with one spreading code to another channel, for example a dedicated channel, with another substantially orthogonal spreading code. However because the codes are substantially orthogonal there is no need to subtract one signal from another within a multipath component since, to a first approximation, there is no interference within a multipath component since all the signals are orthogonal. However a lack of orthogonality arises between multipath components, because these components take different paths from a transmitter and thus arrive at the receiver with different delays, and this is primarily the interference which the receiver of FIG. 5 is intended to suppress—the interference between two signals with notionally orthogonal spreading codes arriving at the receiver in two different multipaths components.

As will be described later, it is also possible to suppress the IPI interference contribution from a common channel onto itself. In this case an initial estimate of the interference may be formed, removed from the received signal, and then an improved estimate of the common channel, as well as of the dedicated channel, may be formed.

Referring to FIG. 5 in more detail the receiver comprises an antenna 502 and down converter (not shown) in the manner of a conventional spread spectrum receiver. The received signal is then passed to an interference estimator 504, a code offset tracking block 506, a channel estimator block 508, and a plurality of rake fingers, 514 via a delay element 510 and an interference cancellation unit 512. The code offset tracking block 506 tracks N multipath components of the received signal, providing N outputs for interference estimator 504 and for rake fingers 514 and for a plurality of respreaders 516. Each of the N multipath components has a different delay associated with it and thus the code tracking block 506 is configured to effectively provide N tracking loops, one for each multipath component to be processed by the rake receiver. In a similar way channel estimator 508 provides a plurality, N of channel estimate outputs, one for each multipath component to be processed. The channel estimator 508 comprises a plurality of CPICH code generators and a corresponding plurality of despreaders and preferably therefore also receives N code tracking inputs (not shown) from code offset tracking block 506. Thus the channel estimator 508 may operate in a conventional manner, for example using a plurality of channel estimators each as described with reference to FIG. 4.

The function of the interference estimator 504 is to provide an estimate of the relevant transmitted signal, at the symbol level where the signal is modulated. Where an estimate of CPICH is required the interference estimator can, in effect, be dispensed with since the despread version of the CPICH signal is, broadly speaking, the same as the signal provided by the channel estimator 508. Where the interference from a more complex signal to be estimated the interference estimator may comprise a plurality of rake fingers or effectively another rake receiver. It will therefore be appreciated that the interference estimator will require inputs from code tracker 506, for each rake finger of interference estimator, and from channel estimator 508, to apply a channel estimate to the rake finger outputs, where more complex signals such as PCCPCH or multicode signals are to be estimated. The interference estimator has an output 505 which may comprise a single bit line, for example from a hard bit decision output of a rake receiver combiner or it may comprise a plurality of bit lines comprising, for example separate outputs from a plurality of rake fingers in interference estimator 504. In this latter case an input from channel estimator 508 may not be required by interference estimator 504 since the channel estimate may be implicit in the soft bit decision outputs. It will also be appreciated that where interference estimator 504 comprises a rake receiver this receiver need not have the same number of rake fingers and the number of rake fingers 514.

The output 505 from interference estimator 504 provides and input to the plurality of respreaders 516. Output (or outputs) 505 comprises one (or more) estimate (s) of one or more transmitted signals such as CPICH, PCCPCH and the like, at symbol level. These are respread by respreaders 516, with the appropriate delays for the different multipath components decoded by rake fingers 514 to provide a plurality of interference estimation outputs each comprising an estimate of the appropriate transmitted signal with a delay corresponding to the delay of a multipath component from the transmitter to the receiver. However the multipath components do not all arrive at the receiver with the same signal level (or phase) and thus a correction is made for the relative power of the multipath components by multiplying the estimates by the corresponding outputs from channel estimator 508 in a plurality of multipliers 518. The result is a plurality of interference estimates 520, preferably one for each multipath component of the received signal to be processed by rake fingers 514.

The plurality of interference estimate signals 520 provides a plurality of inputs to interference cancellation units 512. A further input 522 to the interference cancellation unit 512 is provided by the received signal, delayed by delay element 510 to take account of the delay introduced by the interference estimation process. The interference cancellation unit 512 has a plurality of outputs 524, one for each multipath component, comprising a plurality of versions of the input signal from which the relevant interference estimates have been subtracted or suppressed. The interference cancellation unit 512 will be described in more detail below but, broadly speaking from any one multipath component at the estimated interference contributions from all the other multipath components are suppressed or removed (there being no need to remove the estimate from the multipath component itself because within any one multipath component the signals are substantially orthogonal). The outputs 524 of the interference cancellation unit 512 provide inputs to the rake fingers 514, each output being provided to a corresponding rake finger. The rake fingers also have one input each from the code tracking block 506 and from the channel estimator 508 so that each rake finger has an input from which the relevant interference estimates have been suppressed and a channel and code tracking offset appropriate to the multipath component the rake finger is processing. The rake fingers 514 have N rake finger outputs 526 which provide inputs to a rake combiner 528 which, in turn, provides a combined (interference suppressed) output signal 530. The rake combiner 528 may operate in any conventional manner such as equal-gain combining or maximal-ratio combining.

The receiver of FIG. 5 illustrates a general form of common channel interference suppression in which, broadly speaking, the interference contribution is estimated, respread, and then subtracted from the desired signal. Broadly speaking the code tracker 506 calculates the delay of one code relative to another and this is then weighted by the appropriate channel estimate and subtracted. Where the "interfering" signal is modulated with data the interference estimator 504 determines an estimate for what this data is so that the data can be respread appropriately. Where the "interfering" signal is unmodulated, and thus carries no data, this step can, however, be omitted. It will be appreciated that some form of code tracking must be applied to the received signal although it is also possible to repeat the code tracking after the input signal has been processed to provide a more accurate determination of the relevant multipath delays. Such a later, improved estimate is to be determined preferable not to cancel orthogonal signals from one another within a multipath component since these do not substantially interfere with one another and since if, for example, the CPICH pilot signal is removed entirely at an early stage in the processing this signal will not be available later for a code tracker to lock onto.

The options for "full" as opposed to "partial" cancellation will be described later but even where "full" cancellation (i.e. of all components even substantially orthogonal components) is applied it is preferable to add back in at least a portion of an orthogonal signal to simplify later code tracking, channel estimation and other functions.

The inventors have also recognised that because despreading is a linear operation it is also possible to cancel the interference effects after despreading has occurred. In this case the signal is despread, the interfering is calculated, and then the cross-correlation between the desired and interfering signal codes (and if appropriate, channel estimates) are applied to this interfering signal before it is subtracted from the desired signal at the symbol level. An example of the operation of interference cancellation at the symbol level will now be described with reference to the CPICH pilot signal, although the skilled person would appreciate that the broad concept is applicable to the cancellation of interference from other signals because of the linear nature of the despreading correlation operation. However since the spreading code may span multiple symbols the cross-correlation between the desired and interfering signals may need to be recalculated each symbol.

It is helpful to consider the mathematics behind interference cancellation at the symbol level and an example will be given of the symbol level interference cancellation using the CPICH pilot signal.

Consider a received signal r(t) which comprises the transmitted data convolved with a channel response c(t). The receiver will be assumed to receive a signal comprising, in a simple example, a single stream of data b(n) spread by a code $s_D$ together with a pilot channel $s_{P(t)}$ where the $_n$ denotes the signal at symbol interval n.

$$r(t) = c(t) * (b^n s_D^n(t - nT) + s_P^n(t - nT)) \quad \text{Equation 1}$$

$$= \sum_{l=1}^{L} c_l^n (b^n s_D^n(t - nT - \tau_l) + s_P^n(t - nT - \tau_l))$$

This channel convolution occurs over the L multipath components present. The (despread) matched filter output is denoted by y(t) and is formed by multiplying the received signal by the desired spreading code, in this case sd(t), so that y(t) is then given by:

$$y(t) = r(t) s_D(t) \quad \text{Equation 2}$$

$$= c(t) * (b^n s_D^n(t - nT) + s_P^n(t - nT)) s_D(t)$$

In particular consider the sampled match filter output $y_k^n$ for a single multipath, k, which corresponds to the spreading code at that delay offset multiplied by the received signal:

$$y_k^n = s_D^n(t-nT-\tau_k)\sum_{l=1}^{L}c_l^n(b^n s_D^n(t-nT-\tau_1)+s_P^n(t-nT-\tau_1))$$

$$= c_k^n b^n + b^n s_D^n(t-nT-\tau_k)\sum_{\substack{l=1 \\ l\neq k}}^{L}c_l^n s_D^n(t-nT-\tau_1)+s_D^n(t-nT-\tau_k)\sum_{l=1}^{L}c_l^n s_P^n(t-nT-\tau_1)$$

Equation 3

Equation 3 has three terms, the first corresponding to the desired component, the second corresponding to the self interpath interference between the desired code on the desired multipath and the desired code on different multipaths, that is when k is not equal to 1. The final component in equation 3 is the cross-correlation interference between the desired data code and the interfering pilot code. It will be appreciated that the cross-correlation when k equals 1, that is, on the same multipath, is zero due to the orthogonality properties of the OVSF codes.

With common channel cancellation, in this example for the case of CPICH, an estimate of the channel is formed, denoted $\hat{c}_l^n$ for sample n and multipath 1. This channel estimate is respread with the pilot code sp(t) and subtracted from the desired signal so that $y_k^n$ is given by:

$$y_k^n = s_D^n(t-nT-\tau_k)\sum_{l=1}^{L}[c_l^n b^n s_D^n(t-nT-\tau_1)+c_l^n s_P^n(t-nT-\tau_1)-\hat{c}_l^n s_P^n(t-nT-\tau_1)]$$

$$= c_k^n b^n + b^n s_D^n(t-nT-\tau_k)\sum_{\substack{l=1 \\ l\neq k}}^{L}c_l^n s_D^n(t-nT-\tau_k)+s_D^n(t-nT-\tau_k)\sum_{l=1}^{L}(c_l^n-\hat{c}_l^n)s_P^n(t-nT-\tau_1)$$

Equation 4

Again three terms result, the first and second terms being identical to the first and second terms of Equation 3. The third term of Equation 4 now comprises the new pilot channel interference, which will be zero if a good channel estimate has been formed, that is, if at $c_l^n - \hat{c}_l^n$ equals zero.

Expanding Equation 4, the following expression results:

$$y_k^n = c_k^n b^n + b^n s_D^n(t-nT-\tau_k)\sum_{\substack{l=1 \\ l\neq k}}^{L}c_l^n s_D^n(t-nT-\tau_1)+$$

$$s_D^n(t-nT-\tau_k)\sum_{l=1}^{L}c_l^n s_P^n(t-nT-\tau_1)-$$

$$s_D^n(t-nT-\tau_k)\sum_{l=1}^{L}\hat{c}_l^n s_P^n(t-nT-\tau_1).$$

Equation 5

In Equation 5 the first two terms are identical to the first two terms of Equation 4 that the third term of Equation 4 has been expanded and the subtracted interference contribution has been written out explicitly in the final term of Equation 5. It can be seen that this final term comprises a cross-correlation of the desired data and pilot channel codes (without a data term b(n)) and that the summation includes a k equals 1 term although, strictly speaking, this term is not necessary as it is zero. It can be seen from Equation 5 that symbol level interference cancellation can be achieved by subtracting the unwanted component after the desired signal has been respread, in other words by subtracting the unwanted component from the symbol level desired signal. The signal comprising the unwanted interference component can be formed by multiplying the desired code, at an offset corresponding to the desired multipath, by the unwanted code, at an offset corresponding to the unwanted multipath.

Figure 6:
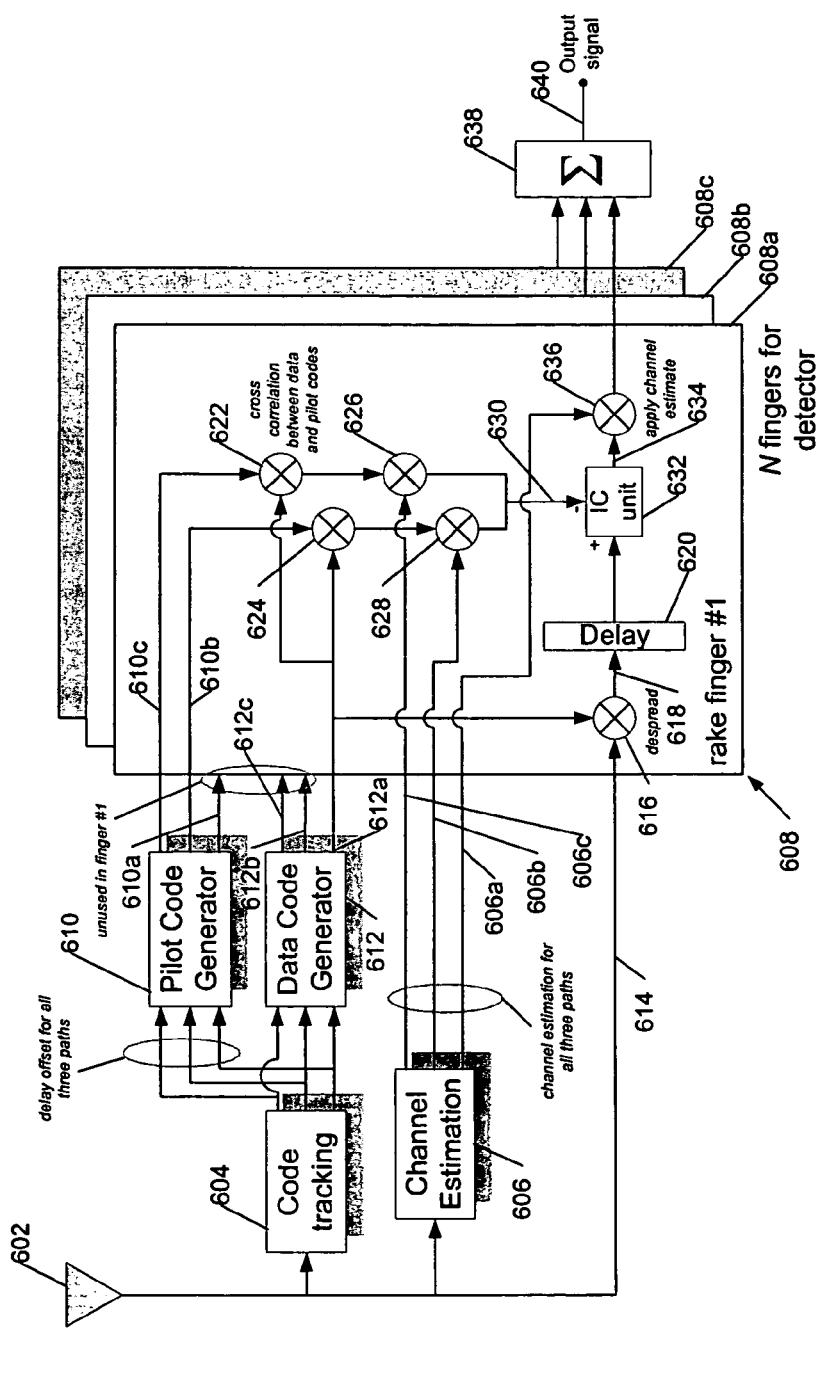
FIG. 6 shows a W-CDMA rake receiver with interference cancellation at symbol level.

FIG. 6 shows a W-CDMA rake receiver 600 with symbol-level interference cancellation for three multipath components, showing detail of one of the receiver's rake fingers.

The receiver 600 comprises an input antenna 602 to receive an input signal which is provided to code tracking block 604, channel estimation block 606 and the three (in this example) rake fingers 608. The code tracking block 604 tracks the codes of three multipath components of the input signal and provides three corresponding outputs comprising the delay offset for these three multipaths. The outputs of the code tracking blocks provide inputs to a pilot code generator 610 and a data code generator 612. The pilot code generator 610 generates three versions of the pilot (CPICH) code, one for each multipath component processed by the receiver, the three versions of the code having delay offset corresponding to the multipath components. Output 610a from the pilot code generator 610 is for the first multipath component, output 610b is for the second multipath component and output 610c is for the third multipath component. Likewise generator 612 provides three versions of the data channel spreading codes, one for each multipath components. Output 612a of the data code generator 612 is for the first multipath component, output 612b for the second multipath component, and output 612c for the third multipath component. In the illustrated embodiment of receiver 600 there are three rake fingers, 608a, 608b, and 608c each having substantially the same functionality but receiving different sets of input signals. All the rake fingers receive an input signal 614 from antenna 602 and all the rake fingers a channel estimate 606a, 606b, 606c, for each multipath. Rake finger 608a despreads the first multipath component of the received signal and receives a version of the data channel spreading code 612a with the appropriate offset for the first multipath component from the data code generator 612. Rake finger 608a also receives versions of the pilot spreading codes with delay offset corresponding to all the other multipath components, in this case the second and third multipath components, on lines 610*b* and 610*c*. In general each rake finger receives a version of the data code with an offset corresponding to the multipath component the rake finger is processing and versions of the pilot code for all other multipath components.

Rake finger 608 will now be described in more detail; the other rake fingers correspond. Received signal input 614 is correlated with a version of the data code 612*a* with an appropriate offset for the first multipath component of the received signal using cross-correlator 616 to provide a symbol-level output 618 which is delayed by delay unit 620 to align the despread received signal and interference estimate. The cross correlators 622 and 624 cross-correlate a version of the data spreading code 612*a* for the multipath signal processed by the rake finger with respective versions of the pilot code spreading signal 610*c* and 610*b* for the other multipath components for which interference estimates are being calculated. The respective outputs from the cross-correlators 622 and 624 are then multiplied by channel estimates 606*c* and 606*b* in multipliers 626 and 628 respectively and the results combined (summed) to form the final term of Equation 5 on line 630. For simplicity the same symbol has been used for the cross-correlators and for the multipliers although as the skilled person would understand, cross-correlation involves multiplication and summation. Similarly although, for convenience, the final term of Equation 5 has been referred to as being present on "line 630" in practice the rake finger is likely to be implemented in software and the interference term may therefore not be present on a single physical line in the way drawn but rather may exist as an intermediate term in a calculation, for example stored in a register.

It will be appreciated that because of the cross-correlation performed by cross-correlators 622 and 624 the interference estimate 630 is a symbol-level estimate and, as mentioned above, the delayed signal 618 is also a symbol-level signal. An interference cancellation unit 632 operates to subtract the symbol-level interference estimate from the symbol-level received signal to provided a symbol-level output from which the interference has been suppressed. The channel estimate for the first multipath component 606*a* is then applied to this symbol-level signal by multiplier 636 and the result provides one input to a rake combiner 638. Other inputs to rake combiner 638 are from the other rake fingers 608*b* and 608*c* and the signal from the three rake fingers is combined to provide a demodulated output signal 640.

In the receiver 600 of FIG. 6 the interference estimator in effect comprises the pilot and data code generators 610, 612 and the correlators 622, 624 and multipliers 626, 628. It will be recognised that the pilot code generator 610 could be replaced a different code generator to cancel interference from a different signal. Likewise for a data-carrying signal such as PCCPCH code generator 610 could be replaced by means to estimate a respread version of the data for each multipath component; such a procedure is described later in the context of PCCPCH interference cancellation.

The architecture of FIG. 6 is, in some ways, more complex than that of FIG. 5 as both the desired signal and the interfering signals are despread. However the receiver is often easier to implement in practice as the cross-correlation performed by each of cross-correlators 622 and 624 simply involves multiplying two binary spreading codes which can easily be performed by means of a modulo-2 edition. Furthermore in embodiments the cross-correlation matrix may be precalculated for a number of delay offsets. The interference contribution may then be averaged over one symbol and subtracted from the finger output, also averaged over one symbol, thus reducing the complexity of the interference cancellation unit 632.

Figure 7B:
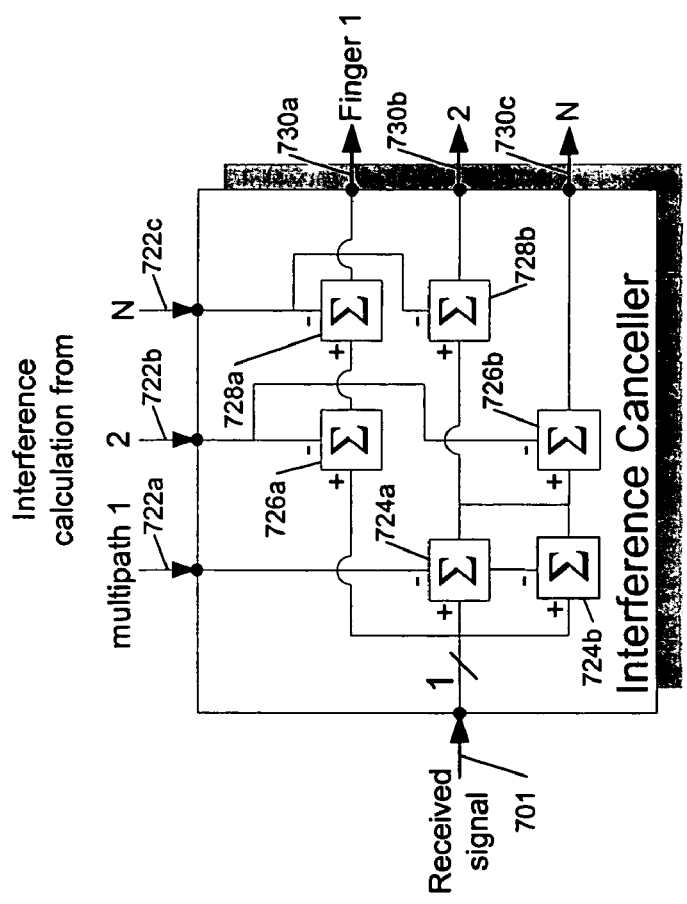
FIGS. 7a to 7e show structures of interference cancellers with (a) full cancellation, (b) parallel cancellation, (c) serial cancellation (d) hybrid serial-parallel cancellation, and (e) hybrid full cancellation.
Figure 7A:
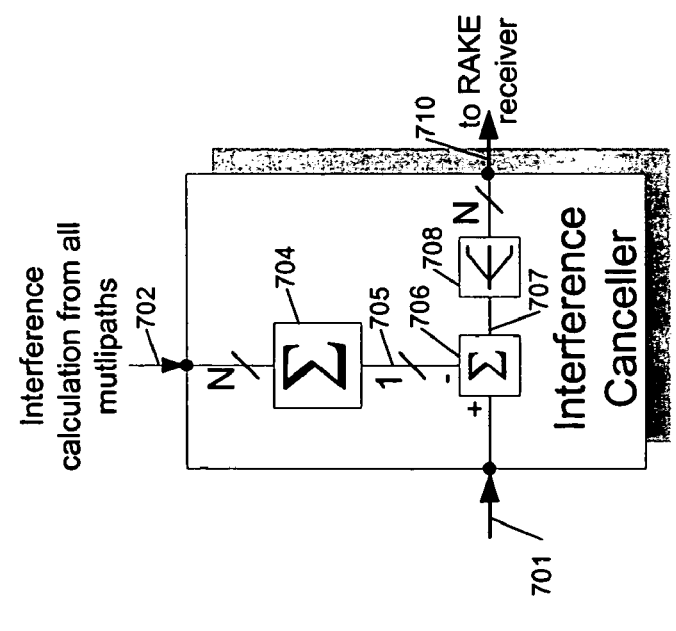
Figure 7D:
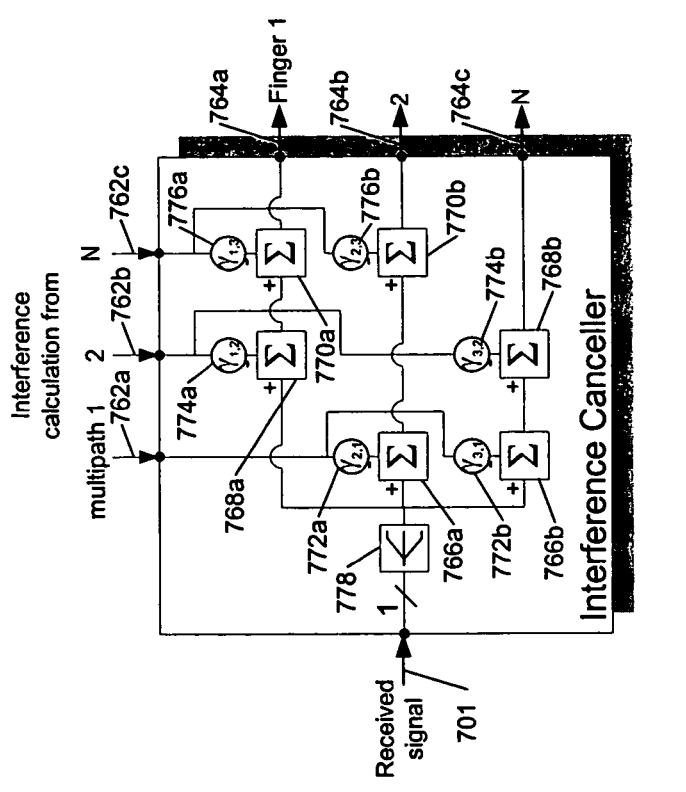
Figure 7C:
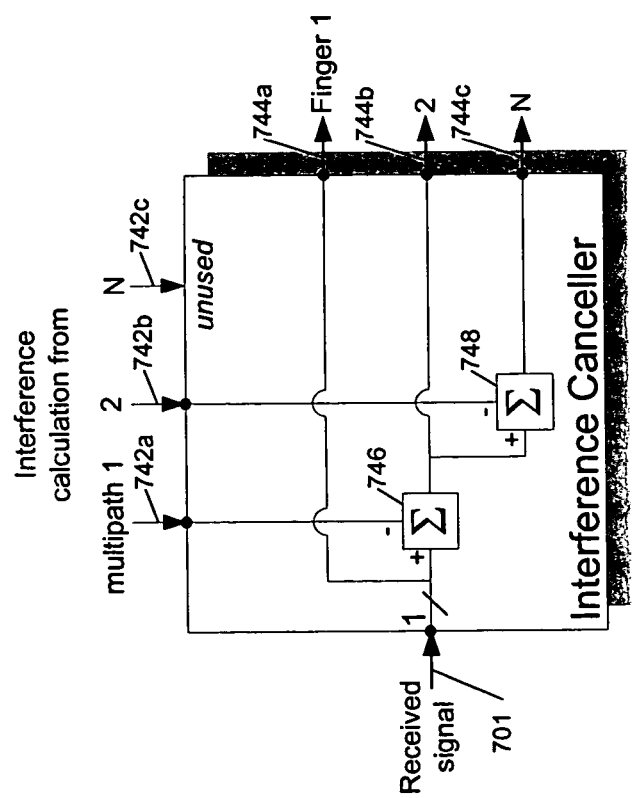
Figures 7E, 8:
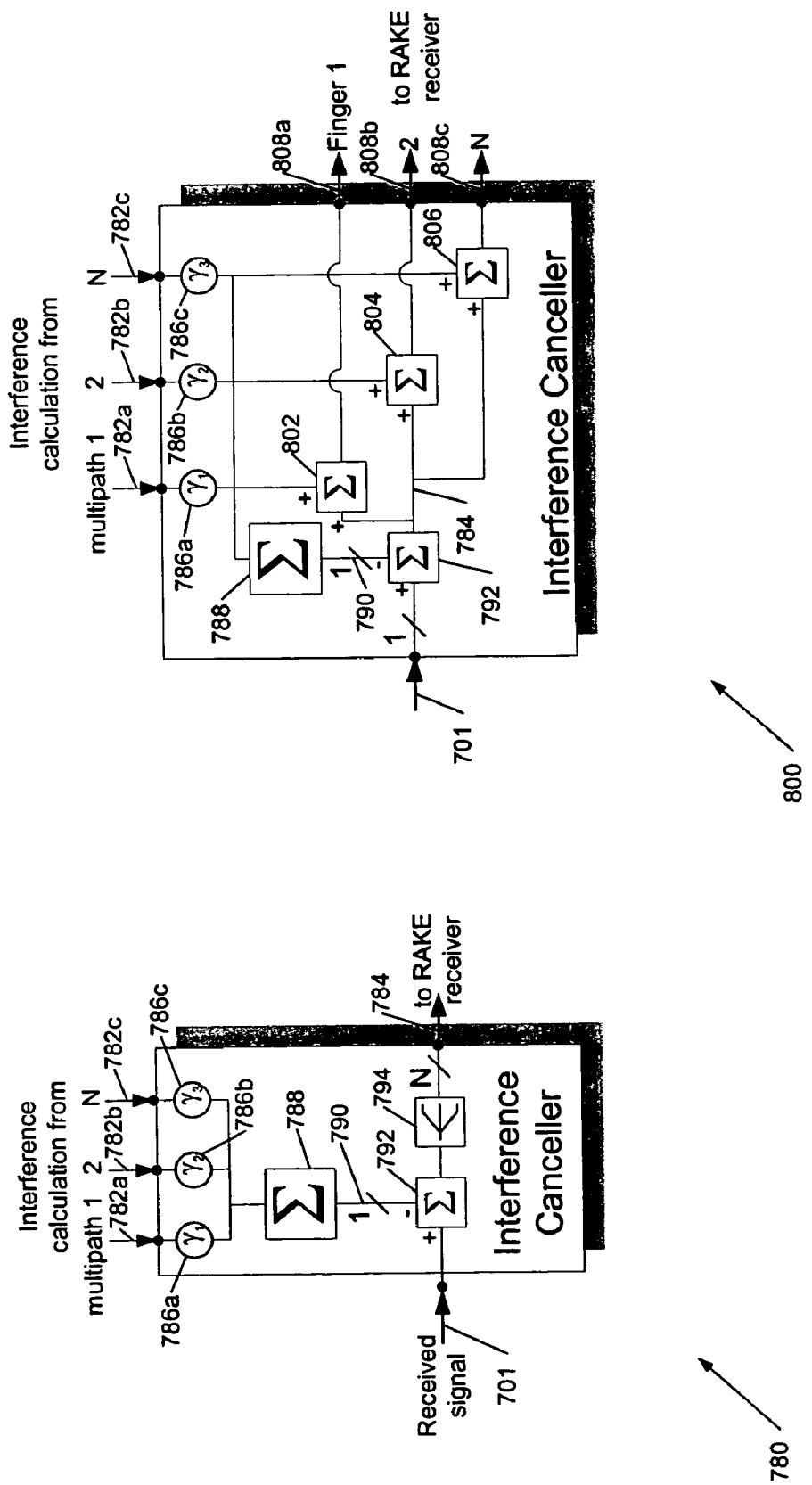
FIG. 8 shows an alternative hybrid interference cancellation unit structure.

Interference cancellation units suitable for the receivers of FIG. 5 and FIG. 6 are shown in FIGS. 7 and 8 and will now be described in more detail. In general the interference cancellation unit can be selected in accordance with the required performance-complexity trade off, the quality of the channel estimates and interference estimates available in the receiver design, and the configuration of the wireless channel. The techniques which will be described below can be applied to both chip-level and symbol-level cancellation. However where symbol-level cancellation is employed it is less important to ensure that the interfering signal for the desired multipath component is left on the desired multipath component-which implies, it is less important to employ a version of serial or parallel cancellation—and thus the simpler full or hybrid full cancellation technique described below can be employed.

Referring first to FIG. 7*a*, this shows a simple interference cancellation structure 700 which interference contributions 702 from all the multipath components are summed in a summer 704 before being subtracted, by a subtractor 706, from the received signal 701. The single output from subtractor 706 is then split by splitter 708 into a plurality of outputs 710, one for each finger of the rake receiver, that is one for each multipath component processed by the receiver. It will be appreciated that the summation and subtraction may be operations in software rather than hardware and thus, for example, subtractor 706 may comprise a subtraction operation to subtract an output 705 from summation 704 from the received signal 701 to give a result 707.

In the configuration of FIG. 7*a* since the same signal is subtracted from the input to all the rake receiver fingers the number of operations required per sample (for N fingers) is given by N complex multiplications (for respreading and applying the channel estimates), one complex summation of N inputs, and one subtraction. However if the spreading code is binary then the N complex multiplications for respreading become N complex additions.

The approach of FIG. 7*a* sums the interference signal even when it has the same delay as the desired multipath component. This does not provide any performance improvement as the interferer, for this component, will be orthogonal to the desired signal. This can be seen from the fact that no intracell interference occurs in a single path channel as all the codes are substantially orthogonal to one another. The same reasoning applies when considering removal an interfering signal on a particular path from the desired signal on that path—as these two signals are orthogonal there is again substantially no performance improvement to be realised. This approach also has the disadvantage that the interference suppressed output cannot be used in a subsequent rake finger where, for example, a CPICH signal is required by the finger to recalculate a channel estimate.

FIG. 7*b* shows a second interference canceller 720 which applies parallel cancellation of the interfering signals, that is the interference contribution from one multipath is not removed or suppressed from that multipath component of the received signal but is removed or suppressed from all the other multipath components of the received signal. Thus in FIG. 7*b* interference canceller 720 has a plurality of interference estimate inputs 722*a*, 722*b*, 722*c* and a plurality of subtractors 724*a*, 724*b*, 726*a*, 726*b*, 728*a*, 728*b*. Each interference input, such as input 722*b*, has a plurality of associated subtractors, such as subtractors 726*a*, 726*b* to subtract the interference estimate from the relevant multipath component of the received signal 701. The interference canceller has outputs 730, one output 730a, b, c for each finger of the rake receiver. Thus, for example, output 730b comprises the received signal 701 from which the interference estimate 722a from multipath 1 and the interference estimate 722c from multipath N have been subtracted by subtractors 724a and 728b.

The interference canceller 720 of FIG. 7b has a similar performance to the full canceller 700 of FIG. 7a but leaves orthogonal "interference" signals on each multipath component available for later processing. The interference canceller 720 of FIG. 7b is, however, more complex, requiring an increased number of calculations as compared with the canceller 700 of FIG. 7a. For each sample the canceller 720 requires N complex multiplications for respreading and applying the channel estimate (or additions for a binary spreading code) and $$(N-1) + \sum_{i=1}^{N-1} \text{complex subtractions (additions)}.$$

Referring next to FIG. 7c this shows an interference canceller 740 with a serial or successive cancellation architecture. The interference canceller 740 may be employed to subtract interference contributions only from multipaths that have a larger signal power than the desired multipath, in the form of a successive cancellation. Thus the multipath components are in effect labelled so that multipath 1 has the strongest signal, multipath 2 the next strongest signal, and multipath N the weakest signal—in other words the multipath components are arranged in order of signal strength magnitude. An approximate interference cancellation can then be effected by cancelling the interpath interference effects of multipath 1 on paths 2 and 3 and by cancelling the interference effect of path 2 on path 3, although ignoring the IPI effects of paths 2 and 3 on path 1. Thus in FIG. 7c an output 744a for a first multipath component simply comprises the received signal 701, an output 744b for a second multipath component, that is for a second rake finger, has an interference contribution estimate 742a from the first multipath component subtracted from it by subtractor 746. Likewise an output 744c for the Nth multipath component (in this case the third multipath component for the third rake finger) has an interference estimate 742b from the second rake finger subtracted, by subtractor 748, from the signal output 744b which has already had the interference estimate 742a from the first multipath component subtracted from it.

The arrangement of FIG. 7c will result in a slightly poorer performance as compared with the interference canceller 720 of FIG. 7b, but the architecture is simpler requiring, in operations per chip for n fingers, N−1 complex multiplications for respreading and applying the channel estimate (or additions) for a binary spread code and N−1 complex subtractions (that is 2+1+0 in the case of canceller 740 of FIG. 7c). However where two or more multipaths have a similar magnitude and/or where the ordering of the strongest path to the weakest path is expected to vary rapidly, for example due to shadowing and multipath fading, the interference canceller 740 of FIG. 7c is generally not to be preferred.

FIG. 7d shows an interference canceller 760 with a hybrid architecture comprising elements of both parallel and successive cancellation. Broadly speaking the architecture of interference canceller 760 corresponds to that of interference canceller 740, with a plurality of interference estimate inputs 762a, b, c for a plurality of multipath components, and a plurality of interference suppressed outputs 764a, b, c for processing by a corresponding plurality of rake fingers to extract the plurality of multipath components. Likewise each of the interference estimate inputs has an associated set of subtractors to subtract the estimate of one multipath signal from the signals for all the other multipath components. Thus input 762a has associated subtractors 766a, b; input 762b has associated subtractors 768a, b; and input 726c has associated subtractors 770a, b. Equivalently each output may be viewed as having an associated set of subtractors as in for example output 764b and associated subtractors 766a and 770b. However the interference canceller 760 of FIG. 7d has a weighting means associated with each of the subtractors to weight the interference contribution estimate prior to subtracting it from the appropriate multipath component. Thus subtractors 766a, b have associated weights, 722a, b; subtractors 768a, b have associated weights 774a, b, and subtractors 770a, b have associated weights 776a, b. The weighting means each operate to multiply an input by a weight, preferably a real weight, to provide a scaled version of the input signal. The weighting means may comprise a hardware multiplier or a software multiply operation. The architecture of FIG. 7d is referred as hybrid because, depending upon the applied weights, interference canceller 760 may resemble either interference canceller 720 or interference canceller 740. As shown in FIG. 7d, the interference canceller may also include a splitter 778 to split the received signal 701 into a plurality of components for subsequent processing to suppress interference.

The architecture of FIG. 7d facilitates minimisation of the impact of poor quality channel estimates on the overall cancellation performance. Thus an interference contribution estimate can be weighted depending upon whether multipath component from which it derives has a good or a poor signal quality, such as a high or low carrier to interference and noise ratio. If a signal channel or multipath component has a poor signal level in general a poor interference estimate will result and subtracting this poor estimate from the received signal could introduce rather than suppress interference. In this situation, therefore, it is preferably to subtract only a proportion or scaled version of the interference contribution estimate, since this is likely to improve the overall received signal, but will not introduce excessive degradation should the estimate prove bad. Conversely if an interference contribution estimate has been derived from a strong signal, the estimate can be cancelled substantially completely from the received signal because there is a high degree of confidence that the estimate is correct.

In the interference canceller 760 of FIG. 7d each IPI interference contribution estimate can be subtracted from any multipath component (except for the one from which it derives). Before the subtraction occurs a weighting, $\gamma_{x,y}$ is applied where x is the desired rake finger and y is the multipath which is causing the interference. If $\gamma$ is set to 1 the interference canceller of FIG. 7d is equivalent to parallel cancellation with the weights all at zero the system resembles a conventional rake receiver, and the canceller can likewise be reconfigured to act as a serial or successive canceller in the manner of FIG. 7c. As mentioned, one advantage of the architecture is that poor quality interference estimates can be given a low or zero weight and better interference estimates can be given a greater weight. Cancellation of an interfering multipath on the same rake finger, that is for example cancellation of an estimate from multipath 1 from the signal for the rake finger processing the first multipath component, can be included but is preferably omitted as it serves no purpose. Thus $\gamma_{1,1}=\gamma_{2,2}=\gamma_{n,n}=0$.

In embodiments where the reduction of power consumption is important weights can be effectively be set at zero where possible or appropriate so that the associated subtraction need not be performed. The number of operations required for the interference canceller 760 of FIG. 7*d* is a maximum of N complex multiplications for respreading or additions for a binary spreading code, although this number could be reduced if $\gamma_{x,y}=\gamma_{1,y}=\gamma_{2,y}=0$, a maximum of N(N−1) complex multiplications to perform the weighting, and a maximum of N(N−1) complex subtractions.

FIG. 7*e* shows an interference canceller 780 which is a simplified variant of the interference canceller 760 of FIG. 7*d*. In effect the interference canceller 780 is obtained from the interference canceller 760 by setting the weight of an interference contribution estimate to be the same for all the rake receiver fingers, that is by setting the weights $\gamma_y$ in FIG. 7*e* such that, in terms of the weights of interference canceller 760, $$\gamma_y=\gamma_{1,y}=\gamma_{2,y}=\gamma_{x,y}.$$

Thus the interference canceller 780 comprises a plurality of weights 786*a, b, c*, one for each multipath interference contribution estimate 782*a, b, c*. These weighted interference contribution estimates are summed in summer 788 to produce a single combined interference estimate 790 which is subtracted, by subtractor 792, from received signal 701. A splitter 794 then provides the same version of this interference suppressed signal 784 to each finger of the rake receiver.

The architecture of interference canceller 780 significantly reduces the number of multiplications which are needed to perform the cancellation. Thus a maximum of N complex multiplications (or additions for a binary spreading code) are required for respreading (this could be less if $\gamma_{x,y}=\gamma_{1,y}=\gamma_{2,y}=0$), a maximum of N complex multiplications to perform the weighting, and a maximum of N(N−1) complex subtractions.

An interference canceller 800 which is a modified version of the interference canceller 780 of FIG. 7*e*, is shown in FIG. 8. To illustrate how the structure of the interference canceller 800 of FIG. 8 derives from that of FIG. 7, the features inherited from interference canceller 780 have been given the same reference numerals as in FIG. 7*e*. It can be seen that, for each multipath component, the weighted version of the multipath component subtracted from the received signal is added back in to the signal for the rake finger processing at multipath component. Thus summer 802 adds the interference estimate 782 from multipath 1, weighted 786*a* by $\gamma_1$, back into the output 784 from subtractor 792 to provide an output 808*a* for the rake receiver finger processing the first multipath component of the received signal. Likewise summer 804 adds back into output 784 the weighted version of interference estimate 782*b* which was previously subtracted, to provide output 808*b*, and summer 806 adds back in the previously subtracted interference estimate component 782*c* to provide output 808*c*.

Thus in the arrangement of FIG. 8 the interference contribution from all the paths is summed and then subtracted from the received signal, to reduce the number of calculations, but, to allow the (orthogonal) interfering signal to be present that signal is added back in for the corresponding (orthogonal) interference suppressed path. This facilitates further processing of the interference suppressed signals, for example where successive, improved CPICH-based channel estimates are desired. The interference canceller 800 may be employed for hybrid or parallel cancellation, the weights (γ) being set to 1 for parallel cancellation. The complexity of the implementation is determined by the calculations to implement the canceller which comprise a maximum of N complex multiplications (or additions for a binary spreading code) for respreading (this could be less if $\gamma_{x,y}=\gamma_{1,y}=\gamma_{2,y}=0$) a maximum of N complex multiplications to perform the weighting, N complex subtractions, and N complex additions to add the interfering signal back in for each path.

This gives rise to 2N complex additions for this alternative structure, as compared to $$(N-1)+\sum_{i=1}^{N-1} i$$

for a parallel canceller (or hybrid structure with the same weighting for each interfering contribution, i.e. $\gamma_y=\gamma_{1,y}=\gamma_{2,y}=\gamma_{x,y}$.) The trade-off for an increasing number of paths (that is for increasing number of rake fingers) is shown in Table 2 below. This indicates that with four or more fingers, the structure of FIG. 8 is more efficient.

TABLE 2

| | Number of complex additions required | |
|---|---|---|
| N | Parallel canceller of FIG. 7 | Hybrid canceller of FIG. 8 |
| 2 | 2 | 4 |
| 3 | 5 | 6 |
| 4 | 9 | 8 |
| 5 | 14 | 10 |

Figure 9:
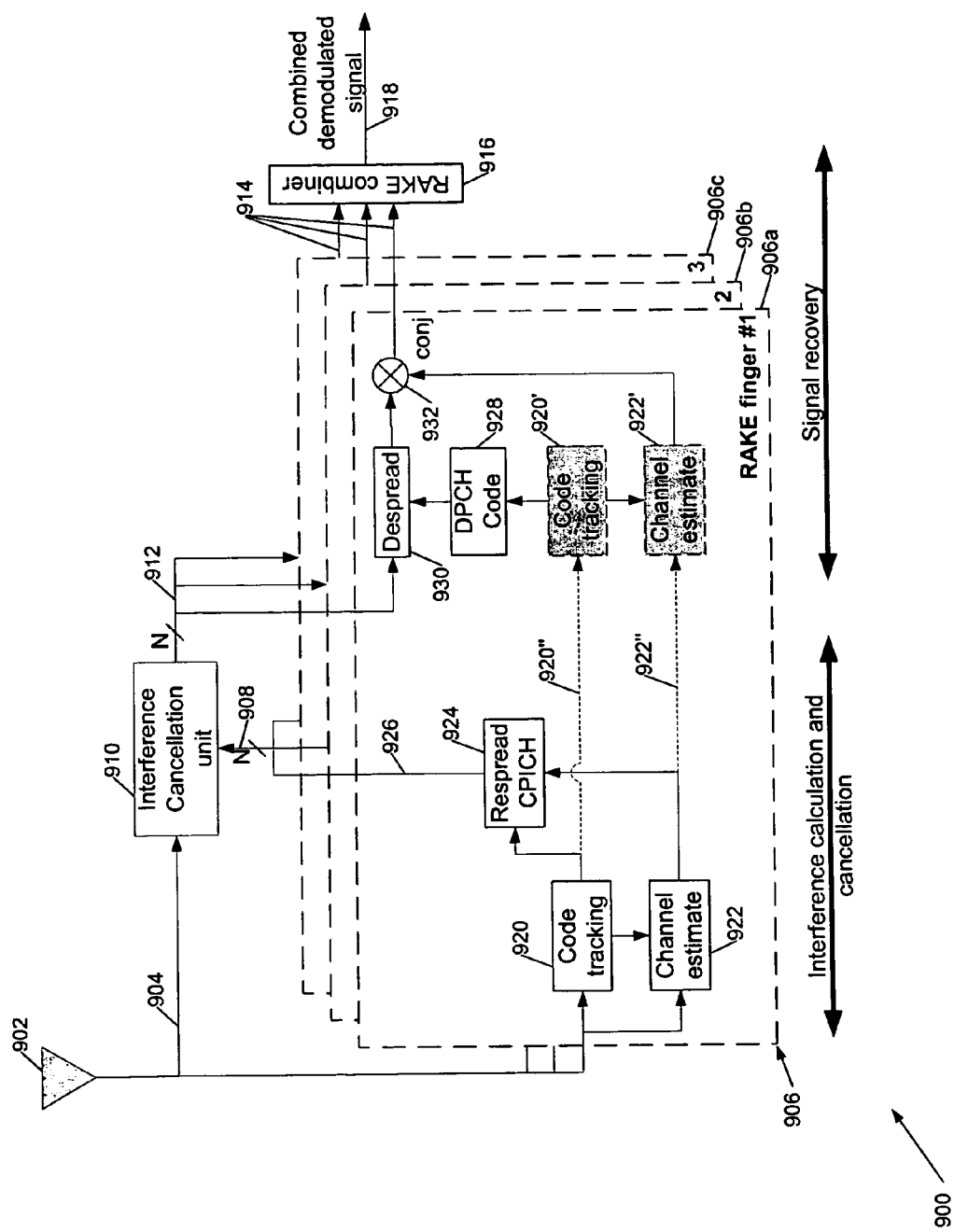
FIG. 9 shows a W-CDMA rake receiver with EPICH cancellation.

Referring now to FIG. 9, this shows a W-CDMA rake receiver 900 with CPICH cancellation. The same architecture can be applied to any channel where the transmitted data a priori, for example the primary and secondary SCH channels. FIG. 9 shows one receiver architecture for cancelling the common pilot channel from the dedicated channel but other architectures, based upon the general architecture of FIG. 5, can also be employed. In FIG. 9 a received signal 904 from a received antenna 902 is provided to each of a plurality of rake fingers 906. Broadly speaking the concept behind the architecture of receiver 900 is to reconstruct the CPICH and suppress it from the received signal 904 in such a way as to remove the interpath interference.

The receiver of FIG. 9 uses modified rake fingers 906 to obtain an interference estimate 908 for the corresponding multipath components of the received signal. These interference estimates are provide separately (or in other embodiments, in combination) to an interference cancellation unit 910, as described above, which provides a plurality of outputs 912 back to the rake fingers 906. The interference cancellation outputs 912 have the non-orthogonal CPICH interference estimates suppressed and can thus be despread by the rake fingers 906 in the usual way to provide an improved despread signal output 914 for each multipath component. These improved outputs are combined by a rake combiner 916 in a conventional manner to provide a combined demodulated output 918 with a reduced bit error rate, because of the interference suppression from the multipath components used to create the combined output.

The rake fingers 906*a, b, c* of the receiver 900 are substantially the same. Thus, for example, rake finger 906*a* comprises a CPICH code tracker 920, 920', and a channel estimator 922, 922', both having an input from the received signal 904. The code tracker 920 tracks the code for the multipath component processed by rake finger 906a and the channel estimator 922 provides a channel estimate for the multipath component, by despreading the CPICH pilot signal. The code tracker 920 and channel estimator 922 are drawn twice in the illustration of FIG. 9 because these blocks are used twice, once for interference contribution estimation and once for recovering the dedicated data channel signal (the primed versions on these blocks). However in practice only a single version of these functional elements is likely to be provided, the outputs from these blocks being reused for signal recovery, albeit with a time delay indicated by dashed lines 920" and 922" to offset the outputs to take account of the delay introduced by the interference cancellation unit 910.

The code tracking and channel estimation is performed in a conventional manner and thus the output channel estimator 922 is a despread version of CPICH which is then respread by respreader 924 with an offset corresponding to the multipath component processed by rake finger 906a, using an output from the code tracker 920. The respread version 926 of the CPICH signal for this multipath component then provides one of the interference contribution estimates 908 for the interference cancellation unit 910. The interference estimate 926 is subtracted from the received signal for the other two rake fingers 906b and 906c.

The output 912 from the interference cancellation unit 910 for rake finger 906a is correlated by the DPCH code from DPHCH code generator 928 in despreader 930. Then the output of despreader 930 is modified by the channel response for the multipath component by multiplying, in multiplier 932, the despread output by a conjugated version of the channel estimate from channel estimator 922', to provide a rake finger output 914 for rake combiner 916. It will be appreciated that the signal recovery portion of rake finger 906a operates in a broadly conventional manner.

In the interference calculation and cancellation phase or portion of receiver 900, the following steps are performed:
1. Calculate code offset, for example by means of a delay locked loop on CPICH;
2. Calculate the channel estimate from CPICH;
3. Respread CPICH signal for this multipath with the specific values for delay (code position), magnitude and phase;
4. Repeat steps 1-3 for all N fingers;
5. Subtract the N respread CPICHs from the received signal, to remove the estimate interference, using, for example, an interference cancellation strategies as described above.

This gives the N versions of the signal shown on the output of the interference cancellation unit. The next stage is to recover the desired signal and the steps to perform this task are:
6. Calculate the code offset. This can either be performed again, or the previous estimate from step 1 above can be used;
7. Despread with the desired code at the correct code offset;
8. Calculate channel estimate—this can either be performed again, or the previous estimate from step 2 above can be used;
9. Apply the channel estimate;
10. Repeat steps 6-10 for all N fingers.
11. Sum all N fingers.

If in step 6 the code tracking is performed again, it may be carried out on the DPCH or CPICH channels, depending on whether the pilot signal has been cancelled from the desired signal. If the previous estimate is used, then a delay may need to be introduced to compensate for latency in the interference cancellation unit.

It will be appreciated that the above steps describe an algorithm which may be implemented in software to perform functions to implement the receiver of FIG. 9, for example as firmware for a software radio or digital radio processor. Alternatively the algorithm may be employed to write a functional definition for a field programmable gate array for application specific integrated circuit to implement the receiver.

Figure 10:
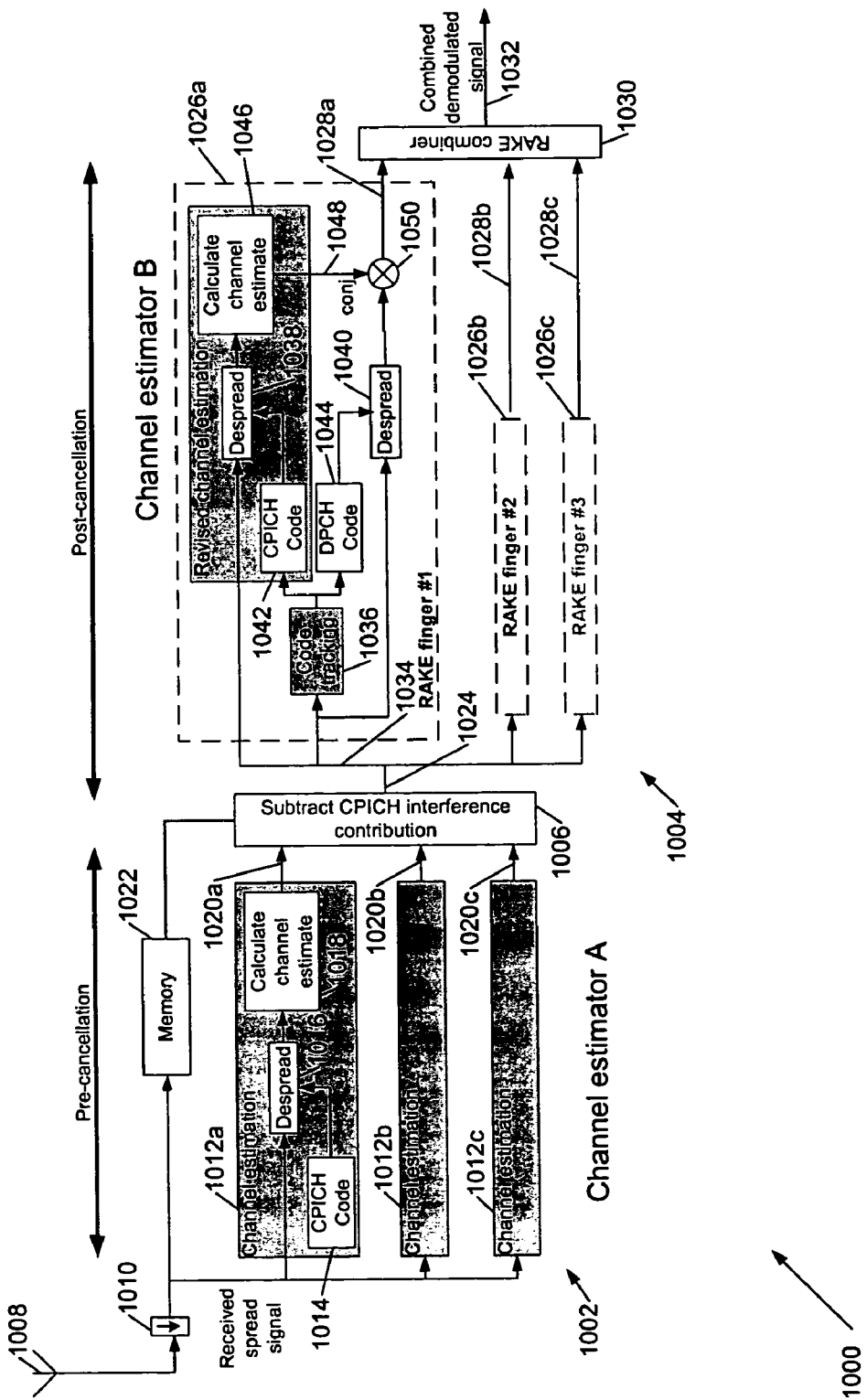
FIG. 10 shows a W-CMDA rake receiver with CPICH cancellation position options.

FIG. 10 shows W-CDMA rake receiver 1000 with two channel estimators, a first channel estimator 002 to form an estimate of an interference contribution from CPICH prior to subtraction of the estimated interference, and a second channel estimator 1004 to form a second channel estimate to estimate the CPICH interference after the CPICH interference has been subtracted by an interference suppresser 1006. Thus the receiver 1000 as illustrated in FIG. 10 estimates the interference twice, once after an initial estimated interference contribution has been subtracted from the received signal. However, as will be described below, the first channel estimator may be dispensed with and the second channel estimator 1004 used to provide an interference estimate for interference canceller 1006 even though estimator 1004 follows interference canceller 1006. Broadly speaking, this is possible because CPICH is not modulated and thus, providing the multipath environment is stationary, a channel can be estimated, that is CPCIH can be despread to provide an estimate of the CPICH interference contribution, at one point in time and the estimate used later to subtract an interference contribution from the received signal for generating a more accurate interference estimation. In the language of software, the spread spectrum receiver 1000 is in effect operating recursively. The receiver of FIG. 10, as drawn shows that CPICH cancellation may be employed twice and, by extension one of more further steps of CPICH cancellation may be performed for successively better interference estimates, albeit subject to the law of diminishing returns. The recursive approach to interference cancellation also, in effect, performs the channel estimation and interference cancellation operations more than once to provide an improved output signal, but with a more compact architecture.

As will be appreciated the recursive, post-cancellation channel/interference estimation technique is not restricted to use with the CPICH pilot signal but may be applied to any unmodulated, potentially interfering spread spectrum signal. It will also be appreciated that the technique is not limited to stationary multipath environments although because an estimate from an earlier time is used to estimate an interference contribution at a later time, more frequent interference estimates will be required in rapidly changing multipath environments. This in turn implies that the channel/interference estimates will tend to be averaged over shorter period and may thus be noisier. However, in practice, a sufficiently accurate estimate is normally possible even in rapidly changing multipath environments because a sufficiently accurate channel/interference estimate can normally be derived faster than the multipath environment is changing.

Referring now in more detail to FIG. 10 a spread spectrum signal is received by an antenna 1008 and reduced in frequency by down converter 1010 before input before to a plurality of channel estimates 1012*a, b, c,* each of which functions to output an estimated interference contribution for a multipath component from the received signal. Thus, as previously described, each channel estimator comprises a CPICH code generator 1014, a despreader 1016 and means 1018 to calculate a channel estimate and hence for CPICH, an interference estimate, providing an interference estimate output 1020*a* from channel estimator 1012*a* at outputs 1020*b, c,* from estimators 1012*b, c*. As the channel estimation process introduces a delay into the interference estimate the received signal is also temporarily held in a memory 1022 to align the received signal with the interference estimates. As previously described the receiver also incorporates code tracking CPICH code generator 1014, although for simplicity this is not shown in FIG. 10. The interference canceller 1006 subtracts the interference contribution estimates 1020*a, b, c* from the delayed received signal to provide an output 1024 for the second channel/interference estimator 1004. The output 1024 may comprise a separate output for each rake finger of channel estimator 1004 or, where the rake fingers of channel estimator 1004 include code tracking, output 1024 may comprise a combined output signal for all the multipath components as, in this case, the rake fingers will be able to track and extract the multipath components from this combined signal. The interference contribution estimates 1020*a, b, c* are respread prior to being subtracted from the received signal, but for simplicity, these respreaders are not shown and may be assumed to be incorporated within the interference canceller 1006 which, otherwise, may take one of the forms illustrated in FIGS. 7 and 8.

The second channel/interference estimator 1004 comprises three similar rake fingers 1026*a, b, c*. Each of these provide an output 1028*a, b, c* to a rake combiner 1030 which in turn provides a combined demodulated output signal 1032. For conciseness only rake finger 1026*a* will be described in detail.

Rake finger 1026*a* comprises an input 1034 to a code tracker 1036 and to a pair of despreaders 1038*a,* 1040. The code tracker 1036 provides an output to a CPICH code generator 1042 and to a DPCH code generator 1044 which in turn provide respective outputs to the spreader 1038 and to despreader 1040. Thus despreader 1038 operates to despread the CPICH signal from input 1034 and the despreader 1040 operates to despread the data on the DPCH channel also on input 1034. The despread CPICH signal is used by channel estimator 1046 to calculate a channel estimate, for example by averaging over one or more symbols, providing a channel estimate output on line 1048. A conjugate version of this channel estimate output provides an input to a multiplier 1050 to modify the output of despreader 1048 to compensate for the channel characteristics, as previously described, to provide the output 1028*a* for the rake combiner 1030.

The output 1048 of the channel estimator 1046 can be used to provide an estimate of the interference contribution to the DPH channel signal from the CPICH pilot signal by respreading the channel estimate with the appropriate delay offset for the multipath component to which the channel estimate applies. In other words, because the CPICH channel is unmodulated the despread CPICH signal, is necessary averaged by channel estimator 1046, comprises the interference estimate for the relevant multipath component. Thus the output 1048 from rake finger 1026*a* may be used to provide an input to the interference canceller 1006 in place of the output 1020*a* from the channel estimation block 1012*a*. Similarly a channel estimate output from rake finger 1026*b* may be used in place of the channel estimate output 1020*b* from estimator 1012*b*, and a channel estimate output from rake finger 1026 may be employed in place of output 1020*c* from estimator 1012*c*. The advantage of creating such a loop in the receiver architecture is that the rake fingers 1026 calculating the channel estimates operate on a signal from which the interference contribution CPICH has already been suppressed and thus improved channel/interference estimates are obtained.

The channel estimator 1046 may average over one or more symbols, although it will be appreciated that in such a case the interference estimate will effectively be out of date by one or more symbols. The period over which the estimate is determined may be varied depending upon the spreading factor since the symbol period will be shorted with a smaller spreading factor and thus averaging over more symbols may be appropriate. Alternatively a moving window-type average may be employed, for example calculating one channel/interference estimate per symbol period using a fixed or variable number, n, of chips before, and optionally after the estimation point.

The cancellation of interference from the CPICH channel has been described but it will be appreciated that this technique may also be employed to cancel interference from other unmodulated channels such as the primary and secondary SCH channels. From the foregoing discussion it will be appreciated that the receiver architecture 100 of FIG. 10 provides at least three modes of operation—a pre-cancellation channel estimation mode, a pre-and post-cancellation channel estimation mode, and, as described in detail above, a post-cancellation channel estimation mode. In the pre-cancellation channel estimation mode channel estimators 1012*a, b, c* are used in place of the channel estimators in rake fingers 1026*a, b, c* and thus these latter channel estimators, comprising CPICH code generator 1042, despreader 1038, and channel estimator 1046, may be omitted. Thus the receiver is simplified, but at the cost of a poorer channel estimate as the channel is formed before IPI contributions have been suppressed. In the pre-and post-cancellation channel estimates architecture the receiver is as shown in FIG. 10 and a first estimate is produced by channel estimators 1012*a, b, c* prior to interference cancellation and a second, improved estimate is calculated in the rake fingers 1026*a, b, c* after the interference cancellation. Although this arrangement provides an improved channel estimate for rake finger processing the receiver is more complex than the basic pre-cancellation channel estimate receiver. In the post-cancellation channel estimate receiver channel estimators 1012*a, b, c* are omitted and the channel estimators in rake fingers 1026*a, b, c* are used to calculate the channel estimate both for the rake fingers and for the interference canceller 1006, using a previously calculated channel estimate for the interference canceller. This arrangement both reduces the receiver complexity and also provides the advantage of an improved channel estimate since the previously calculated channel estimate is likely still to be valid for a short period. Channel estimates can still be calculated by rake fingers 1026*a, b, c* because the desired CPICH signals remains on each multipath component, only CPICH IPI from other paths having been suppressed.

In a corresponding manner the code tracking the receiver architecture of FIG. 10, for example a Delay Locked Code Tracking Loop (DLL), can either be implemented prior to interference cancellation, or after interference cancellation, or both before and after interference cancellation. To implement pre-cancellation code tracking a DLL is only used prior to the interference canceller 1006, that is in block 1002, and the same delay estimate is then used for the rake fingers 1026a, b, c. It is also preferable to arrange the delay between the delay calculation (DLL) and the use of the delay estimate in the rake fingers to be an integer number of symbols. Where this is the case the channelisation code can also be time-aligned in the pre-and post-canceller elements 1002, 1004 of the receiver. This pre-cancellation code tracking approach is best combined with pre-cancellation channel estimation or pre-and post-cancellation channel estimation as described above.

In an alternative architecture the code tracking is performed pre- and post-interference cancellation, that is in channel estimation blocks 1012 and again in rake fingers 1026. Thus a first code tracking estimate is made initially, prior to interference cancellation and then the delay position is recalculated following interference cancellation. This tends to result in an improved delay position estimate in the rake fingers, and hence an improved quality data output, since the code tracking for spreading the data is being performed after an interference contribution has been suppressed. This approach is preferably combined with the above described pre- and post-cancellation channel estimation procedure.

A drawback of the approach is that the architecture is complex as to implement code tracking both before and after interference cancellation, as opposed to just in one position or the other, requires an additional three correlators pre rake finger. It is therefore preferable to apply post-cancellation code tracking, in a corresponding manner to the post-cancellation channel estimation described above, which enables the code trackers only to be implemented in the rake fingers and make it unnecessary to include code tracking in channel estimation blocks 1012a, b, c. Thus, for example, in this configuration the output of code tracker 1036 in rake finger 1026a may be employed to drive CPICH code generator 1014 in channel estimation block 1012a, as well as the CPICH code generator 1042 and the CPH code generator 1044 in rake finger 1026a. Similarly code trackers in the other two rake fingers 1026b, c may be employed to drive the CPICH code generators in the channel estimators 1012b, c. It will be appreciated that post-cancellation code tracking may be employed with pre- or post-cancellation channel estimation.

FIGS. 11 to 14 show examples of the effect of CPICH common pilot signal interference cancellation on the dedicated DPCH data channel bit error rate. The graphs illustrate the capacity enhancement and quality of service improvements that can be achieved at the user end by applying interference cancellation techniques in the user terminal.

Figure 11:
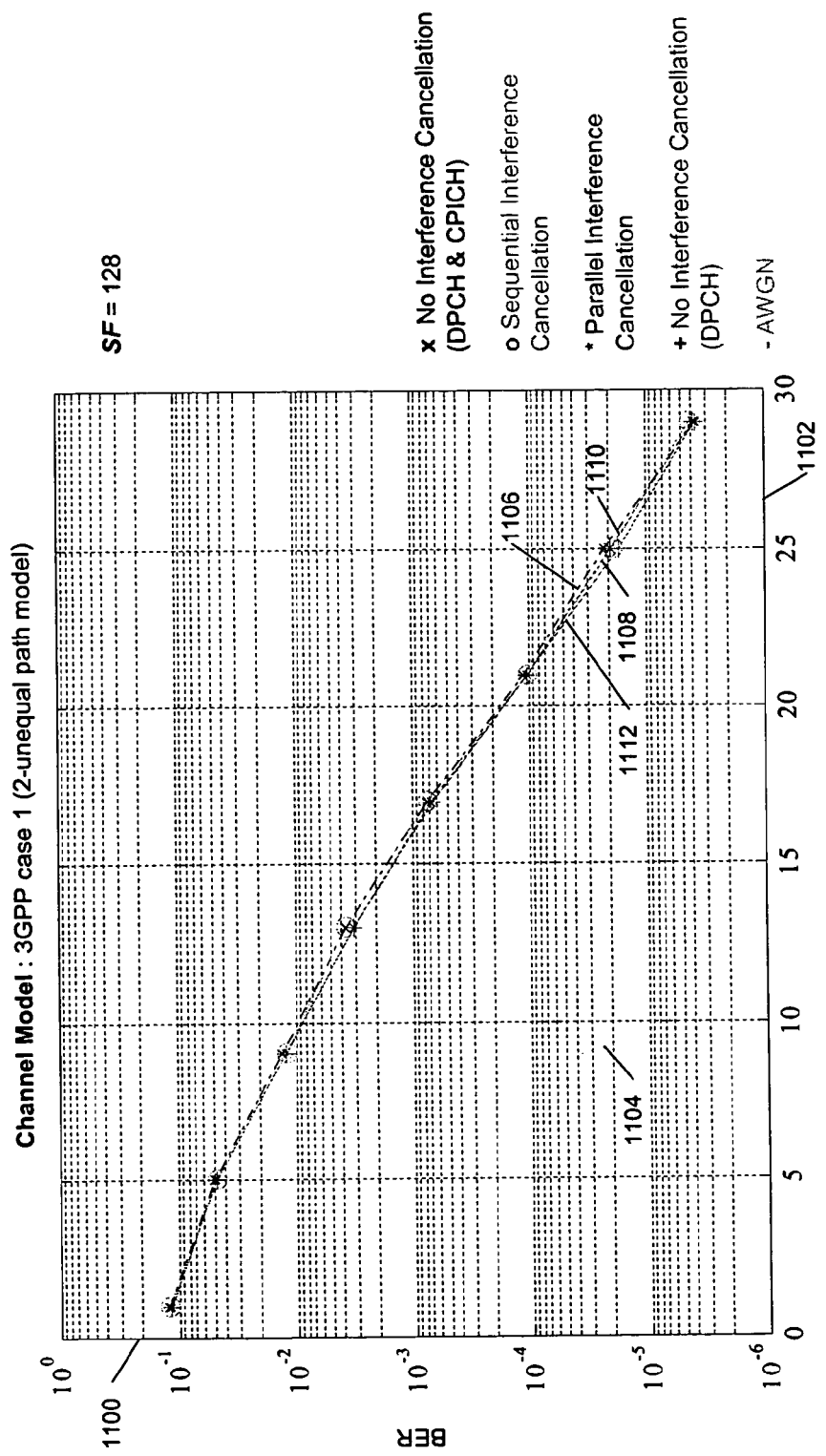
FIG. 11 shows bit error rate performance of a 3G mobile phone system at 12.2 kbps with and without interference cancellation.
Figure 12:
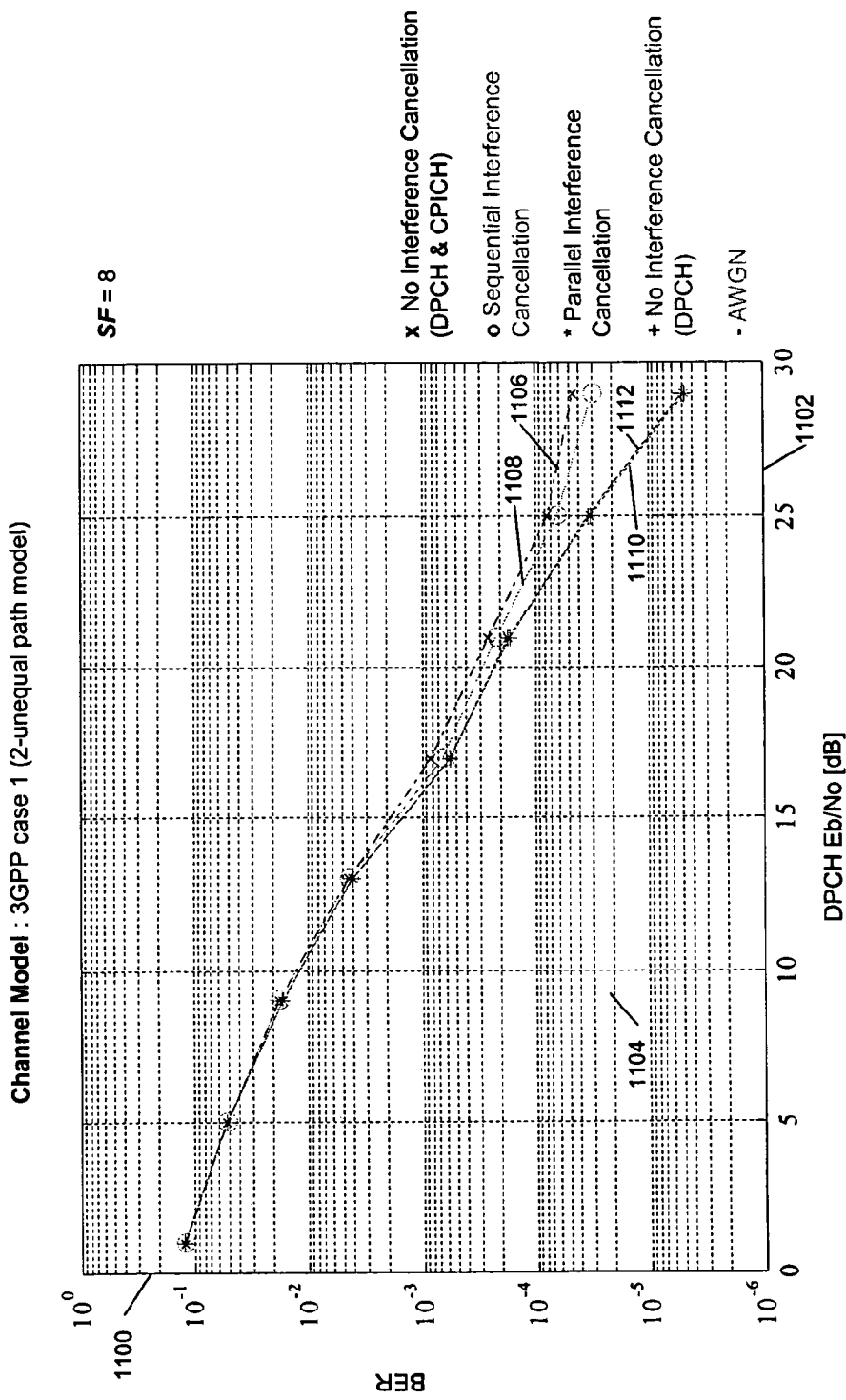
FIG. 12 shows bit error rate performance for a 3G mobile phone system at 384 kbps with and without interference cancellation.
Figure 13:
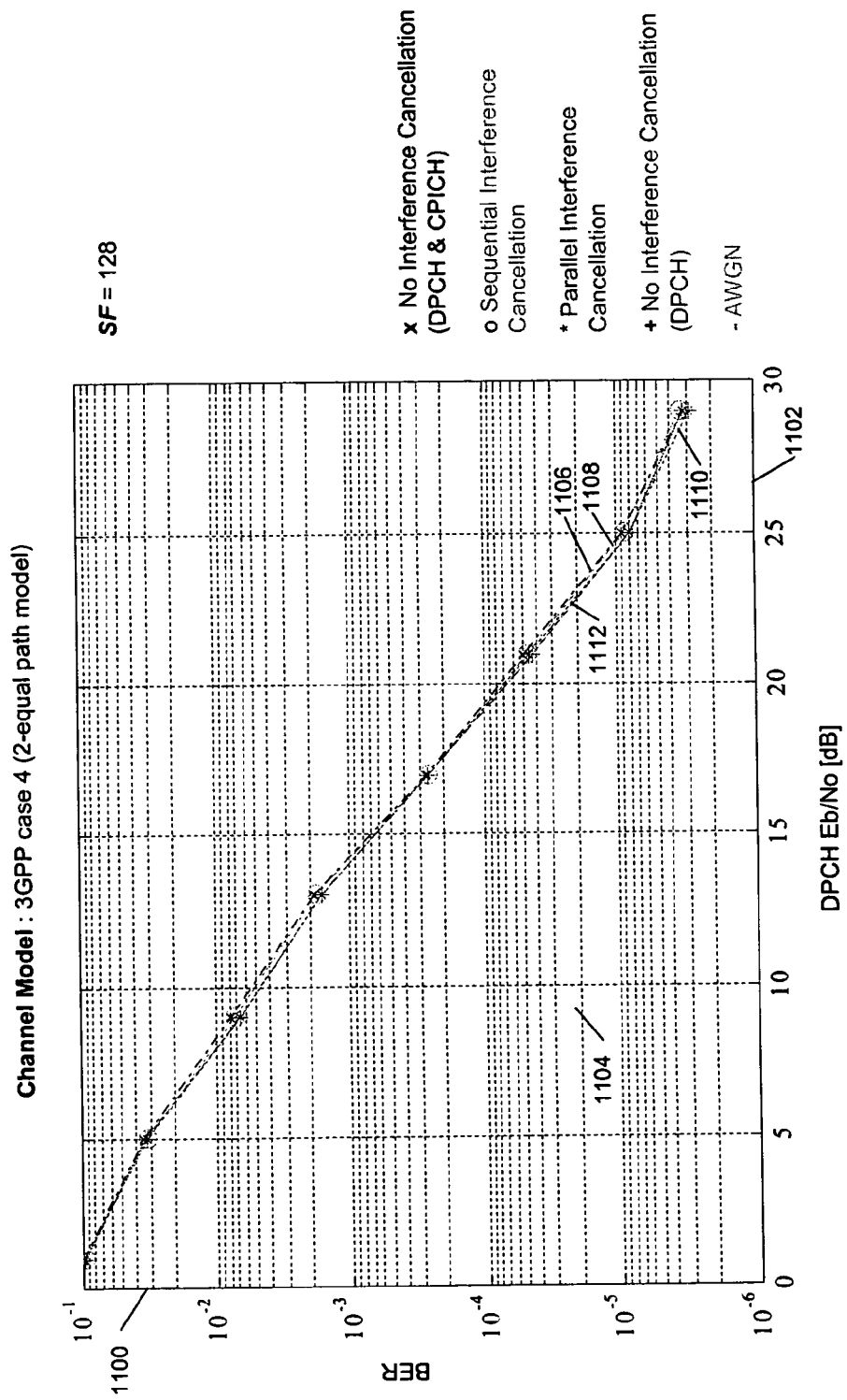
FIG. 13 shows bit error rate performance for a 3G mobile phone system at 12.2 kbps with a large multipath delay spread, with and without interference cancellation.
Figure 14:
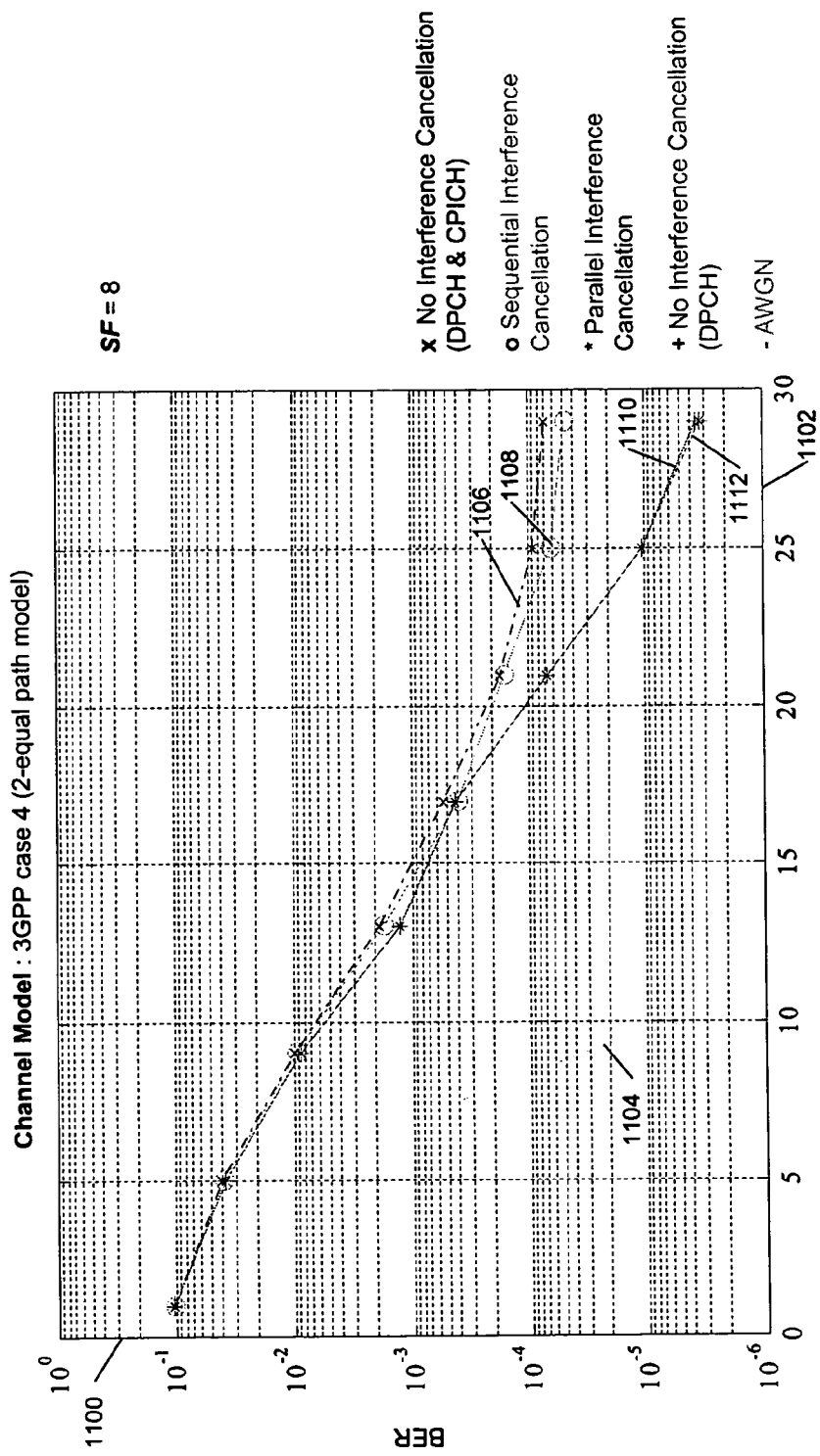
FIG. 14 shows bit error rate performance for a 3G mobile phone system at 384 kpbs with a large multipath delay spread, with and without interference cancellation.

The figures illustrate the results of simulations performed for two-path fading propagation conditions at different user data rates. FIGS. 11 and 12 relate to Case 1 as defined in the 3GPP technical specification 25.101 version 3.2.2—unequal path model and low rms delay spread of 280 ns, and FIGS. 13 and 14 relate to the 3GPP Case 4—two equal paths with an rms delay spread of 488 ns. The 3GPP Case 1 and Case 4 specifications were employed for the simulations except that the velocity of the mobile terminal was assumed to be 20 m/s instead of 1 m/s. FIGS. 11 and 13 relate to a low user data rate, a 12.2 kbps bearer (sf=128) and FIGS. 12 and 14 relate to a high user data rate, a 384 kbps bearer (sf=8) thus illustrating the effects of different spreading factors. A single user was assumed, and for simplicity, a cross-channel IPI was only considered for two channels, CPICH (the Common Pilot Channel) and DPCH (the Dedicated Physical Channel); the illustrated results do not include the effects of forward error correction coding.

The parameters used for the simulations are set out in Table 3 below.

TABLE 3

| Parameter | Explanation/Assumption |
| --- | --- |
| Number of users | 1 |
| CPICH (Pilot Channel) | Code 0 - constant value (all 1s) transmitted. |
| OVSF Code | Codes are chosen from the allowed OVSF Code Tree. |
| Scrambling Code | Primary Scrambling Code (Scrambling Code Number = 32) |
| Spreading Factor, SF | 128.8 for DPCH 256 for CPICH |
| Chip Rate | 3.84 Mcps |
| Modulation | QPSK |
| Number of samples per chip | 1 |
| Downlink Physical Channels and Power Levels | As specified in Annex C of TS 25.101 v3.2.2 CPICH Power = 7 dB higher than DPCH Power |
| Propagation conditions/ Number of Rayleigh Fading Channels | As specified in Annex B of TS 25.101 v.3.2.2. The path delays in Case 1 and Case 4 have been moved to positions that are integer number of chips. The reason for this is the number of samples per chip used in simulations is 1. |
| Measurement channels | As specified in Annex A of TS 25.101 v3.2.2 |
| Mobile Speed | 20 meter/s |
| Channel Estimation | Ideal amplitude and phase estimation |
| Code acquisition and tracking | Perfect |
| Number of Rake Fingers | Equals to number of taps in propagation condition models |
| DPCH_EbNo (dB) | 1,5,9,13,17,21,25,29 |

In all of FIGS. 11 to 14 the x axis 1102 represents the signal to noise ratio of the DPCH signal and the y axis 1100 represents the bit error rate of data demodulated from the DPCH channel. In each of these figures five curves are shown, curve 1104 showing the effect of Additive White Galcion Noise interference (AWGN), curve 1106 showing the effect of no interference cancellation, curve 1108 showing the effect of sequential interference cancellation (as in FIG. 7c), curve 1110 showing the effect of parallel interference cancellation (as in FIG. 7b), and curve 1112 showing the effect of no interference, that is without the CPICH channel present. It will be recognised that curves 1106 and 1112 (no interference cancellation and no interference, respectively) represent theoretical lower and upper bounds to the performance of the interference cancellation system. Self interference arising from DPCH IPI was not considered for the purposes of FIGS. 11 to 14.

In the two-part model of FIGS. 11 to 14 the DPCH signal on a first of the paths encounters IPI from both the DPCH and the DPICH signals on the other path because these are non-orthogonal because of the dispersive multipath environment. Similarly there is an IPI contribution from the DPCH and CPICH codes on the first path to the DPCH signal on the other path. From FIGS. 11 to 14 it can be seen the equal path model (k spore, FIGS. 13 and 14) performs worse than the unequal path model (Case 1, FIGS. 11 and 12) in the presence of the interference. This results from the significant IPI contribution from CPICH, which is 7 dB higher in power than DPCH. Thus interference cancellation will tend to be of more benefit for situations such as Case 4 where the multipath components are similar in strength. Theoretically the IPI contribution on or to the desired path for the desired channel is directly proportional to the undesired path's amplitude and is inversely related to the spreading factors of the desired and undesired channel.

For high processing gain, that is for low data rate transmission, CPICH IPI does not cause any significant degradation in performance, as the IPI contribution is very low in value. This is because the inherent processing gain of the code suppresses the interference present. For example, the processing gain with a spreading factor of 128 is 21 dB, implying that interference is suppressed by 21 dB. In contrast, with a SF of 8, the processing gain is only 9 dB.

The effect of IPI is more noticeable for low processing gain (or high data rate) transmission. An irreducible error probability (error floor) is introduced an can be as high as $5 \times 10^{-3}$ (case 1) and $8 \times 10^{-5}$ (case 4) even with all of the signal energy captured by the rake receiver. Equal amplitude paths (case 4, FIGS. 13 and 14) perform worse than unequal paths (case 1, FIGS. 11 and 12), due to the comparatively higher level of IPI introduced as the power level difference between the two paths is now 0 dB for case 4, as compared with −10 dB for case 1.

Sequentially interference cancellation only makes less difference than the parallel interference cancellation, lowering the BER floor down to $3 \times 10^{-5}$ (case 1) and $5 \times 10^{-5}$ (case 4). With the equal path model (case 4, FIGS. 13 and 14), the performance is less good than the unequal path mode (case 1, FIGS. 11 and 12), as using this scheme on an equal path model effectively cancels out the IPI contribution of one of the two equally strong paths.

Parallel interference cancellation significantly improves the receiver's performance by substantially eliminating CPICH's IPI effect. At a BER of ~10-3 this corresponds to a 1.5 to 2 dB improvement in the performance, and the performance improvement is more significant at lower values of BER (for example ~4.5 dB at $10^{-4}$).

Numerical results have similarly shown that interference cancellation schemes performance is limited by IPI in a low spreading system. Thus both the simulated cancellation schemes can be seen to work effectively in improving the performance of the system. The effectiveness of the sequential cancellation technique whether applied to an equal or unequal amplitude path model tends to level off to an error floor. Parallel cancellation however, removes the Pilot Channel's IPI contribution substantially completely and provides a dramatic enhancement in the data capacity. Hybrid interference cancellation systems can be expected to produce similar benefits.

As previously mentioned interference from channels other than CPICH can additionally or alternatively be cancelled from DPCH. In the following description the example of P-CCPCH (the Primary Common Control Physical Channel) will be used although the skilled person will appreciate that the technique described can be applied to any other common channel with non-deterministic data.

Broadly speaking the concept the broadcast P-CCPCH channel is to despread (and demodulate) before the dedicated channel is received. The calculated PCCPCH signal is then respread, weighted by the overall channel response, and subtracted from the dedicated channel receive path. Again there are a number of stages at which an interference estimate for subtraction from the dedicated channel received path may be formed.

After despreading the P-CCPCH signal for each multipath component can be respread individually thus providing a different soft estimate of P-CCPCH from each rake finger. This will be referred to as determining a pre-combined interference estimate.

Alternatively after despreading the estimates of P-CCPCH may be combined to form a composite estimate, which will tend to be more accurate. This composite is then divided into a number of streams each corresponding to a particular multipath/finger, and each stream is then respread, weighted by the appropriate multipath channel estimate, and given an offset corresponding to the relevant multipath delay. These respread interference estimates are then subtracted from the desired signal to improve performance. This will be referred to as a post-combiner interference estimate technique. In a variant of this method, both demodulation and rake reception and demodulation may be performed to generate a still more accurate interference estimate. However this variant has the disadvantage of introducing a significant latency into the estimate.

The choice of whether to employ a pre- or post-combined interference estimate technique may be made depending upon factors such as the availability of processing power and the channel conditions particularly signal to noise ratio. For example, using a combined estimate of P-CCPCH may improve the quality of the interference estimate from multipath components but at the same time it may degrade the interference estimate corresponding to a high power multipath component. It will also be appreciated that using the pre-combiner estimation technique removes the need to apply the channel magnitude/phase to the interference estimate before subtracting the interference contribution, as the interference estimate inherently includes the channel magnitude and phase.

At low values of signal-to-noise ratio (SNR) employing a post-combiner interference estimate result in performance degradation in some circumstances as an incorrect estimate of P-CCPCH could be subtracted from a desired signal in the interference cancellation operation. To address this potential drawback an adaptive architecture may be employed to optimise performance, the adaptive using a pre-combiner interference estimate at low values of SNR and post-combiner interference estimate with higher power signals with a better signal-to-noise ratio. Now considering these different methods in more detail, FIG. 15a shows a spread spectrum receiver 1500 with an architecture suitable for applying the pre-combiner interference estimation technique.

Figure 15A:
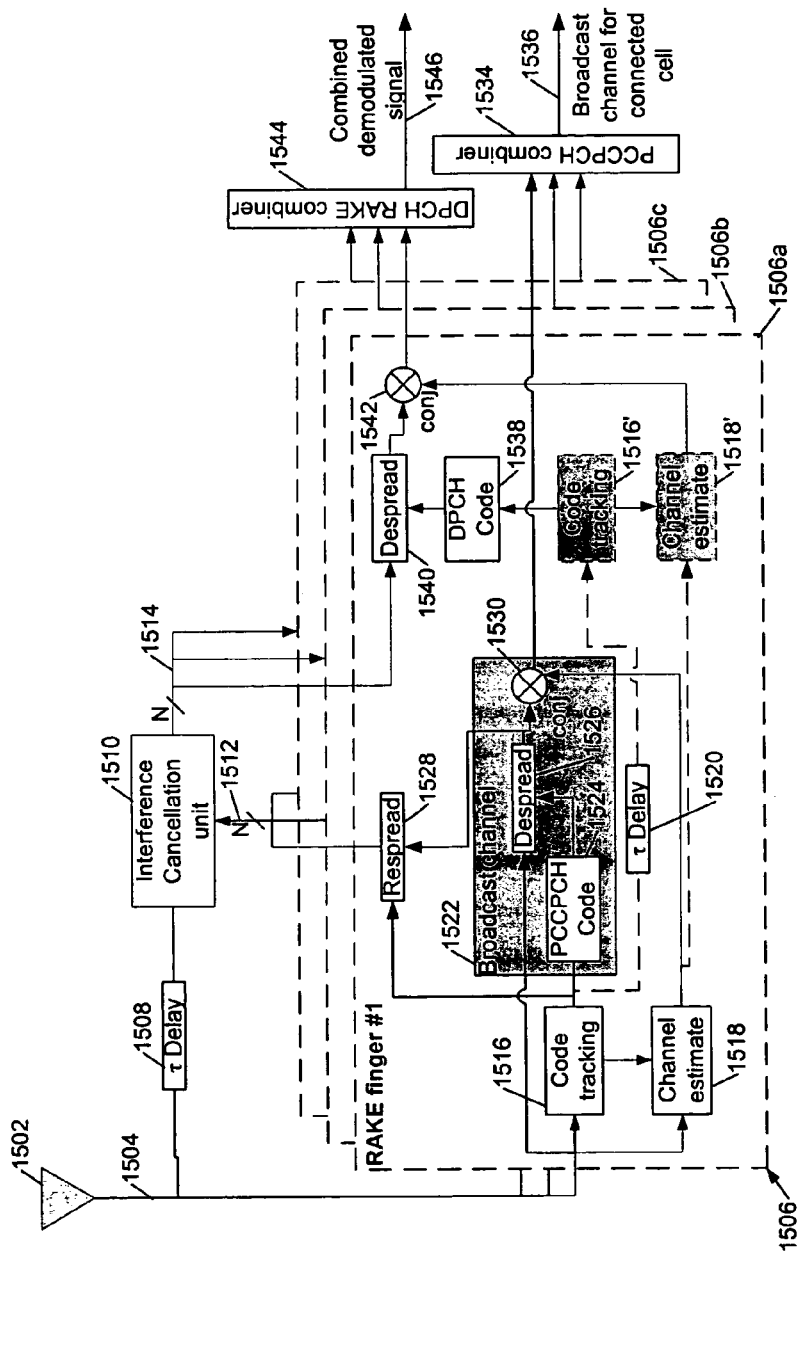
FIGS. 15a and 15b show a WCDMA rake receiver with PCCPCH cancellation (a) with precombined estimates, and (b) with post-combined estimates.

In FIG. 15a an antenna 1502 provides a received signal 1504 for a plurality of rake fingers 1506a, b, c. The received signal is also provided to a time-delay unit 1508 and thence to an interference cancellation unit 1510 which has a plurality of interference cancellation inputs 1512, one for each rake finger, and a corresponding plurality of outputs 1514, also one for each rake finger.

An exemplary rake finger 1508 comprises a code tracker 1516 and a channel estimator 1518 both having an input from the received signal 1504; as previously described the channel estimator 1518 may comprise a CPICH code generator (receiving an input from code tracker 1516), a despreader, and a channel estimator to average the despread CPICH code over one or more symbols. In a similar way to that described with reference to FIG. 9 the outputs from the code tracker 1516 and the channel estimator 1518 are used more than once in the rake finger and this is schematically illustrated by second code trackers and channel estimators 1516' and 1518'. However as previously described these blocks 1516', 1518' are merely a convenient illustration of the re-use of the output signals from these blocks within the receiver architecture. The time offset between code tracker 1516' and 1516 is, in FIG. 15a explicitly illustrated by time-delay element 1520; no such time-delay is necessary, however, for the channel estimates since over short periods this is substantially stationary.

The output of code tracker 1516 provides and input to broadcast channel estimation block 1522 comprising a PCCPCH code generator 1524 providing one input to a despreader 1526, which has a second input from received signal 1504. The despread broadcast channel output is provided to respreader 1528 which respreads the broadcast channel with an offset corresponding to the multipath component processed by finger 1506*a*, using the output from code tracker 1516. This respread interference estimate is then provided to an input 1512 in interference cancellation unit 1510. Suitable interference cancellation units have previously been described.

The despread version of the broadcast channel in rake finger 1506*a* is multiplied by a conjugate channel estimate in multiplier 1530 and provides an output to a PCCPCH rake combiner 1534. The combiner 1534 also receives signals from the other rake fingers and provides a demodulated broadcast channel output 1506. Similarly the appropriate output 1514 from the interference cancellation unit 1510 is provided back to rake finger 1506*a* where it is despread in a despreader 1540 by correlating the signal with a DPCH code from DPCH code generator 1538. The channel estimate is then applied to the despread signal by multiplier 1542 to provide an output signal to DPCH rake combiner 1544. The DPCH rake combiner also has inputs from the rake fingers 1506*b, c* and provides a combined demodulated output signal 1546.

Figure 15B:
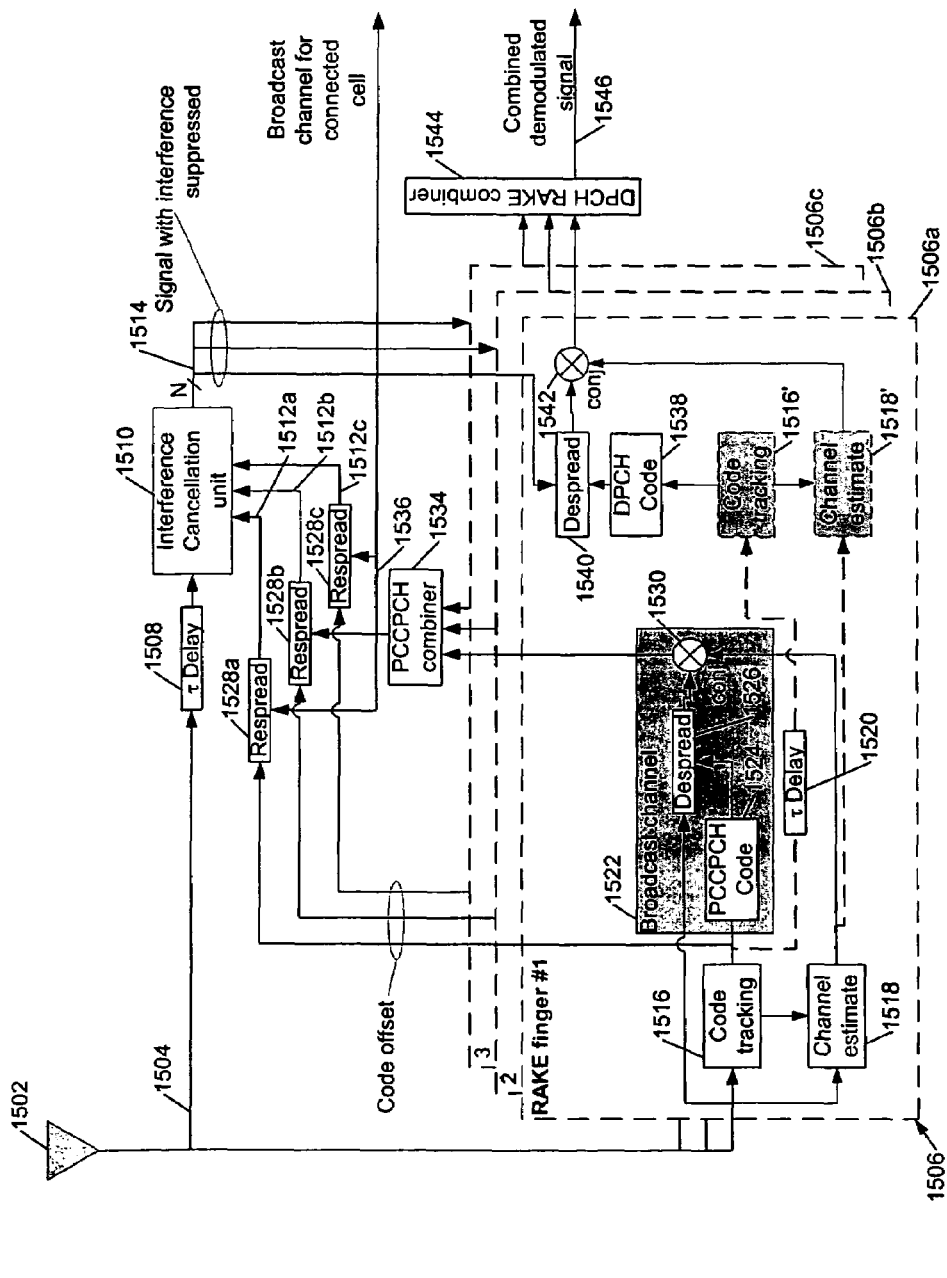

In operation the rake receiver provides an estimate for PCCPCH for a first multipath component from this first finger of the receiver, respread the estimate and subtracts it from the signal for all the other fingers, fingers 1506*b, c* in the example. There is no need to subtract the estimate from the signal back to the first finger because the respread PCCPCH estimate from this first finger is orthogonal to the DPCH multipath component decoded by this first finger. In a corresponding manner a respread PCCPCH estimate from the second finger, with a delay appropriate to the multipath component processed by the second finger, is subtracted from the interference cancelled version of the received signal returned to the first finger, and is likewise subtracted from the signal for all the other fingers except for the second finger. It will be understood that the architecture of FIG. 15*a* implements a pre-combiner interference estimate technique. A modification of this architecture, as shown in FIG. 15*b* implements a post-combiner interference cancellation technique. In FIG. 15*b* many of the rake finger elements correspond to those of FIG. 15*a* and like reference numerals indicate like elements.

The main change in the architecture relates to the position of respreaders 1528*a, b, c* as compared with that of respreader 1528 in FIG. 15*a*. It can be seen from FIG. 15*b* that three respreaders 1528*a, b, c* are provided one for each rake finger, and that, as before, these respreaders each have one input from a code tracker from one of the rake fingers. Thus, as before, these respreaders each provide a respread version of a signal with a delay offset corresponding to one of the multipath components the receiver processes. However whereas in FIG. 15*a* the respreader associated with each finger received a despread version of the broadcast channel for that finger (i.e. for that multipath component) in the architecture of FIG. 15*b* the rake combined broadcast channel signal 1536 is provided as an input to each respreaders 1528*a, b, c*. Thus three separate versions of this one combined estimated version of the broadcast control channel are provided, with delays corresponding to the multipath components the corresponding rake fingers process. As before these three estimates provide corresponding inputs 1512*a, b, c* to the interference cancellation unit 1510.

The interference cancellation procedure effected by the receiver may also be implemented using the following algorithm:

1. Calculate code offset (may be combined with item 1 of the CPICH cancellation procedure);
2. Calculate the channel estimate (may be combined with item 1 in CPICH cancellation);
3. Subtract the CPICH interference contribution if desired;
4. Repeat 1-3 for all N fingers;
5. Calculate the P-CCPCH for all N fingers, averaging each over one symbol;
6. If a pre-combined interference estimate is required, go to item 9;
7. If a post-combiner interference estimate is required, perform MRC (maximal ratio combining) or other combining algorithm on all N fingers;
8. Apply the N channel estimates to the interference estimate, to obtain N interference signals, one corresponding to each multipath/finger;
9. Respread all N signals with the P-CCPCH code, incorporating the delay offset associated with each of the N multipaths/fingers.
10. Subtract the N respread versions of P-CCPCH from the received signal, to remove the estimate of (for example using) cancellation strategy as previously described.

This gives the N versions of the signal shown on the output of the interference cancellation unit. The next stage is to recover the desired signal:

11. Calculate the code offset, this can either be performed again, or the previous estimate from item 1 above can be used. (If the code tracking is performed again, it may be carried out on the DPCH or CPICH channels, depending on whether the pilot signal has been cancelled from the desired signal. If the previous estimate is used, then a delay may be introduced to compensate for latency in the interference cancellation unit);
12. Despread with desired code at correct code offset;
13. Calculate channel estimate—this can either be performed again, or the previous estimate from item 2 above can be used;
14. Apply channel estimate;
15. Repeat 11-15 for all N fingers;
16. Sum all N fingers The additional delay introduced by the broadcast channel cancellation process, and the corresponding buffering required, depends upon the period over which PCCPCH is averaged. Normally there is no need to average over periods greater than the symbol period. A small amount of additional latency will be introduced by the averaging operation, combining and applying the channel weight (s) (if performed), the respreading and summation of the interference signal. It will be appreciated that the additional delay is relatively small and thus relatively little additional buffering will be required.

In the foregoing discussion suppression of interpath interference from PCCPCH to DPCH has been described. However if PCCPCH detection occurs after CPICH (and/or SCH) has been subtracted then the IPI contribution from these channels is also suppressed. This will therefore have the additional advantage of improving the broadcast channel itself, although because PCCPCH is generally transmitted at a relatively high power this is less important.

In a further refinement of the technique it is also possible to remove self-interference IPI from PCCPCH by performing an initial estimate of the channel, subtracting this estimate and then including another matched filter bank to calculate the new estimate, which should be of better quality. In this case it is preferable to apply pre-combined interference estimation techniques.

The cancellation of self-interference, in particular on the dedicated DPCH channel, will now be considered. Here an initial estimate of the dedicated channel is made, and this is respread and weighted to form an estimate of the self-interference contribution. Then a second matched filter bank is employed to calculate a final estimate. Multiple stages may be concatenated, the initial stages calculating an increasingly refined estimate of the interference and the final stage calculating the symbol estimate for output. It will be recognised that for self-interference cancellation an estimate of the data is being subtracted from itself, that is the estimate derives from the data channel itself rather than from a channel with an orthogonal spreading code.

Figure 1:
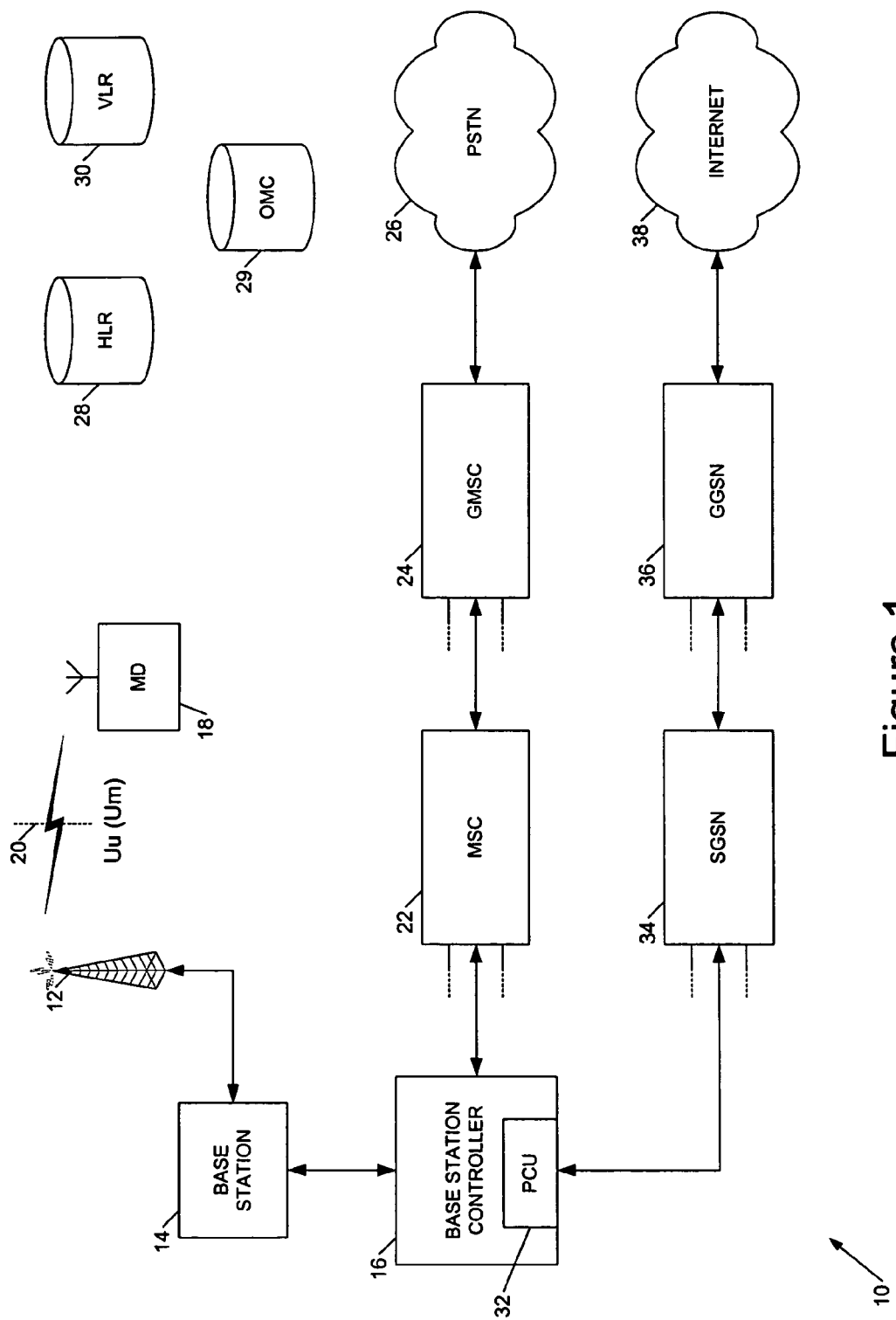
FIG. 1 shows the structure of a generic 3G mobile phone system.
Figure 2A:
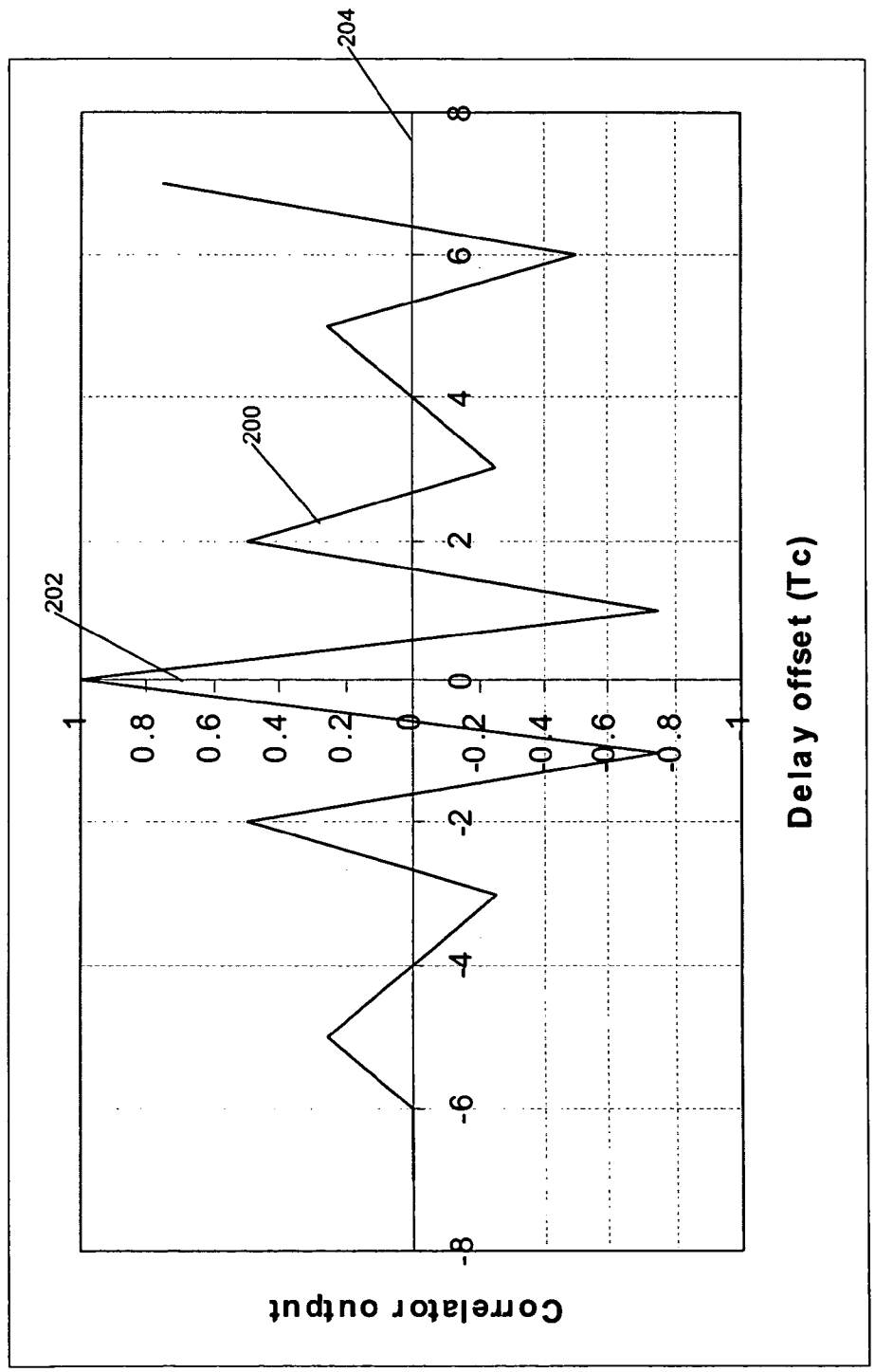
FIGS. 2a to 2c show, respectively, an auto correlation function for an OVSF code; an ideal correlator output for a signal with two multipath components; and exemplary actual correlator output for a single with two multipath components.
Figure 2B:
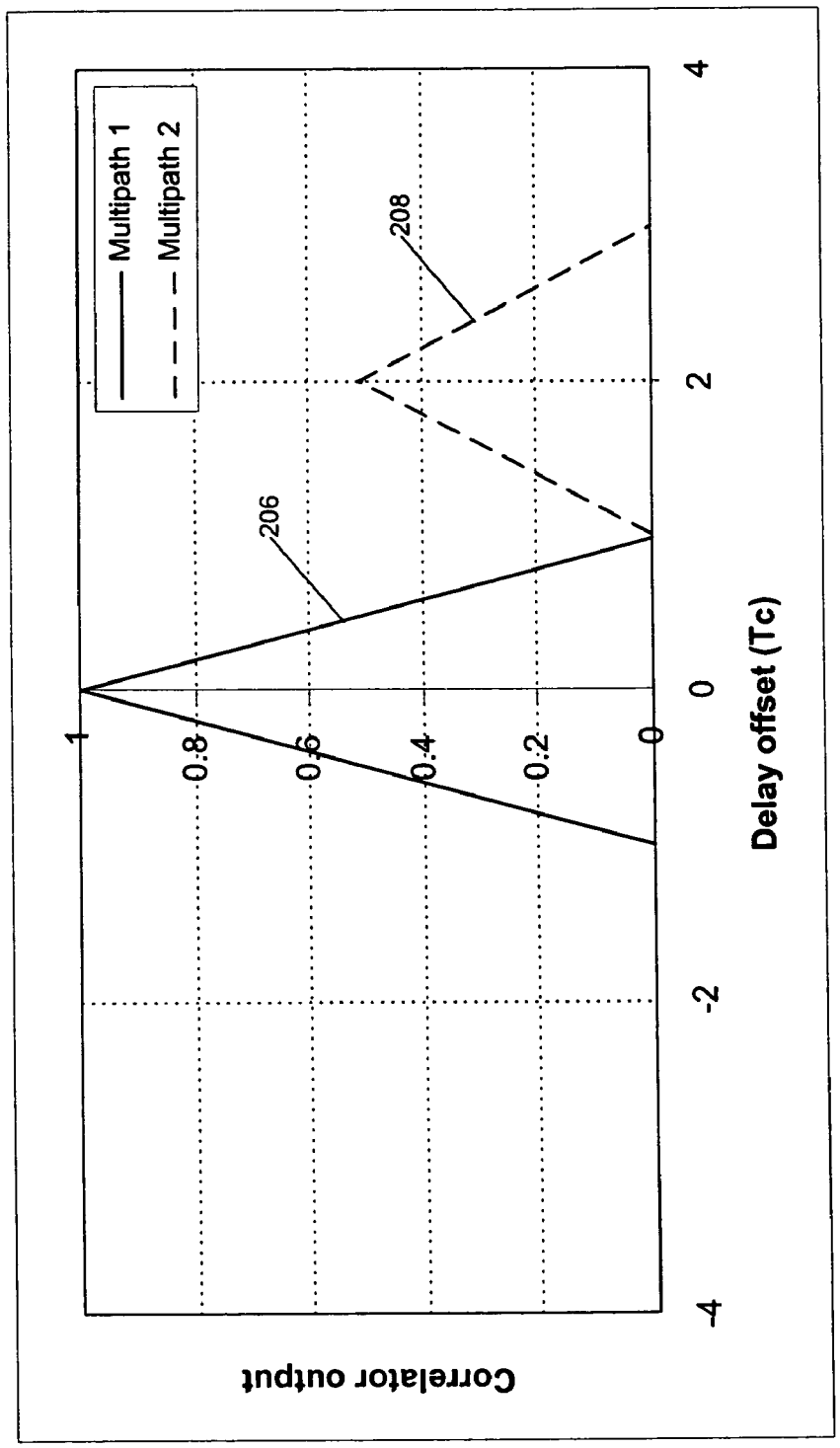
Figure 2C:
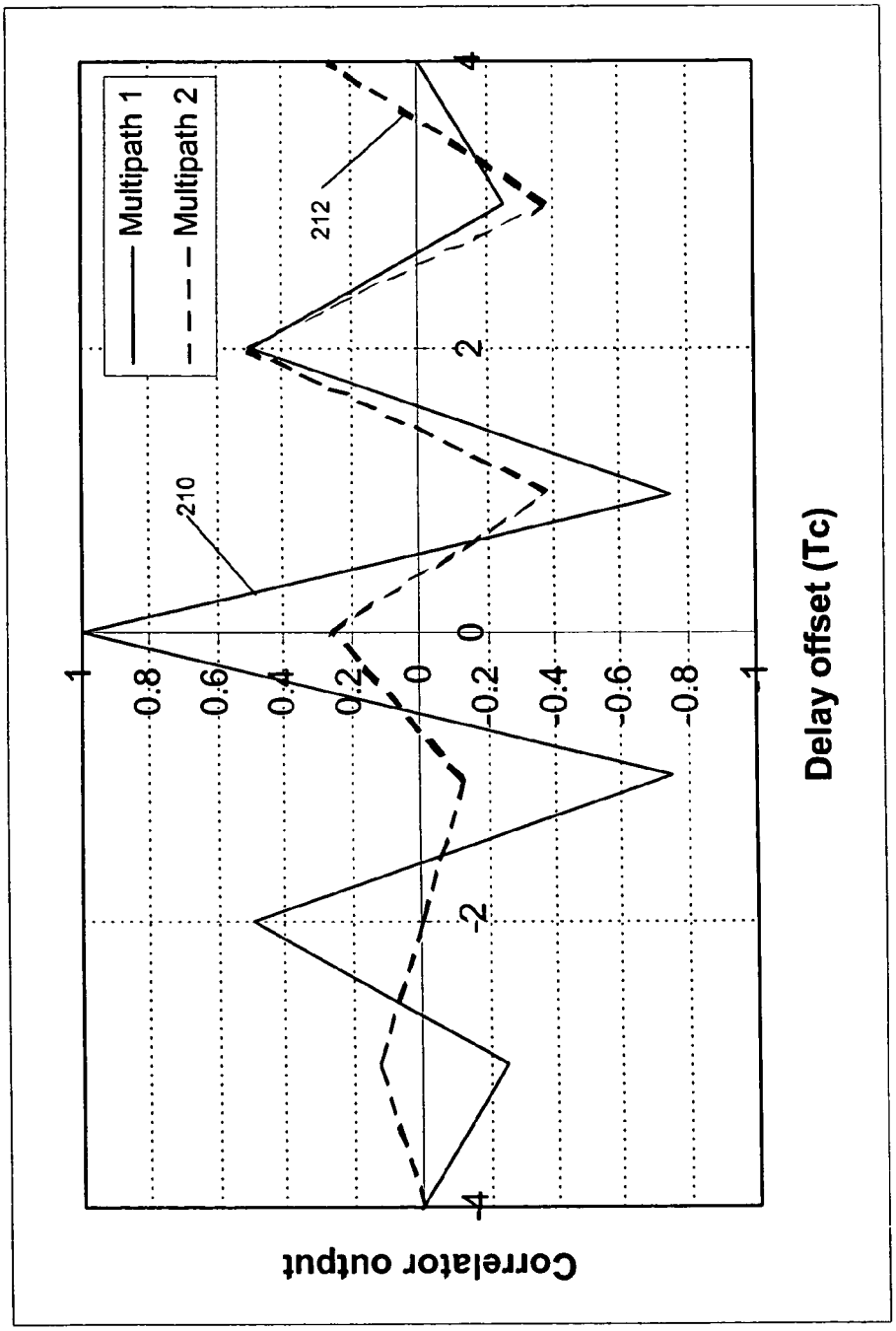
Figure 3:
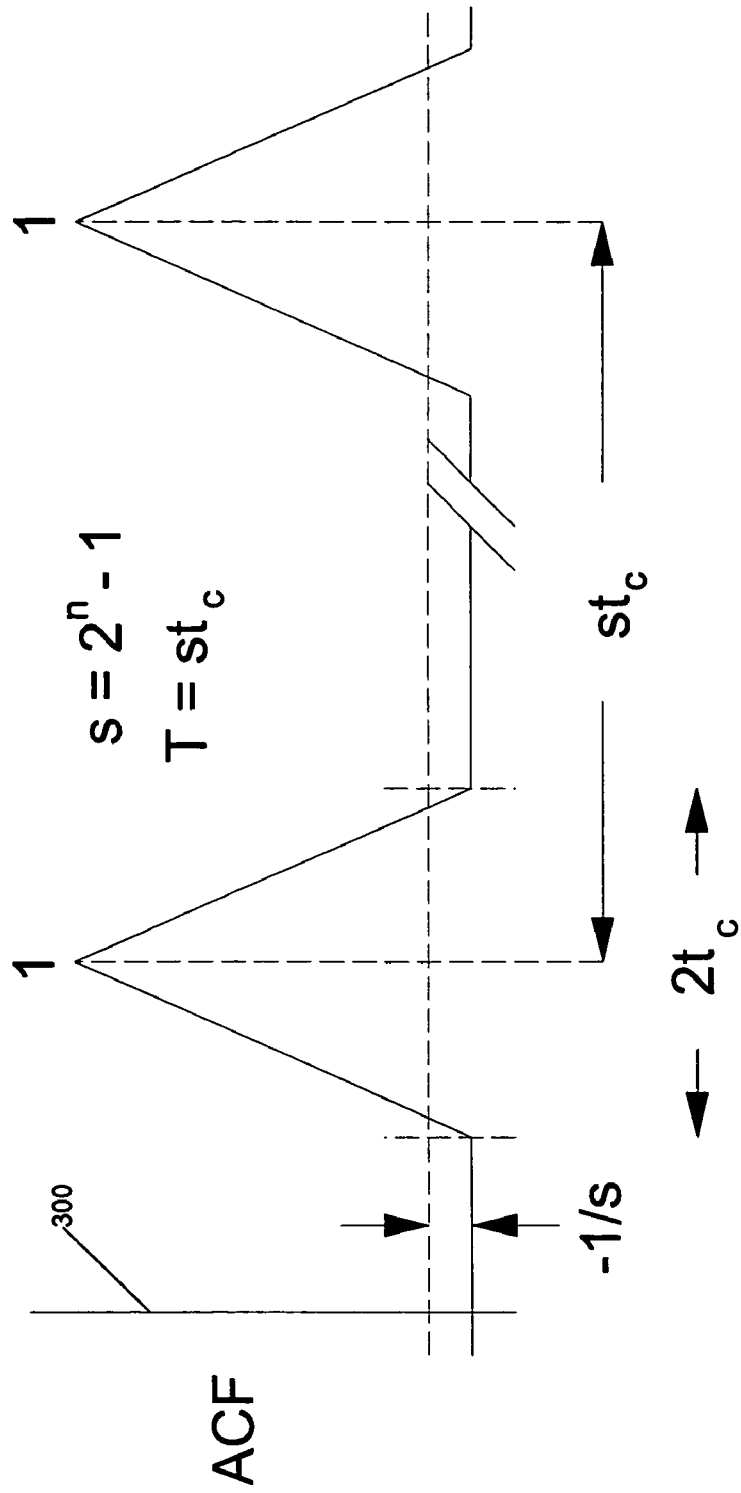
FIG. 3 shows an m-sequence auto correlation function.

The concept is to suppress the Interpath Interference (IPI) caused by the DPCH (or other channel) on itself due to the non-zero auto-correlation function when not time-aligned, as previously discussed with reference to FIG. 2. An initial bank of correlators, that is in effect a rake receiver without a combiner, is used to form an initial estimate of the signal on each multipath. These signal estimates are respread for each multipath and subtracted from the desired signal to suppress interference.

For example, consider the case of two-part model comprising paths A and B. An initial detector forms separate estimates for A and B, which are respread with the appropriate code offset for A and B respectively. These respread signals can then be subtracted from the desired signal, with the calculated interference contribution from B subtracted from the input to finger A, and vice-versa.

With this technique a channel estimate is not used explicitly in the initial detector, as the channel information is inherently retained through the despreading-integration-respreading operation.

Figure 16:
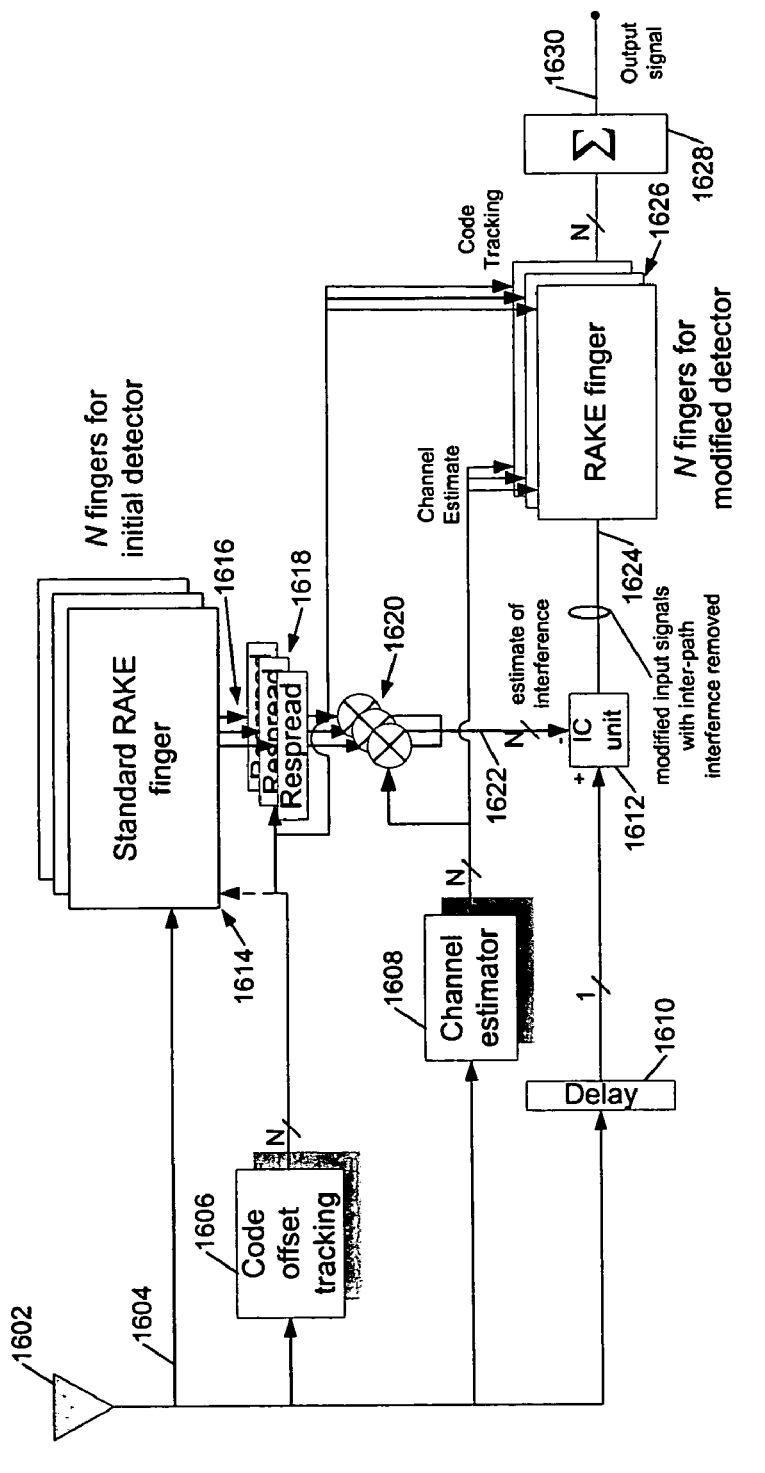
FIG. 16 shows a CDMDA rake receiver architecture for interpath interference cancellation on a dedicated data channel.

Referring to FIG. 16, this shows a spread spectrum receiver 1600 incorporating self-IPI suppression. An antenna 1602 provides a received signal 1604 to a code offset tracker 1606, a channel estimator 1608, a delay 1610 providing an output to an interference cancellation unit 1612, and to a plurality of conventional rake fingers 1614.

The rake fingers 1614 each provide a despread output 1616 comprising a despread version of a multipath component of a received DPCH signal. The rake fingers each receive one of a plurality of outputs from the code tracker 1606 and an equivalent output from the code tracker is also provided to the respreader for each rake finger. Thus the respreaders 1618 generate a plurality of respread versions of the despread DPCH signal, one respread version for each multipath component processed by the rake fingers 1614. The channel estimator 1608 provides a channel estimate for each of the multipath components and each respread version of the signal is multiplied by the corresponding channel estimate, using a plurality of multipliers 1620, to provide a plurality of interference estimates to the interference cancellation unit 1612, one estimate for each rake finger 1614. Delay 1610 compensates for the delay introduced by rake fingers 1614 and the respreading and channel estimation processes. The interference canceller suppresses the non-orthogonal interference components from the received; signal and provides a plurality of outputs 1624 to a second plurality of rake fingers 1626 which decode the interference suppressed inputs in a conventional manner. Rake fingers 1626 provide a plurality of outputs to a rake combiner 1628 which combines the signals to provide a combined demodulated output signals 1630. Although it is convenient if the number of rake fingers 1614 is the same as the number of rake fingers 1624 it is not essential that this is the case.

The previously described interference cancellers may be employed with the receiver 1600 of FIG. 16 and of these the interference canceller of FIG. 7d is preferred although the interference cancellers of, inter alia, FIGS. 7b, 7c and 8 may also be employed.

The receiver architecture shown in FIG. 16 may be modified to incorporate the CPICH and/or PCCPCH (or related) interference suppression techniques previously described and, because of the similarities of the architectures for suppression of these different signals (compare for example, FIGS. 5 and 16) the architecture of FIG. 16 is particularly suitable for this. In particular the skilled person will recognise that because both these techniques require at least some corresponding functional elements, where both IPI and self-IPI interference are to be suppressed these common functional elements may be shared reducing the complexity of the overall receiver design. In FIG. 16 a spread spectrum with two-stage IPI suppression is illustrated. The skilled person will recognise that more interference suppression stages could be concatenated and, where this is done, different interference estimate weightings may be applied at each stage, for example using the interference cancellation technique shown in FIGS. 7d, 7e or 8. Thus with four stages, and three interference cancellers at a final stage, the degree of cancellation may be increased towards the final interference cancelling stage when a better estimate should be available. For example the weightings of the subtracted interference estimates in the interference canceller unit of FIG. 7e could be set at 0.3, 0.6, and 1.0 for all fingers.

The interpath interference calculation and suppression for the dedicated channel may be implemented by the following algorithm:

1. Calculate code offset (may be combined with item 1 of the CPICH cancellation procedure);
2. Subtract the CPICH interference contribution if desired (this provides a better IPI estimate);
3. Calculate an initial estimate of the desired DPCH, averaging over one symbol;
4. Repeat 1-3 for all N fingers;
5. Respread all N signals with the desired DPCH code, incorporating the delay offset associated with each of the N multipaths/fingers;
6. Subtract the N respread versions of DPCH from the delayed received signal, to remove the estimate of inter-path interference, for example using one of the previously described cancellation strategies.

This gives the N versions 1624 of the signal shown on the output of the interference cancellation unit 1612. The next stage is to recover the desired signal:

7. Calculate code offset—this can either be performed again, or the previous estimate from item 1 above can be used. (If the code tracking is performed again, it may be carried out on the DPCH or CPICH channels, depending on whether the pilot signal has been cancelled from the desired signal. If the previous estimate is used, then a delay may be introduced to compensate for latency in the initial RAKE receiver and interference cancellation unit);
8. Subtract P-CCPCH and CPICH interference if desired;
9. Despread with desired code at correct code offset;
10. Calculate the channel estimate (this may be combined with channel estimation in CPICH cancellation);
11. Apply channel estimate;
12. Repeat 7-10 for all N fingers;
13. Sum all N fingers.

Interference cancellation within a multicode receiver will next be described. In a multicode receiver high data rates are achieved by dividing a single data stream into a plurality of separate, lower data rate streams. For example a 240 kbps data stream may either be transmitted as a single stream with a low spreading factor or as three separate 80 kbps streams each with a larger spreading factor, in this case 48 chips per symbol. Because these three separate lower speed streams are orthogonal they should not interfere with one another within any single multipath component but interpath interference will arise in a not-dissimilar fashion to that described with reference to the effects of CPICH/PCCPCH on the DPCH channel, although the relative signal strengths of the multicode transmissions will be broadly similar whereas the common channel are generally transmitted at a relatively higher power than the DPCH channel.

Figure 17:
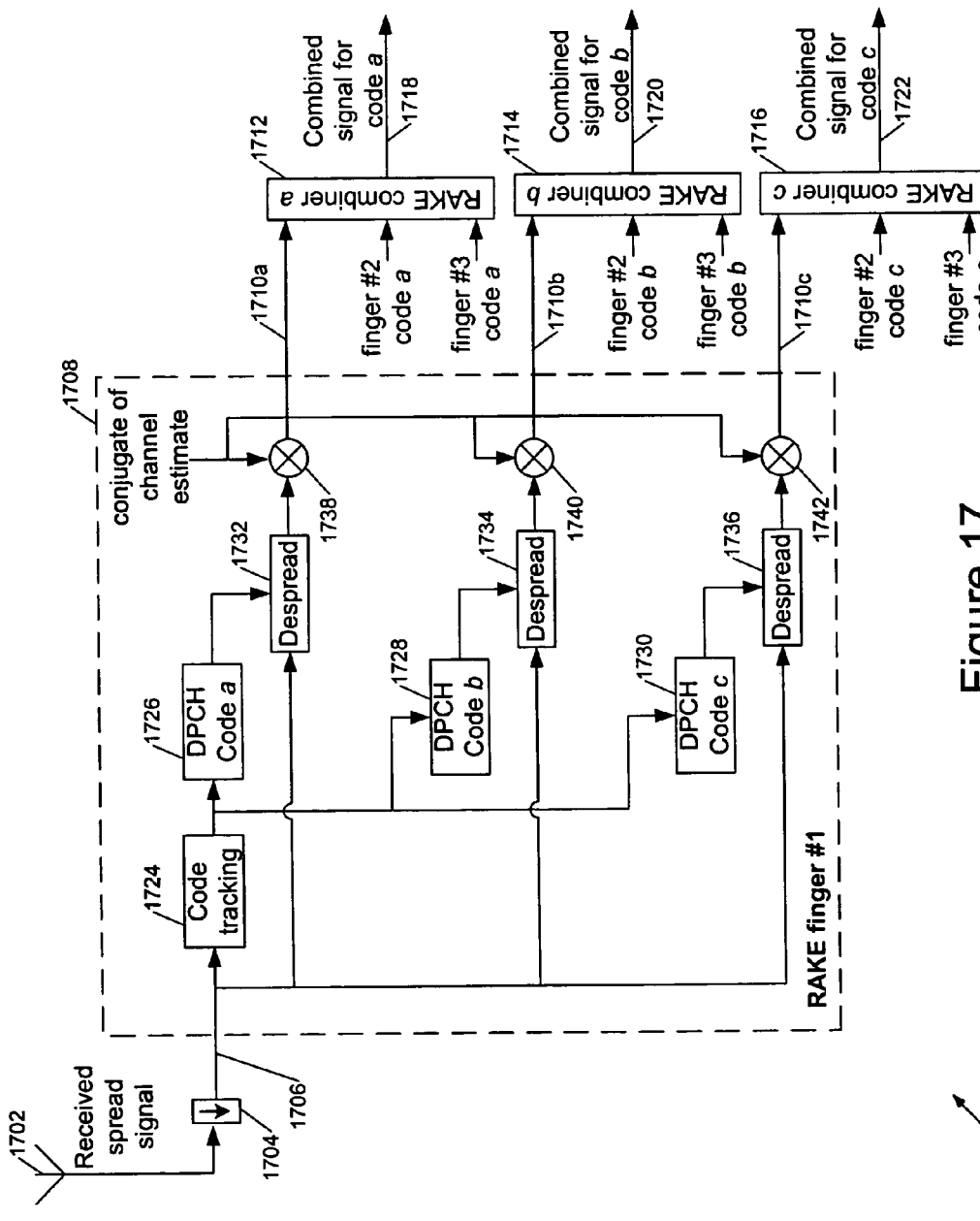
FIG. 17 shows a known WCDMA multicode rake receiver.

FIG. 17 shows a conventional multicode receiver 1700 comprising a receive antenna 1702 and a down converter 1704 to provide a down converted received signal 1706. This received signal is provided to a plurality of rake fingers, each of which decodes all the multicode signals for a given multipath component. In FIG. 17, for simplicity, only one rake finger 1708 is shown. Rake finger 1708 has the received signal 1708 as an input and provides three outputs 1710*a, b, c*, one for each multicode, for three corresponding rake combiners 1712, 1714, 1716. Each rake combiner 1712, 1714, 1716 also receives inputs from all the other fingers of the rake receiver and combines these to provide a combined, demodulated signal output. Thus, in the illustrated multicode receiver, which has circuitry for demodulating three codes a, b, c, three modulated outputs 1718, 1720, 1722 are provided for the three data signals carried by code A, code B, and code C respectively.

Referring now to the rake finger in more detail, since the same multipath component is being detected for each code, a common code tracker 1724 (for example a delay lock code tracking loop) can be used for all three codes. However a separate code generator and despreader (correlator) is required for each multicode channel, in FIG. 17 DPCH code generators 1726, 1728, 1730 and despreaders 1732, 1734, 1736 for codes A, B, C respectively. In the usual way a channel estimator (not shown) provides a channel estimate for each multipath and this is applied to each of the three despread codes by multiplying the conjugate channel estimate by the despread signal, for codes A, B, C using multiplier 1738, 1740, 1742 respectively to provide the relevant output signal 1710*a, b, c*.

Figure 18:
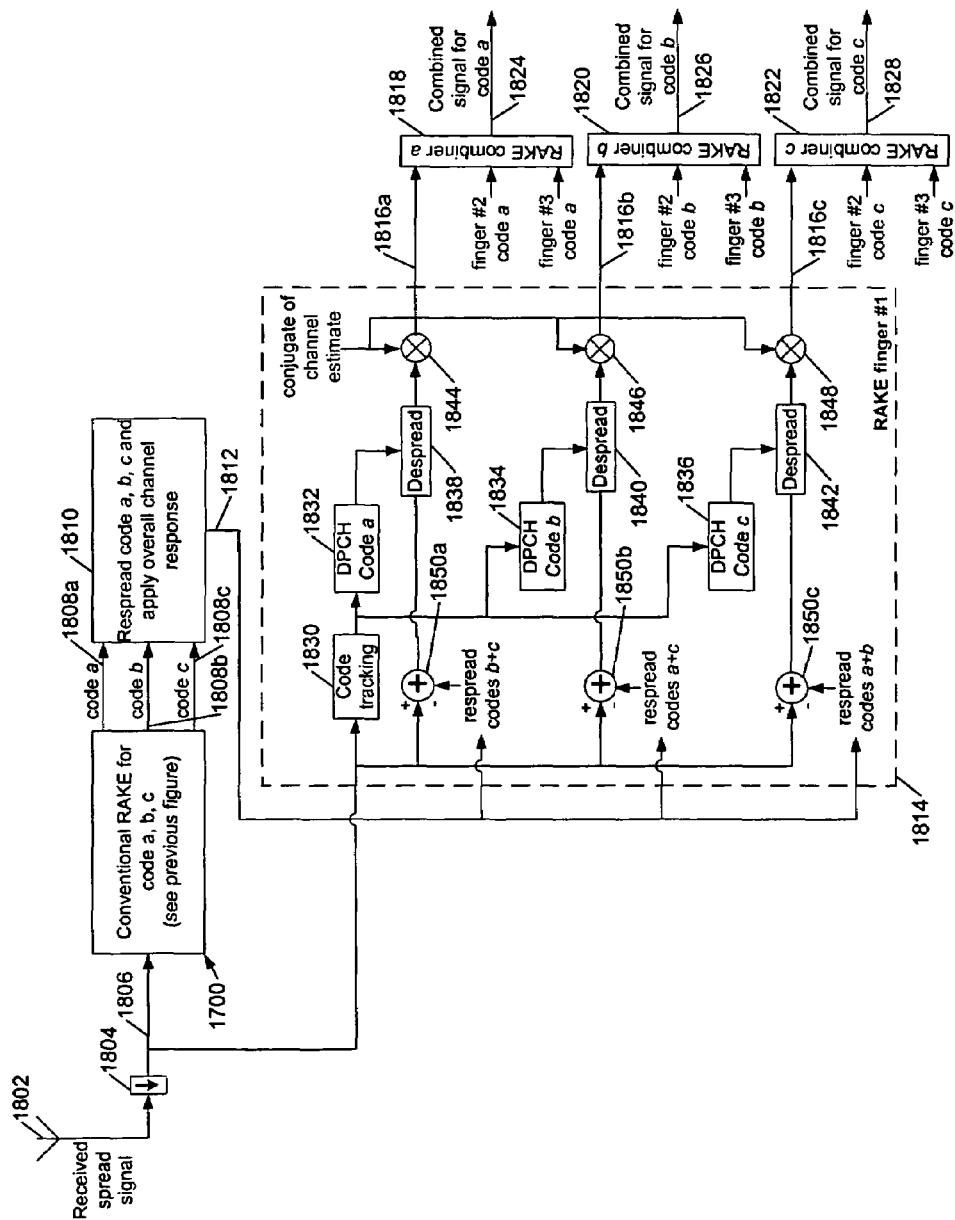
FIG. 18 shows a W-CDMA multicode rake receiver with multicode interference cancellation.

FIG. 18 shows how, based on this general multicode receiver structure, it is possible to calculate an estimate of the interference contribution from each code, and then to subtract an appropriate position.

In FIG. 18 a spread spectrum receiver 1800 comprises an antenna 1802 and down converter 1804 to provide a received signal 1806 to a conventional multicode rake receiver 1700 of the type shown in FIG. 17. Receiver 1700 is used to calculate an initial estimate 1808*a, b, c* for all the, in this example, three codes a, b, c, respectively. This estimate can be formed using one finger or multiple rake fingers and it may be formed before or after decoding. For example, a turbo or convolutional decoder may be available for decoding (and subsequent recoding) to form an improved estimate, although this may introduce an undesirable large delay. Furthermore, in a similar manner to that previously described, this initial estimate may be obtained either before combining the outputs from the rake fingers (pre-combining) or after combining the rake finger outputs (post-combining). Where a conventional rake receiver of the type shown in FIG. 17 is employed for the initial estimate a post-combining estimate is obtained; a pre-combining estimate is obtained by using the outputs 1710*a, b, c* from each rake finger of the receiver of FIG. 17 rather than the combined signals for providing a plurality of estimates for each code, one for each multipath component processed.

The initial estimate or estimates for each of codes A, B, C is (are) respread by a plurality of respreaders for simplicity illustrated as respreading block 1810 and the respread estimates are then weighted by the calculated channel estimate for each finger (in the case of pre-combining this weighting is implicit in the soft-decision, pre-combined rake finger outputs). This provides a plurality of interference estimates 1812 for subtraction from the received signal 1806.

The receiver 1800 of FIG. 18 comprises a plurality of interference canceller rake fingers, one for each multipath component to be processed, one exemplary finger 1814 of which is illustrated. Finger 1814 provides an output 1816*a, b, c* for each of codes A, B, C on one of the multipath components of the received signal, in a similar way to rake finger 1708 of the receiver 1700 of FIG. 17. Other fingers of rake receiver 1800 provide code A, B, C outputs for other multipath components of the received signal. The code A output from each rake finger are combined in a code A rake combiner 1818 providing a code A output 1824; the code B rake finger outputs are combined in a code B rake combiner 1820 to provide a code B output 1826; and the code C output from the rake fingers are combined in a code C rake combiner 1822 to provide a code C 1828.

The exemplary rake finger 1814 comprises a code tracker 1830 providing an output to code generators 1832, 1834, and 1836 for DPCH multicodes A, B, and C respectively. These in turn provide spreading code outputs of an appropriate delay to despreaders 1838, 1840, and 1842 respectively, the outputs of which are provided to respective multipliers 1844, 1846, and 1848 which apply the appropriate channel estimate to generate outputs 1816*a, b, c* from the rake finger. In this respect the rake finger 1814 operates in a corresponding manner to rake finger 1708 of FIG. 17. However the rake finger 1814 additionally incorporates an interference suppresser 1850*a, b, c* having an input from received signal 1806 and providing an output for each of despreaders 1838, 1840, 1842. Interference suppresser 1850*a* subtracts the respread estimates of codes B and C from the received path for code A; interference suppressers 1850*b* and *c* do likewise for the received paths for codes B and C, in each case subtracting the respread estimates of interference from the other codes. This interference cancellation process is preferably implemented in all fingers and for all the codes to provide a better estimate of the transmitted signal at outputs 1824, 1826, and 1828. Although not explicitly shown in FIG. 18 it will be appreciated that the respread versions of each interference estimate provided with a delay appropriate to the multipath to the finger to which the interference estimate is being applied; this may be implemented by respread lock 1810.

The procedure for determining and then suppressing the effects of multicode interference may be implemented using the following algorithm, which is described here for N fingers and k multicodes:

1. Calculate code offset (may be combined with item 1 of the CPICH cancellation procedure) for each finger,—the same code offset may be assumed to hold for all the multicodes;

2. Subtract the CPICH interference contribution if desired (to provide a better estimate of the multicode interference);

3. Calculate the k initial estimate of the desired DPCH for this fingers, averaging each over one symbol;

4. Repeat 1-3 for all N fingers (this gives N estimates for each of the k codes);

5. If a pre-combined interference estimate is required, go to item 10

6. If a post-combiner interference estimate is required, perform (rake combining e.g. MRC) on all N fingers, to give k estimates of the multicode interference;

7. Calculate the N channel estimate (may be combined with item 1 of the CPICH cancellation procedure);

8. Apply the N channel estimates to the k interference estimates, to obtain Nk interference signals, k for each multipath/finger;

9. Respread all N signals with the desired DPCH multicode, incorporating the delay offset associated with each of the N multipaths/fingers;

10. Subtract the kN respread versions of DPCH from the delayed received signal, to remove the estimate of multicode interference. For each of the N fingers, there will be up to k outputs, each corresponding to one multicode. Suitable cancellation strategies have previously been described and exemplary interference suppressors will now be further described with reference to FIG. 19.

Figure 19B:
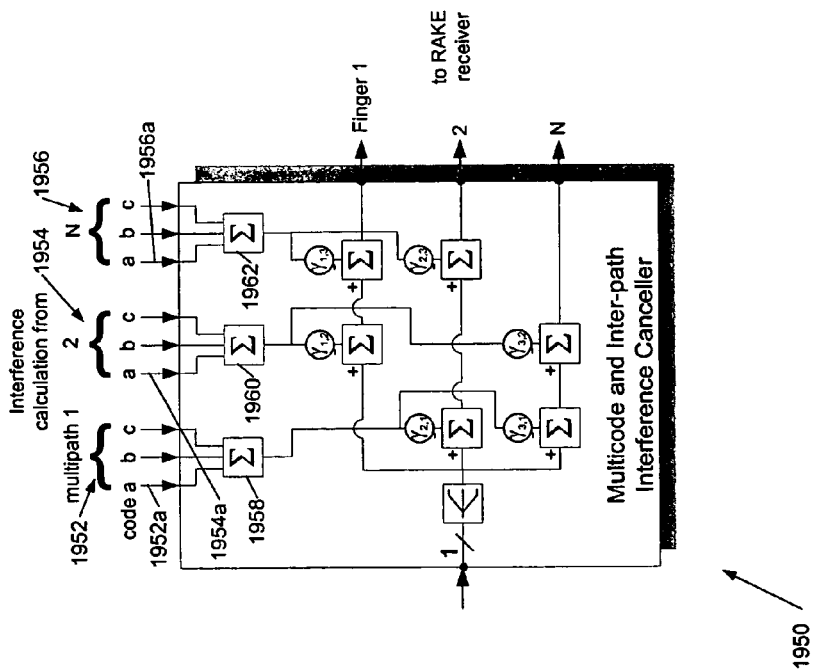
FIGS. 19a and 19b show, respectively a multicode interference canceller for use with pre- and post-combiner interference estimates; and a multicode and interpath interference canceller for use with post-combiner estimates.
Figure 19A:
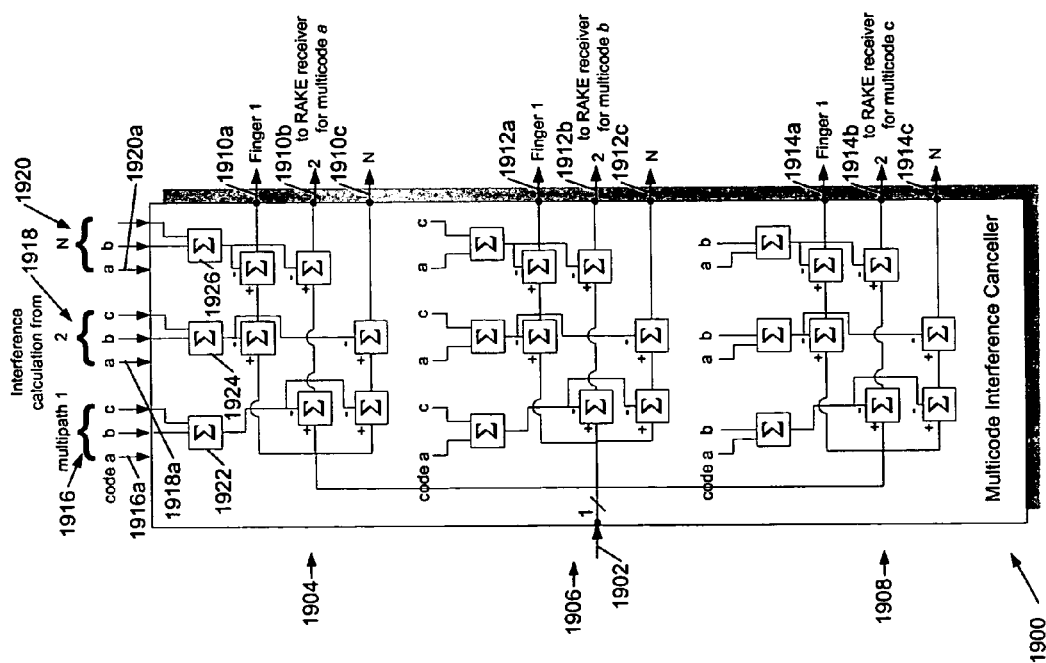

FIGS. 19a and 19b show exemplary interference cancellers 1900 and 1950 suitable for use with the rake receiver 1800 of FIG. 18 with interference suppression. In the configuration of FIG. 19a the multicode interference may be cancelled, using either pre- or post-combined interference estimates. Although not shown in FIG. 19a, this method may further comprise weighting prior to subtraction of an interference cancellation estimate, or other cancellation strategies, for example the "full cancellation" previously described with reference to FIG. 7. The architecture of the interference canceller 1950 of FIG. 19b is suitable for use where a pre-combined interference estimate is provided, and allows cancellation of both the multicode interference and the interpath interference (that is the self interference from a multicode onto itself). It will be recognised that where pre-combiner interference estimates are available the configuration of FIG. 19b may be preferred as it is able to suppress more interference than the arrangement of FIG. 19a.

In more detail, multicode interference canceller 1900 has a received signal input 1902 and a set of subtractors 1904, 1906, 1908 for each multicode. Each set of subtractors corresponds and the set 1904 of subtractors for multicode A will be described. The interference canceller 1900 have a set of outputs 1910a, b, c, one for each finger of the rake receiver for multicode A; likewise the interference canceller has a set of outputs 1912a, b, c for the rake receiver for multicode B and a further set of outputs 1914a, b, c for the multicode C receiver. The interference canceller 1900 also has a set of inputs 1916, 1918, 1920, one for each multipath component from which an interference estimate is available. Each of these sets of inputs comprises an interference estimate input for each code, in the illustrated example input 1916a, 1918a, 1920a for code A, and likewise for codes B and C.

The set of subtractors 1904 for the rake receiver for multicode A receives interference estimates for each multipath component for codes B and C (but not for code A); likewise set 1706 for the multicode B receiver has interference estimate inputs from codes A and C and set 1908 for the multicode C receiver has interference estimate input from each of the multipath components of codes A and B.

Referring to the set of subtractors 1904 for the multicode A receiver, each set of interference estimate inputs 1916, 1918, 1920 has an associated summer 1922, 1924, 1926 to sum the interference estimates from the other multicodes, in the case of multicode A, to sum the estimates for multicodes B and C. These summed estimates are then subtracted from the signals for the rake fingers of the multicode receiver A. As previously described the summed interference contribution from multipath 1 is subtracted from the signals for the rake fingers for all the other multipath components, as illustrated, the signals for rake fingers 2N. Similarly the summed interference contribution from the second multipath component is subtracted from the signals for the rake fingers processing all the multipath components set for the second multipath component, and so forth. The same general pattern is repeated for the sets of subtractors 1906, 1908 for the rake fingers of the rake receivers for the other multicodes.

The interference canceller 1950 of FIG. 19b broadly corresponds to the interference canceller 760 of FIG. 7d and thus only the additional features of this interference canceller will be described in detail. These features comprise a set of interference estimate inputs 1952, 1954, 1956, one for each multipath component. Each of these sets of inputs comprises one interference estimate input for each multicode, for example interference estimate input 1952a, 1954a, 1956a for multipath components 1, 2, N of code A respectively. Each set of inputs 1952, 1954, 1956 has an associated summer 1958, 1960, 1962 to sum the interference estimate input signals for all the codes of the multicode receiver, for each multipath component. Thus, for example, summer 1958 sums the interference estimates derived from the first multipath component of the received signal for all three (in the illustrated example) codes A, B, C.

The output of each summer provides an input to the remainder of the interference canceller, which corresponds to the interference canceller of FIG. 7d. Thus, for example the output of summer 1958 provides, in effect, a signal for input 762 of FIG. 7d, and so forth.

The foregoing interference cancellation techniques can also be applied in the context of a space-time block coded transmit diversity (STTD) spread spectrum receiver. Space-time transmit diversity uses two transmit antennas and one receive antenna, the two transmit antennas transmitting orthogonal data streams. During two symbol intervals two complex modulation symbols $S_1$, $S_2$ are transmitted from the two antennas. During a first symbol interval the first antenna transmits $S_1$ and the second antenna $-S_2^*$; during a second symbol interval the first antenna transmits $S_2$ and the second transmits $S_1^*$. Here the conjugation operation "*" inverts the phase or Q-component of the signal; the combination of operations "−*" can be performed by inverting the I-component of the signal. The signal from the first antenna is essentially a normal stream of symbols, and the signal from the second transmit antenna provides diversity broadly equivalent to having two receive antennas. To decode the STTD information the signal from the second antenna is inverted and conjugated and pairs of symbols are swapped in time and the resulting symbol stream is then combined with the symbol stream from the first antenna. Background information on STTD coding and decoding can be found in U.S. Pat. No. 6,185,258 Alamouti et al, which is hereby incorporated by reference.

Within a multipath component the signals from the two antennas are substantially orthogonal but, in a similar way to that previously described, this orthogonality between different multipath components. The result is an interference contribution from the second antenna to the signal from the first antenna and vice-versa. In the case of a spreading factor of four and a two tap channel with an equal magnitude for each path the interference from the other antenna (on the other multipath component) due to cross-correlation can be as much as 6 dB below the desired antenna signal.

Broadly speaking this interference contribution can be suppressed by calculating an estimate of the transmitted STTD stream, and re-encoding and respreading this and then subtracting off the non-orthogonal components. The skilled person will recognise that this technique may also be combined with the previously described multicode and/or IPI cancellation techniques where interference from the desired signal on the other multipath is also suppressed.

Figure 20A:
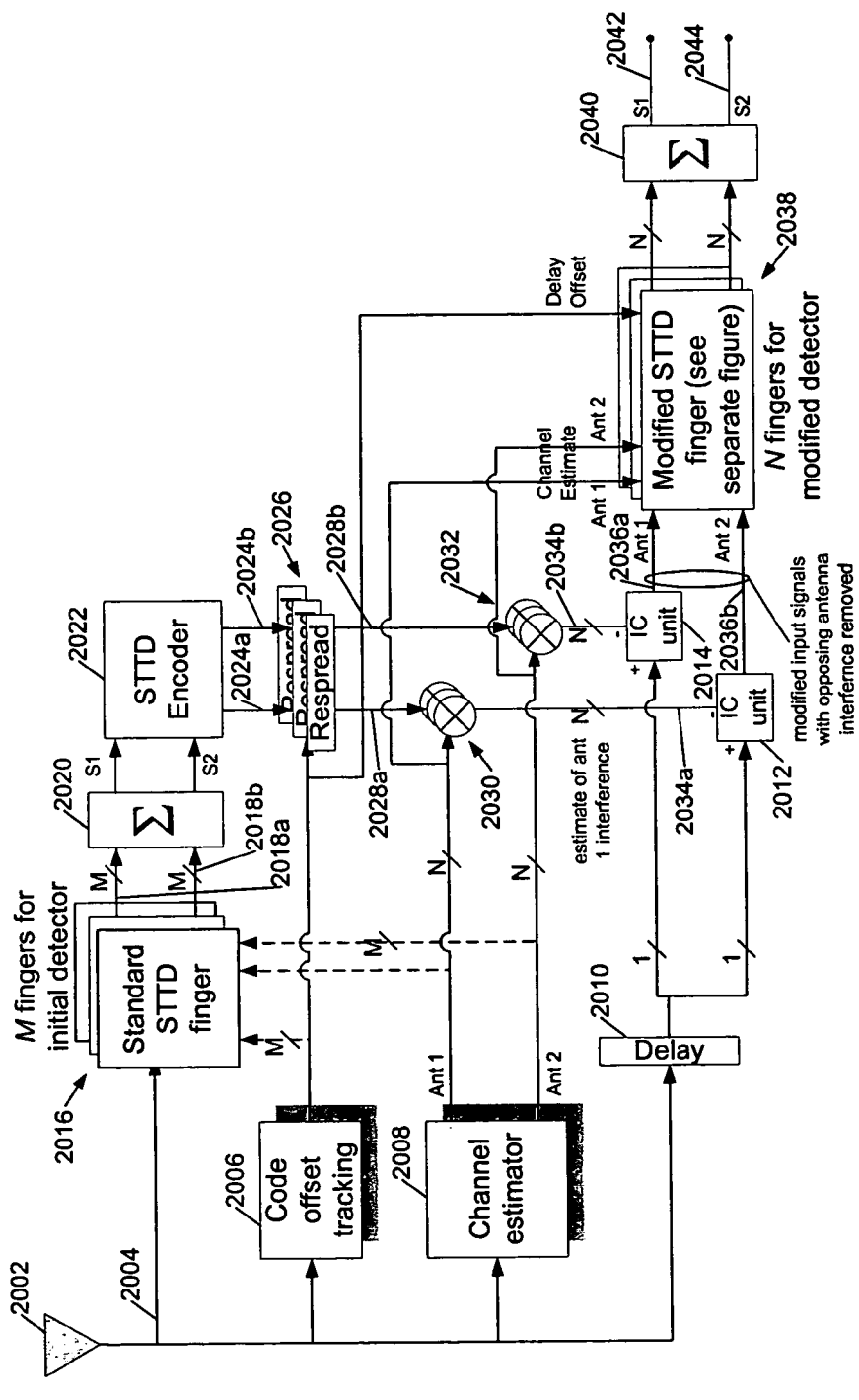
FIGS. 20a and 20b show, respectively, STTD rake receivers with interference cancellation with (a) post-rake combining estimation, and (b) with pre-rake combining estimation.

FIG. 20a shows an STTD spread spectrum receiver 2000 with opposing antenna interference suppression in which the STTD interference estimate is calculated by post-rake combining.

The receiver 2000 has a receive antenna 2002 for a received signal 2004 which is provided to a code offset tracker 2006, a channel estimator 2008, and to interference cancellation units 2012, 2014, via a delay 2010. The code offset tracker 2006 provides a plurality of code offset outputs as previously described; channel estimator 2008 provides two sets of channel estimates, each comprising a plurality of estimates for a plurality of multipath components of the received-signal, first set of estimates being provided for signals from the first transmit antenna and the second set of estimates being provided for signals from the second transmit antenna. The received signal 2004 is also provided to a plurality, M, of conventional STTD rake fingers 2016 which provide a corresponding plurality of pairs of outputs 2018a, b to a conventional STTD rake combiner 2020 which provides output estimates for signals S1 and S2 to an STTD encoder 2022. The STTD encoder 2022 encodes the estimate of the transmitted symbols S1, S2 and provides STTD output streams 2024a, b to a plurality of respreaders 2026. It will be recognised that since the purpose of the rake fingers 2016 is to provide an estimate of the transmitted symbols, any number, from 1 upwards of STTD rake fingers may be employed depending upon the quality of the estimate desired.

As well as receiving the two STTD encoded data stream estimates the respreaders 2026 also receive inputs from the code tracker 2006 to provide a plurality of respread versions of the encoded STTD data stream estimate, one for each multipath component processed by the rake receiver 2000. One set 2028a of this plurality of multipath components has the channel estimates for the first antenna applied by multipliers 2030 to provide a set of 2034a of the interference from antenna 1 to the signal received from antenna 2; a second set 2028b of the plurality of respread multipath components has a set of channel estimates for the channels from the second antenna applied by multipliers 2032 to provide a set of estimates 2034b of the interference from antenna 2 to the signal received from antenna 1. The interference estimates 2034a and 2034b are applied to the interference cancellation unit 2012 and 2014 respectively to provide prospective interference suppressed outputs 2036b and 2036a. The interference suppressed signal 2037a comprises the received signal with the non-orthogonal estimated interference contribution from the second transmit antenna suppressed; likewise the signal 2036b has the estimated interference from the first antenna suppressed. The signals 2036a, b are provided to a set of modified STTD rake fingers 2038 which provide a plurality of outputs to STTD rake combiner 2040 which provides (interference suppressed) symbol outputs 2042 and 2044 for symbols $S_1$ and $S_2$ respectively.

Figure 20B:
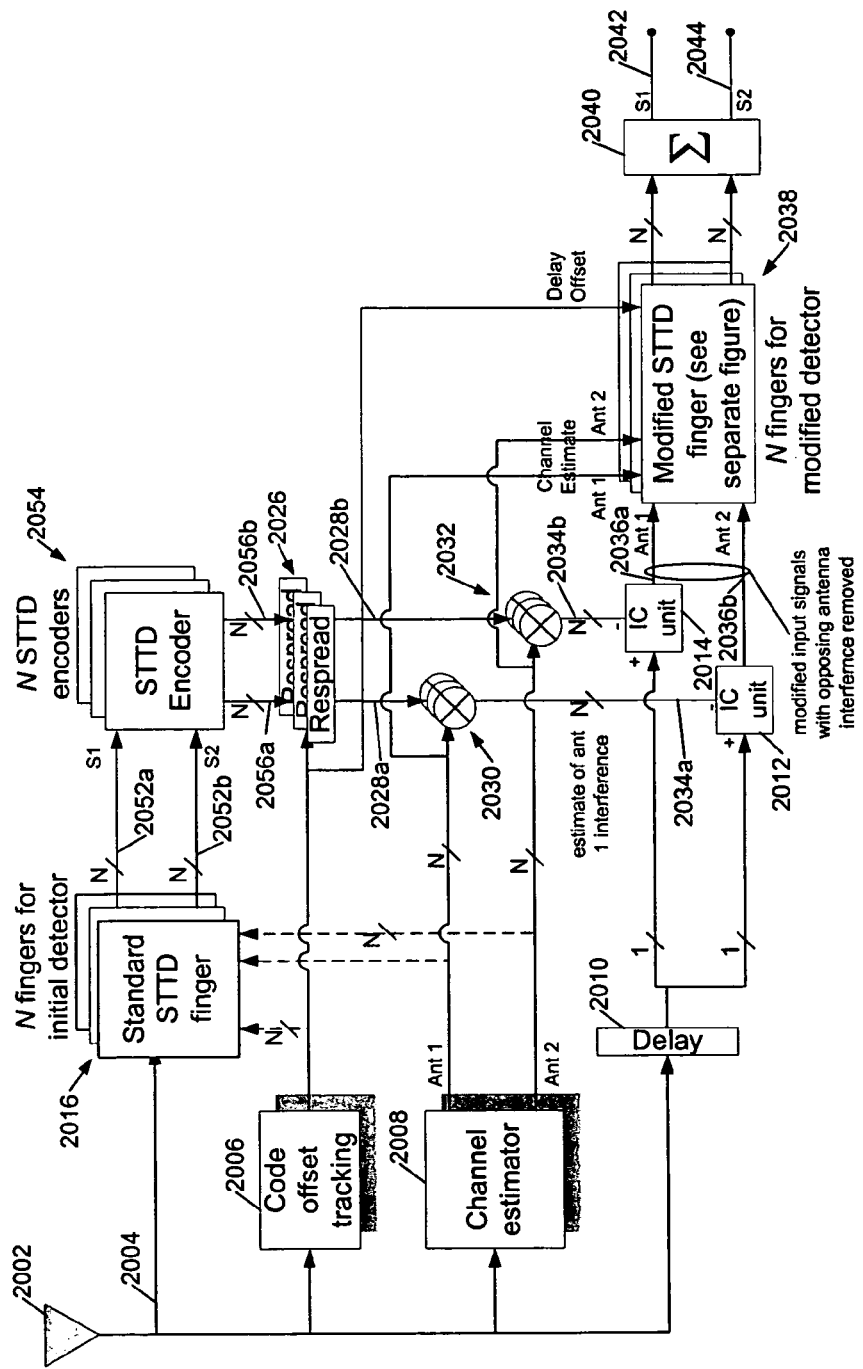

FIG. 20b shows a second STTD spread spectrum receiver 2050, broadly similar to that of FIG. 20a, but using pre-rake combining interference estimates. Thus the rake fingers 2016 for providing an initial estimate of the transmitted symbols provide a plurality of outputs 2052a, b, for symbols S1 and S2, which rather than being combined provide inputs to a corresponding plurality, N, of STTD encoders 2054. These encoders in turn provide a plurality of estimated STTD output streams 2056a, b, one for each transmit antenna, which are then respread by the plurality of respreaders 2026. Whereas in FIG. 20a each of respreaders 2026 received the same inputs 2024a, b, in the arrangement of FIG. 20b each of respreaders 2026 receives one pair of outputs from one of the STTD encoders 2054 and the corresponding code offset signal from code offset tracker 2006. Preferably, therefore, the number of STTD rake fingers 2016 used for the initial estimate formation is the same as the number of STTD decoders 2038 used for decoding the received signal to provide a decoded output, so that once interference estimate is available for each multipath component of the signal processed by the receiver.

Figure 21A:
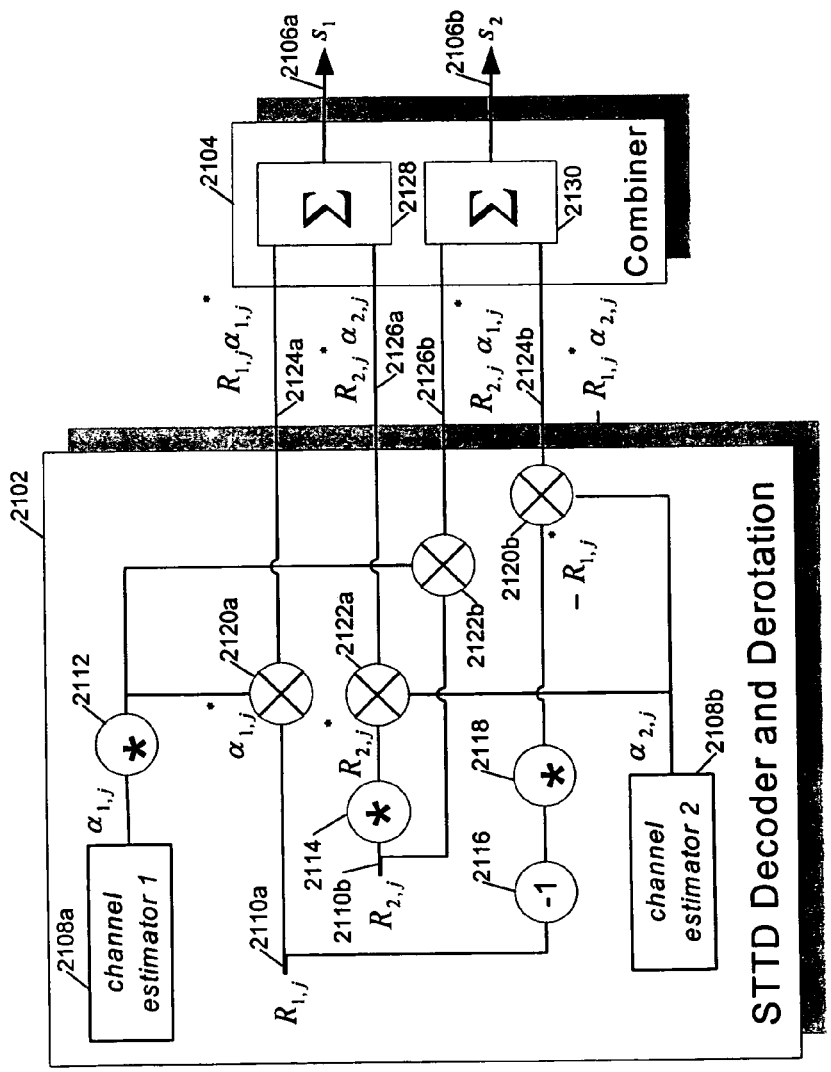
FIG. 21 shows (a) a conventional STTD decoder for a rake receiver finger; and (b) a modified STTD decoder finger for an STTD rake receiver with interference cancellation.

FIG. 21a shows a portion of a conventional STTD decoder rake finger 2100 from which for simplicity, the despreader has been omitted. A pair of received STTD symbols $R_{1,j}$ and $R_{2,j}$ where j labels a multipath component, is received an STTD decoder and derotator 2102 which provides a set of outputs to an STTD combiner 2104 which in turn provides S1 and S2 symbol outputs 2106a, b. The STTD decoder and derotator 2102 comprises (or has inputs from) a pair of channel estimators 2108a, b providing channel estimates for the relevant channels from the first and second transmit antennas. The $R_{1,j}$ signal is received at input 2110a and the $R_{2,j}$ signal is received at input 2110b. The $R_{1,j}$ signal 2110a is multiplied 2120a by the conjugate 2112 of the channel 1 estimate 2108a to provide output 2124a; the $R_{2,j}$ signal 2110b is conjugated 2114 and multiplied 2122a by the channel 2 estimate 2108b to provide output 2126a; the $R_{2,j}$ signal 2110b is also multiplied 2122b by the channel 1 estimate 2108a conjugate 2112; and the $R_{1,j}$ signal 2110a is inverted 2116, conjugated 2180, and multiplied 2020b by the channel 2 estimate 2108b to provide output 2124b. The signal outputs 2124a and 2126a are summed by summer 2128 to provide symbol 1 output 2106a, and the signal output 2126b and 2124b are summed by summer 2130 to provide symbol output 2106b.

Figure 21B:
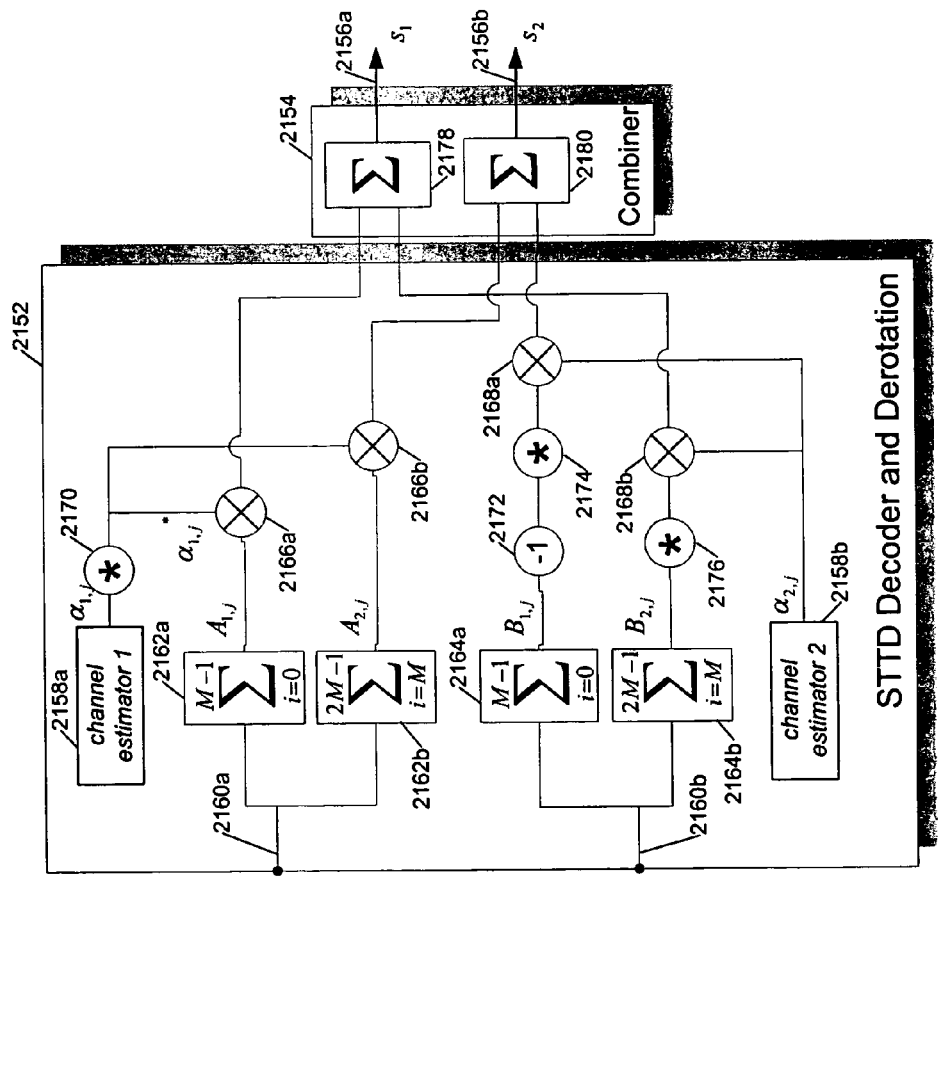

FIG. 21b shows a modified portion of an STTD decoder finger 2150. Again STTD finger comprises an STTD decoder and derotator 2152, and an STTD combiner 2154 providing respective S1 and S2 2156a and 2156b. The STTD decoder and derotator 2152 has a pair of inputs 2160a, b to receive the interference suppressed signals 2036a, b shown in the receiver 2000 of FIG. 20a. The signals from input 2160a is provided to a pair of summers 2162a, b to sum the input signal over two symbols each having M chips to provide respective outputs $A_{1,j}$ and $A_{2,j}$ for the first and second symbol periods respectively (M here should not be confused with the number of rake fingers 2016 in the receiver of FIG. 20a). Likewise input 2060b is summed in summers 2164a, b to provide outputs $B_{1,j}$ and $B_{2,j}$. The signals $A_{1,j}$ and $A_{2,j}$ are both multiplied, using respective multipliers 2166a, b, by a conjugated 2170 channel 1 estimate 2158a for the channel from the first transmit antenna. The signal $B_{2,j}$ is conjugated 2176 and multiplied 2168b by a channel estimate 2158b for the channel from the second transmit antenna, and the $B_{1,j}$ signal is inverted 2172, conjugated 2174, and then multiplied 2168a by this second channel estimate 2158b. The results of these calculations are then summed in summers 2178a and 2180 to provide the respective symbol outputs 2156a and 2156b.

The interference cancellers 2012 and 2014 in the receivers of FIGS. 20a and 20b may employ any of the techniques illustrated in FIGS. 7 and 8, although an interference canceller with weighted interference estimate contributions, such as that of FIGS. 7b, 7e, and 8, is preferred. In particular it is possible to apply the full cancellation strategy of FIGS. 7a and 7e without compromising the alamouti transform which occurs as part of the STTD operation. The STTD decoder finger 2150 of FIG. 21b may still be employed although it operates slightly differently as for each input the orthogonal signal from the transmit antenna no longer present because the entire interference contribution is being subtracted all the paths. One advantage of applying full cancellation is the significantly reduced complexity of the interference cancellers.

The delay (and hence the buffering requirements) associated with the receiver configurations of FIGS. 20a and 20b is dominated by the initial calculation of the interference contribution. In a variant of the received architecture an interference estimate may be formed directly rather than by STTD decoding/N coding in the initial detector, although this approach does not fully exploit the diversity gain associated with STTD. Once the interference contribution has been determined it can be subtracted directly from the desired signal (which has been buffered) and, broadly speaking, the limitation here is the processing speed at which the second, modified STTD calculation can be performed.

It will be recognised that, if desired, multiple stages of STTD (and IPI) interference cancellation may be concatenated to provide improved performance, albeit at the cost of increased complexity.

The post-rake combining estimate interference cancellation procedure of the receiver 2000 of FIG. 20a may be implemented using the following algorithm:

1. Calculate code offset (can be combined with item 1 of the CPICH cancellation procedure);
2. Subtract the CPICH interference contribution if desired (this provides a better STTD IPI estimate);
3. Calculate the initial estimate of the desired DPCH, applying the STTD receiver, (this process occurs over two symbols). M fingers are used for the initial detector where M may be equal to N, but can be less to reduce complexity;
4. Repeat 1-3 for all M fingers;
5. Perform rake combining (eg. MRC) and STTD decoding on all 2M fingers, to give an estimate for the pair of transmitted symbols;
6. STTD encode to give an estimate of the signal transmitted on the antennas over the two symbol interval;
7. Calculate the N channel estimate (can be combined with item 1 of CPICH cancellation);
8. Apply the N channel estimates to the two interference estimates, to obtain N interference signals for each antenna for each symbol (i.e. 4N interference estimates for each pair of symbols);
9. Respread all 4N signals with the desired DPCH multicode, incorporating the delay offset associated with each of the N multipaths/fingers;
10. Subtract the respread versions of STTD DPCH from the delayed received signal, to remove the estimate of STTD interference; for example using a previously described interference cancellation strategy.

This gives the inputs to the modified STTD fingers (shown in FIG. 21). The next stage is to recover the desired signal:

11. Calculate the code offset,—this can either be performed again, or the previous estimate from item 1 above can be used. (If the code tracking is performed again, it may be carried out on the DPCH or CPICH channels, depending on whether the pilot signal has been cancelled from the desired signal. If the previous estimate is used, then a delay may be introduced to compensate for latency in the initial RAKE receiver and interference cancellation unit).
12. Subtract P-CCPCH and CPICH interference if desired;
13. Despread with desired code at correct code offset.
14. Calculate the channel estimate (this is preferably combined with channel estimation in CPICH cancellation);
15. Apply channel estimate;
16. Repeat steps 11-15 for all N fingers;
17. Sum all N fingers.

The pre-rake combining estimate procedure of the rake receiver 2050 of FIG. 20b may be implemented by the algorithm below in which the outputs from the N fingers are not combined:

1. Calculate code offset (can be combined with item 1 in CPICH cancellation);
2. Subtract the CPICH interference contribution if desired (this provides a better STTD IPI estimate);
3. Calculate the initial estimate of the desired DPCH, applying the STTD receiver, (this process will occur over two symbols);
4. Repeat 1-3 for all N fingers;
5. Perform STTD encoding separately on all N fingers, to give estimates of the signal transmitted on the antennas over the two symbol interval;
6. Respread all signals with the desired DPCH multicode, incorporating the delay offset associated with each of the N multipaths/fingers;
7. Subtract the respread versions of STTD DPCH from the delayed received signal, to remove the estimate of STTD interference, for example using a previously described cancellation strategy. This could be combined with subtracting the IPI due to the desired antenna signal as described with reference to dedicated channel IPI cancellation.

This gives the input to the modified STTD fingers (shown in FIG. 21). The next stage is to recover the desired signal:

8. Repeat items 11-17 for the post-combined estimate (as described above).

The operation of the STTD receivers 2000, 2050 of FIG. 20a and FIG. 20b may be better understood by considering underlying mathematics. In a conventional STTD receiver, the following calculations are performed to determine an estimate for symbol S1 and S2 respectively, for the jth multipath (where $\alpha^*$ represents a conjugate channel response, $\hat{\alpha}$ an estimated channel response and N a noise component; '1' and '2' label signals from the first and second transmit antennas):

$$R_{1,j}\hat{\alpha}_{1,j}^* + R_{2,j}^*\hat{\alpha}_{2,j} = (\alpha_{1,j}\hat{\alpha}_{1,j}^* + \alpha_{2,j}^*\hat{\alpha}_{2,j})S_1 + (\alpha_{1,j}^*\hat{\alpha}_{1,j} - \hat{\alpha}_{2,j}^*\alpha_{2,j})S_2^* + N_{1,j}\hat{\alpha}_{1,j}^* + N_{2,j}^*\hat{\alpha}_{2,j} \qquad \text{Equation 1}$$

$$-R_{1,j}^*\hat{\alpha}_{2,j} + R_{2,j}\hat{\alpha}_{1,j}^* = (\alpha_{1,j}\hat{\alpha}_{1,j}^* + \alpha_{2,j}^*\hat{\alpha}_{2,j})S_2 + (\hat{\alpha}_{1,j}^*\alpha_{2,j} - \alpha_{1,j}^*\hat{\alpha}_{2,j})S_1^* - N_{1,j}^*\hat{\alpha}_{2,j} + N_{2,j}\hat{\alpha}_{1,j}^* \qquad \text{Equation 2}$$

where if $\hat{\alpha}_{1,j} = \alpha_{1,j}$ and $\hat{\alpha}_{2,j} = \alpha_{2,j}$ (i.e. perfect channel estimation) then -continued $$E[S_1] = (|\alpha_{1,j}|^2 + |\alpha_{2,j}|^2)S_1 + N_{1,j}\alpha_{1,j}^* + N_{2,j}^*\alpha_{2,j} \quad \text{Equation 3}$$

$$E[S_2] = (|\alpha_{1,j}|^2 + |\alpha_{2,j}|^2)S_2 - N_{1,j}^*\alpha_{2,j}^* + N_{2,j}\alpha_{1,j}^* \quad \text{Equation 4}$$

However, in the modified STTD receiver of FIGS. 20a and 20b, with interference cancellation, there are two inputs, denoted A and B instead of R (for antennas 1 and 2 respectively). The two inputs (over two symbols) are shown here. In both cases, the estimate of the transmitted symbol (combined with the channel estimate) is subtracted from the desired signal.

$$A_{1,j} = (\alpha_{1,j}S_1 - \alpha_{2,j}S_2^*) + \hat{\alpha}_{2,j}\hat{S}_2^*$$

$$A_{2,j} = (\alpha_{1,j}S_2 + \alpha_{2,j}S_1^*) - \hat{\alpha}_{2,j}\hat{S}_1^*$$

$$B_{1,j} = (\alpha_{1,j}S_1 - \alpha_{2,j}S_2^*) - \hat{\alpha}_{1,j}\hat{S}_1$$

$$B_{2,j} = (\alpha_{1,j}S_2 + \alpha_{2,j}S_1^*) - \hat{\alpha}_{1,j}\hat{S}_2 \quad \text{Equation 5}$$

Thus, this configuration gives the expression for, for example symbol S1 with suppression of the opposing antenna interference as:

$$A_{1,j}\hat{\alpha}_{1,j}^* + B_{2,j}^*\hat{\alpha}_{2,j}^* = \quad \text{Equation 6}$$
$$(\alpha_{1,j}\hat{\alpha}_{1,j} + \alpha_{2,j}\hat{\alpha}_{2,j})S_1 + (\alpha_{1,j}^*\hat{\alpha}_{2,j} - \hat{\alpha}_{1,j}^*\alpha_{2,j})S_2^* +$$
$$(\hat{\alpha}_{1,j}^*\hat{\alpha}_{2,j} - \hat{\alpha}_{1,j}^*\hat{\alpha}_{2,j})\hat{S}_2^* + N_{1,j}\alpha_{1,j}^* + N_{2,j}^*\alpha_{2,j}$$

It can be seen that the third term ($\hat{S}_2^*$) exactly equal to zero. Thus, subtracting the interference contribution will have no degradation on the performance of a system operating with a single path, as compared to a conventional receiver system. A similar expression is obtained for symbol S2. It can therefore be recognised that it is possible to perform full cancellation of the opposing antenna signal (i.e. to use the arrangement of, say, FIG. 7a) without degrading the overall performance. This therefore simplifies the overall interference subtraction process.

Furthermore, if $\hat{\alpha}_{1,j} = \alpha_{1,j}$ and $\hat{\alpha}_{2,j} = \alpha_{2,j}$ (i.e. perfect channel estimation) then the expected values for S1 and S2 are again given by equations 3 and 4. Thus, the application of interference cancellation on the channel estimation (suppressing IPI on the CPICH) will ideally give a better estimate, and therefore improve the signal quality at the output of the STTD decoder. It may be noted that this performance gain is in addition to the advantage accrued by suppressing the IPI from one transmitted antenna stream to the other (and vice versa).

The previously described interference cancellation techniques may be combined to achieve additional improvements in received signal quality. Some exemplary combinations will be described here but the skilled person will recognise that combinations other than those explicitly described are also possible.

Figure 22:
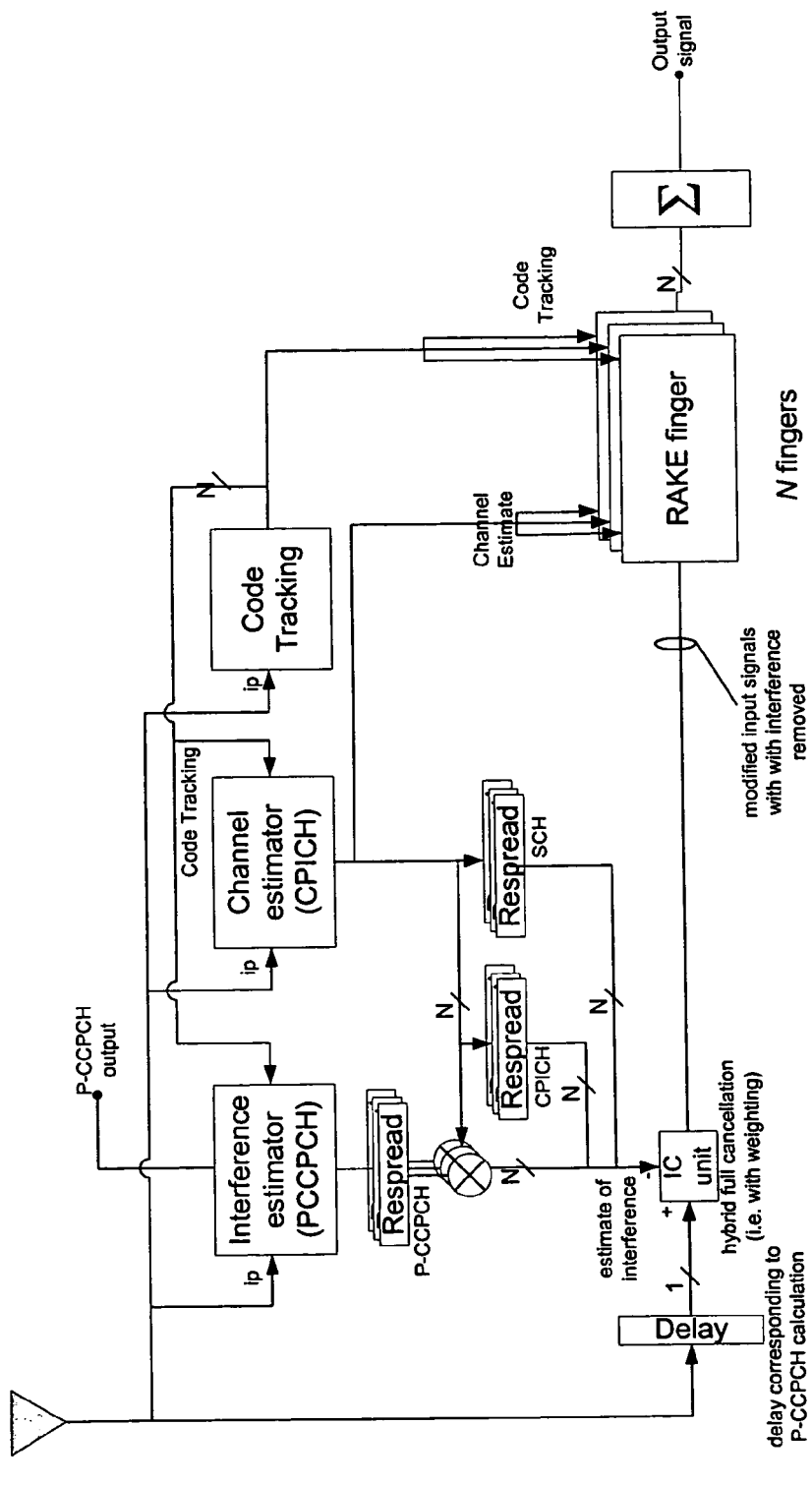
FIG. 22 shows a rake receiver for a terminal with PCCPCH, SCH and CPICH cancellation.

FIG. 22 shows a receiver 2200 in which interference contributions from CPICH, SCH and P-CCPCH are suppressed. The receiver implements the following algorithm:

(i) Calculate code offset;

(ii) Calculate channel estimate, and use this to reform the CPICH and SCH channels (see above description of CPICH/SCH cancellation);

(iii) Calculate P-CCPCH (see above description of PCCPCH cancellation);

(iv) Remove CPICH, SCH and P-CCPCH, for example with hybrid full cancellation (i.e. minimum complexity, but with weighting, see FIG. 7e). The weighting which is applied preferably depends on the quality of the interference estimate, for example depending on the relative signal powers of the different channels;

(v) Calculate dedicated channel, using the previously formed channel estimate and code offset (alternatively, the additional complexity of an extra channel estimator/code tracker can be used to provide a better estimate).

Figure 23:
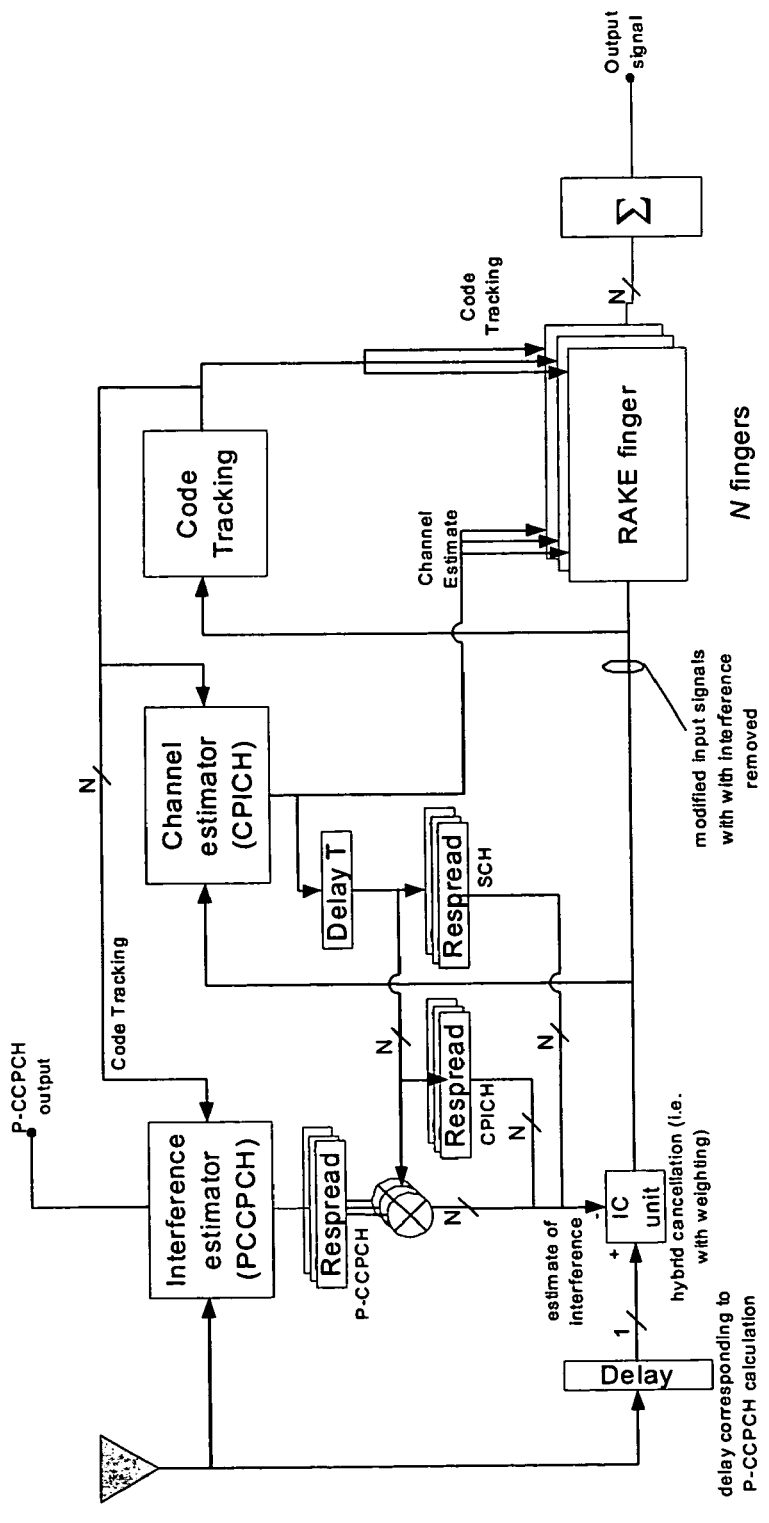
FIG. 23 shows a rake receiver for a terminal with PCCPCH, SCH and CPICH cancellation, with improved with CPICH interference estimation.

FIG. 23 shows an improved spread spectrum receiver 2300, also suppressing interference contributions from CPICH, SCH and PCCPCH that employing what have been termed above post-cancellation channel estimates with the aim of improving the interference suppression. The receiver implements the following algorithm:

(i) Calculate code offset (ii) Calculate P-CCPCH (see above description of PCCPCH cancellation), using a previous or earlier channel estimate and previous code offset (with an appropriate delay). A choice of a pre- or post-combined interference estimate may be made depending on level of noise present (for example, using a pre-combiner at low SNR and post-combining at high SNR);

(iii) Use the previous channel estimate to reform the CPICH and SCH channels (see above description of CPICH/SCH cancellation);

(iv) Remove CPICH, SCH and P-CCPCH interference estimates preferably with hybrid cancellation (see FIG. 7d). The weighting that is applied preferably depends on the quality of the interference estimate, for example depending on the relative signal powers of the different channels. (This method suppresses the IPI from the common channels, but does not remove them from a particular path);

(v) Calculate a new channel estimate and code offset from the modified input signal (with interference removed) to form an enhanced estimate, (it is possible to calculate a new channel estimate as the CPICH has not been removed, merely the IPI from the CPICH on other paths);

(vi) Calculate the dedicated channel output.

Figure 24:
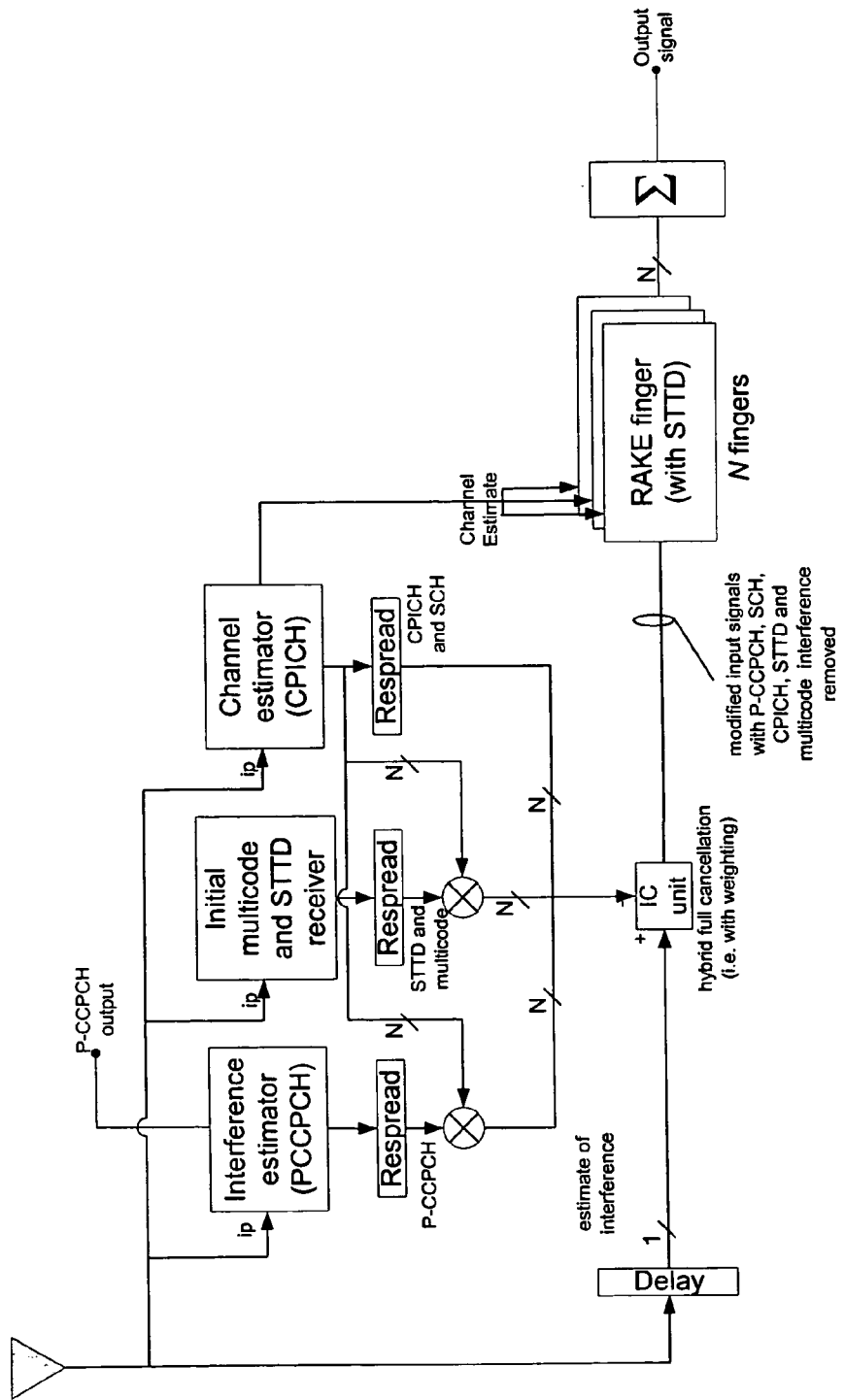
FIG. 24 shows a rake receiver for a terminal with common channel STTD and multicode interference cancellation.

FIG. 24 shows a spread spectrum receiver 2400 in which certain parts of the dedicated channel interference are cancelled, although not the IPI from a desired DPCH code onto itself. In the receiver of FIG. 24 STTD and multicode interference contributions are suppressed. The receiver implements the following algorithm:

(i) Calculate code offset;

(ii) Calculate channel estimate, and use this to reform the CPICH and SCH channels (see above description of CPICH/SCH cancellation);

(iii) Calculate P-CCPCH (see above description of PCCPCH cancellation) (choice of pre- or post-combined interference estimate depending on level of noise present— for example, use pre-combiner at low SNR and post—at high SNR;

(iv) Calculate estimate of multicode dedicated channels (see above description of multicode interference cancellation)—again, either pre- or post-combiner estimates can be used.

(v) Calculate estimate of STTD antenna streams (see above description of STTD interference cancellation), with interference estimate formed either before STTD reception and combining, or after STTD reception/combining, but before rake combining, or after rake combining and STTD reception/combining;

(vi) Remove common channels, multicode and STTD interference estimates with hybrid full cancellation (see FIG. 7e and FIG. 9a). The weighting that is applied depends on the quality of the interference estimate; in this example the IPI from a desired multicode for a particular finger is not suppressed;

(vii) Calculate dedicated channel, using the previously formed channel estimate and code offset, (alternatively, the additional complexity of an extra channel estimator/code tracker may be used to provide a better estimate).

Figure 25:
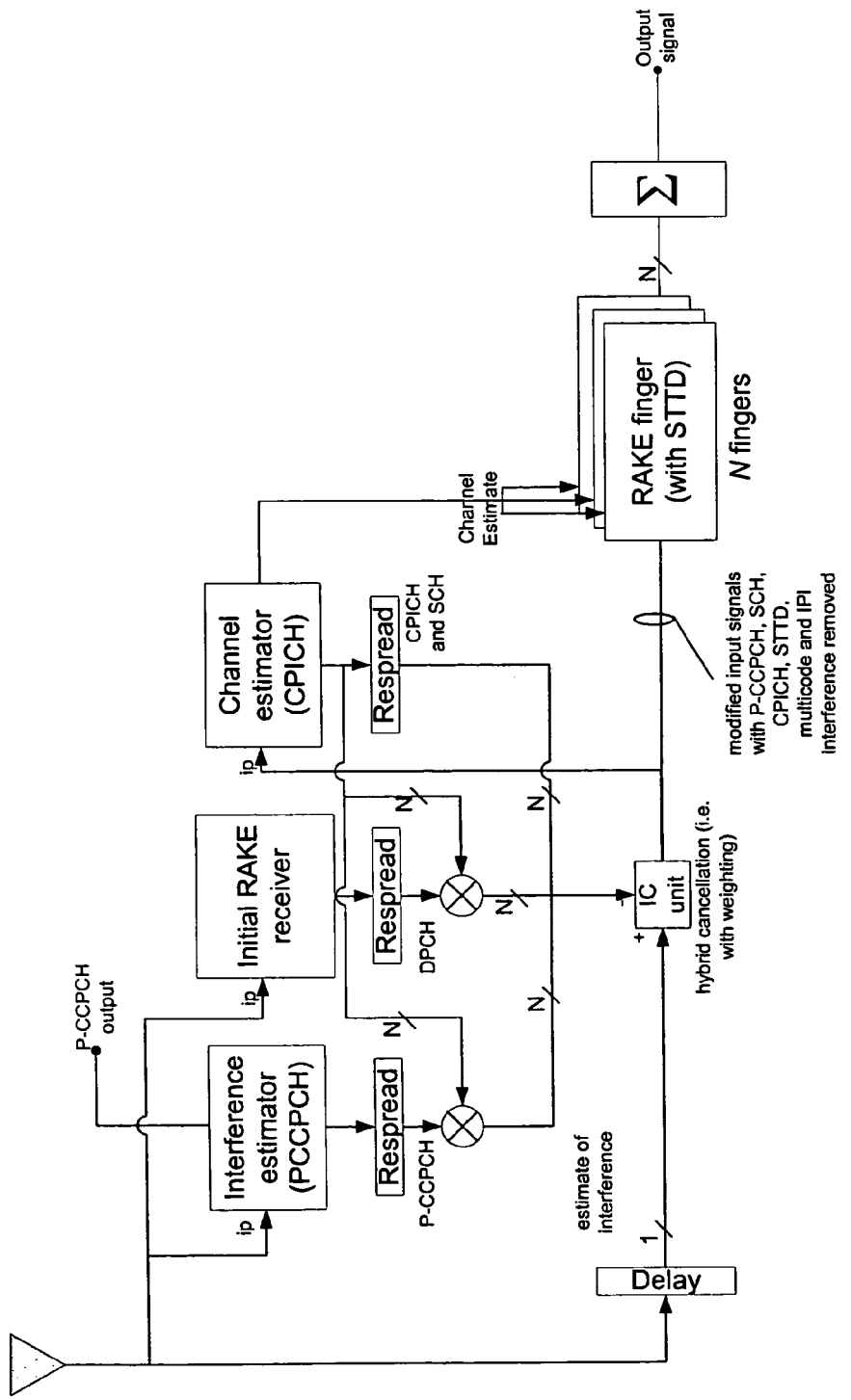
FIG. 25 shows a rake receiver for a terminal with common channel, STTD, multicode, and DPCH IPI cancellation.

FIG. 25 shows a spread spectrum receiver 2500 similar to the receiver 2400 of FIG. 24 but additionally configured to suppress interpath interference resulting from the desired DPCH channel and code (see FIG. 16 and the accompanying description of dedicated channel IPI suppression). The receiver implements the following algorithm:

(i) Calculate code offset;

(ii) Calculate P-CCPCH (see above description of PCCPCH cancellation), using a previous or earlier channel estimate and previous code offset (with an appropriate delay). Choice of pre- or post-combined interference estimate depending on level of noise present (for example, use pre-combiner at low SNR and post—at high SNR);

(iii) Use the previous channel estimate to reform the CPICH and SCH channels (see above description of CPICH/SCH cancellation);

(iv) Calculate estimate of multicode dedicated channels (see above description of multicode cancellation), using pre-combiner estimates;

(viii) Calculate estimate of STTD antenna streams (see above description of STTD cancellation), with interference estimate formed either before STTD reception and combining, or after STTD reception/combining, but before rake combining, or after rake combining and STTD reception/combining;

(ix) Remove common channels, DPCH IPI multicode and STTD interference estimates with hybrid cancellation (see FIG. 7d and FIG. 19b). The weighting that is applied depends on the quality of the interference estimate. (This method suppresses the IPI from the available channels, but does not remove them from a particular path);

(x) Calculate a new channel estimate and code offset from the modified input signal (with interference removed) to form an enhanced estimate;

(xi) Calculate dedicated channel output, using the new channel estimate and code offset.

Broadly speaking the general concept is to remove interpath interference which arises due to non-zero cross and auto-correlation of the spreading codes. The source of the interference that is removed can be the known common channels, such as CPICH and PCCPCH, or the desired signal itself, either through direct interference between paths, or from the impact of multicodes or transmit diversity. Any or all of these interference contributions may be removed depending upon what combinations of the above-described techniques are applied.

The advantages of applying these types of techniques although seemingly relatively small are significant, providing terminals with improved performance vis-a-vis interference or higher capacity. The loss of orthogonality which is observed can be significant, for example 40%, implying that 40% (−4 dB) of the intracell power is observed as interference. Applying these figures to normative test powers described in 3GPP implies that the intracell interference power will often be larger than intercell interference power. Since approximately 20% of the intracell interference power is allocated to the common channel, this can form a significant portion of the interference.

For example, taking 3GPP case 1 with a data rate of 384 kbps and a desired BER of $10^{-2}$ (i.e. high quality, high rate target), approx. 60% of the intracell power is allocated to the high rate user, with the remaining power split between other users (20%) and the common channels (20%). Thus the intracell interference may be reduced by as much as 3 dB by cancelling the common channels. The overall decrease in interference is dependent on the ratio of inter- to intra-cell power, but is likely to be 1-2 dB. This approximately corresponds to an increased throughput of 25-60%. These approximate figures do not include the impact of dedicated channel IPI (or its removal); inclusion of this will provide larger improvements in performance, albeit at the expense of greater complexity.

In the foregoing discussion a number of interference cancellation structures are have been described, including serial, parallel cancellation or a hybrid structure (where different interference contribution are weighted differently). These are especially suitable for a user-end cellular mobile communications terminal. The weighting which occurs depends on the confidence in the interference estimate, and ranges from zero (no confidence, interference for this finger is not subtracted) to one (full confidence, the entire interference contribution is extracted). Different weightings can be applied for each finger and for each interference contribution. A full cancellation method is described which requires a lower number of operations but removes the signal (and therefore this signal cannot be used post-cancellation). Application of this method is also discussed. Subtraction of interference can be performed at the chip level (generally through respreading the interfering signal) or at the symbol level (by applying the cross-correlation between desired and unwanted codes). A further technique is described where the previous channel estimate is used to cancel interference. This allows a new, more accurate estimate to be made, whilst also cancelling the interference from the dedicated channel without requiring more channel estimator operations. When there is no a priori knowledge of transmitted data (e.g. broadcast channel, and dedicated channel) interference cancellation can be done with either "softer", "soft" or "hard" decisions, corresponding to: before combining (i.e. one soft decision per finger/multipath), after combining, with soft output, and after combining with hard decision. Cancellation is applied to the inter-path interference (IPI) observed in the dedicated channel. Weighting of the subtracted interference contributions is introduced to maximise performance. Multiple stages of IPI cancellation can be introduced to provide an increasingly accurate estimate of interference to subtract. Interference cancellation applied to multicode DPCH is also described. Here the interference contribution from one multicode to another is removed. Furthermore, it can be combined with IPI cancellation (above) where the interference from a multicode onto itself is suppressed. Interference cancellation on the dedicated channel can be performed in multiple stages (two or more) where the initial stages form increasingly accurate representations of the interference signal, and the final stage calculates the symbol estimate used.

Interference cancellation applied to STTD is described. Here the cancellation occurs between the two transmitted streams, to remove interference arising from loss of orthogonality. An architecture for interference calculation and cancellation and method for full cancellation of all interference is described. It is demonstrated that orthogonality is maintained, even when the opposing transmit antenna stream is entirely cancelled from all fingers/multipaths. Interference cancellation can be applied to the STTD using estimates formed at a number of stages: (a) before STTD reception and combining, (b) after STTD reception/combining, but before rake combining, or (c) after rake combining and STTD reception/combining. In cases (b) and (c) the signals in the receiver are STTD encoded to reform the transmitted signal to suppress interference. Exemplary combinations of these cancellation techniques have also been described.

No doubt many other effective alternatives will occur to the skilled person and the invention is not limited to the described embodiments but encompasses modifications within the spirit and scope of the attached claims.

We claim:

1. A multicode receiver for receiving data carried by a plurality of spread spectrum signals having a corresponding plurality of spreading codes, the spreading codes being substantially mutually orthogonal, the receiver having intercode interference suppression, the receiver comprising:
   a multicode spread spectrum receiver to provide a set of data estimates comprising a plurality of estimates of data carried by said plurality of spread spectrum signals, one estimate for each said spread spectrum signal;
   a plurality of respreaders to respread said plurality of data estimates;
   a plurality of interference suppressers, at least one interference suppressor for each of said plurality of spreading codes, each said at least one interference suppresser for each code being configured to suppress respread data estimates for the spread spectrum signals of the other codes from a received signal;
   a plurality of rake fingers each comprising respective said plurality of interference suppressers; and
   a plurality of rake combiners, one for each of said plurality of spreading codes.

2. A multicode receiver as claimed in claim 1 wherein said multicode spread spectrum receiver comprises a multicode rake receiver.

3. A multicode receiver as claimed in claim 1 further comprising a channel estimator to modify each said data estimate by a channel response estimate.

4. A multicode receiver as claimed in claim 1 wherein a said interference suppresser comprises an adjustable weight to weight a said respread data estimate.

5. A multicode receiver as claimed in claim 1 wherein said multicode spread spectrum receiver comprises a multicode receiver as claimed in any preceding claim.

6. A multicode receiver as claimed in claim 1 suitable for a mobile communications system, and further comprising means to suppress interference from a pilot or a control channel of said mobile communications system.

7. A multicode receiver as claimed in claim 1 configured for space-time transmit diversity STTD reception and further comprising means to suppress interference between spread spectrum signals received from different transmit antennas.

8. A multicode receiver as claimed in claim 7 suitable for a mobile communications system, and further comprising means to suppress interference from a pilot or a control channel of said mobile communications system.

9. A multicode receiver for receiving data carried by a plurality of spread spectrum signals having a corresponding plurality of spreading codes, the spreading codes being substantially mutually orthogonal, the receiver having intercode interference suppression, the receiver comprising:
   a multicode spread spectrum receiver to provide a set of data estimates comprising a plurality of estimates of data carried by said plurality of spread spectrum signals, one estimate for each said spread spectrum signal;
   a plurality of respreaders to respread said plurality of data estimates;
   a plurality of interference suppressers, at least one for each of said plurality of spreading codes, each said at least one interference suppresser for each code being configured to suppress respread data estimates for the spread spectrum signals of the other codes from a received signal;
   a plurality of rake fingers each comprising said plurality of interference suppressers; and
   a plurality of rake combiners, one for each of said plurality of spreading codes, wherein said multicode spread spectrum receiver is configured to provide a plurality of sets of data estimates, each set corresponding to a multipath component of a received signal, wherein said plurality of respreaders comprises one respreader for each said data estimate of each said set, an wherein each of said plurality of rake fingers is configured to receive a respread set of said data estimates.

10. A method of suppressing intercede interference in a multicode receiver for receiving data carried by a plurality of spread spectrum signals having a corresponding plurality of spreading codes, the spreading codes being substantially mutually orthogonal, the method comprising:
   using a multicode spread spectrum receiver to provide a set of data estimates comprising a plurality of estimates of data carried by said plurality of spread spectrum signals, one estimate for each said spread spectrum signal;
   respreading said plurality of data estimates;
   suppressing with a plurality of rake fingers, each including a plurality of interference suppressers, from a received signal for each code, the respread data estimates for the spread spectrum signals of the other codes of the received signal; and
   combining with a plurality of rake combiners, one for each of said plurality of spreading codes, signals received from said plurality of rake fingers.

11. A computer readable medium storing a computer code, which when executed by a computer, suppresses intercode interference of data carried by a plurality of spread spectrum signals having a corresponding plurality of spreading codes, the spreading codes being substantially mutually orthogonal, the code comprising instructions to:
   provide a set of data estimates comprising a plurality of estimates of data carried by said plurality of spread spectrum signals, one estimate for each said spread spectrum signal;
   respread said plurality of data estimates;
   suppress with a plurality of rake fingers, each rake including a plurality of interference suppressers, from a received signal for each code, the respread data estimates for the spread spectrum signals of the other codes of the received signal; and combine, with a plurality of rake combiners, one for each of said plurality of spreading codes, signals received from said plurality of rake fingers.

12. An interference suppresser for a rake receiver, the rake receiver being configured for demodulating a first multicode signal from a received signal comprising a plurality of substantially orthogonal multicode signals, the interference suppresser comprising:

a signal input for a received signal;

a plurality of sets of interference estimate inputs, one set for each finger of the rake receiver;

a plurality of outputs, one for each finger of the rake receiver, each output and each set of inputs being associated with a multipath component of the received signal, said each set of inputs comprising inputs for interference estimates for each multicode other than the first multicode;

a summer for each set of inputs to sum the interference estimates for each multicode; and a plurality of subtractors between the signal input and each said output, the subtractors between the signal input and a said output being configured to receive the summed sets of interference estimates from inputs associated with each multipath component except the multipath component with which the output is associated.

13. An interference suppresser as claimed in claim 12 further comprising:

a plurality of weighting means to weight the interference estimates input at said plurality of sets of interference estimate inputs.

14. An interference suppresser as claimed in claim 13 wherein each said weighting means has an adjustable weight.

15. An interference suppresser for a multicode rake receiver, the multicode rake receiver comprising a plurality of rake receivers, one for each said multicode signal, the interference suppresser comprising a plurality of interference suppressors, each as claimed in claim 12, and each sharing a common said signal input.

16. An interference suppressor as claimed in claim 15 further comprising:

a plurality of weighting means to weight the interference estimates input at said interference estimate inputs.

17. An interference suppresser as claimed in claim 16 wherein each said plurality of weighting means has an adjustable weight.

18. A computer readable medium storing a computer code, which when executed by a computer, demodulates a first multicode signal from a received signal including a plurality of substantially orthogonal multicode signals, the code comprising instructions to:

receive the received signal;

estimate a plurality of sets of interference inputs, one set for each finger of a rake receiver;

output a plurality of signal outputs, one for each finger of the rake receiver, each output and each set of inputs being associated with a multipath component of the received signal, each set of inputs comprising inputs for interference estimates for each multicode other than the first multicode;

sum for each set of inputs the interference estimates for each multicode; and receive the summed sets of interference estimates from inputs associated with each multipath component except the multipath component with which the output is associated.

* * * * *